(12) United States Patent
Chari et al.

(10) Patent No.: US 12,345,243 B2
(45) Date of Patent: Jul. 1, 2025

(54) GRAPHITE/HEXAGONAL BORON NITRIDE BIMATERIALS FOR ELECTRIC PROPULSION

(71) Applicants: California Institute of Technology, Pasadena, CA (US); The Government of the United States of America, as represented by the Secretary of the Navy, Arlington, VA (US)

(72) Inventors: Celia S. Chari, Pasadena, CA (US); Katherine T. Faber, Pasadena, CA (US); Bryan W. McEnerney, Pasadena, CA (US); Richard R. Hofer, Pasadena, CA (US); James A. Wollmershauser, Pasadena, CA (US); Edward P. Gorzkowski, III, Severna Park, MD (US)

(73) Assignees: California Institute of Technology, Pasadena, CA (US); The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 18/238,101

(22) Filed: Aug. 25, 2023

(65) Prior Publication Data

US 2024/0068453 A1   Feb. 29, 2024

Related U.S. Application Data

(60) Provisional application No. 63/401,226, filed on Aug. 26, 2022.

(51) Int. Cl.
*F03H 1/00* (2006.01)
*C01B 32/21* (2017.01)
*B64G 1/40* (2006.01)

(52) U.S. Cl.
CPC .......... *F03H 1/0006* (2013.01); *C01B 32/21* (2017.08); *B64G 1/413* (2023.08)

(58) Field of Classification Search
None
See application file for complete search history.

(56) References Cited

U.S. PATENT DOCUMENTS 7,624,566 B1   12/2009  Manzella et al.
8,143,788 B2    3/2012  Hofer et al.
(Continued)

OTHER PUBLICATIONS

Alkoy et al. (1997) "Crystallization behavior and characterization of turbostratic boron nitride," Journal of the European Ceramic Society. 17. 1415-1422. https://doi.org/10.1016/S0955-2219(97)00040-X.

(Continued)

*Primary Examiner* — Arun Goyal
*Assistant Examiner* — William L Breazeal
(74) *Attorney, Agent, or Firm* — Leydig, Voit & Mayer, Ltd.

(57) ABSTRACT

Aspects disclosed herein include graphite and hexagonal boron nitride bimaterials, methods of making these bimaterials, and electric propulsion devices or thrusters with these bimaterials. Aspects disclosed herein include electric propulsion devices comprising: at least one portion comprising or formed of a monolithic bimaterial; wherein the monolithic bimaterial comprises a graphite material and a hexagonal boron nitride material; and wherein the graphite material and hexagonal boron nitride material are monolithically integrated in the bimaterial.

28 Claims, 42 Drawing Sheets

(56) References Cited

U.S. PATENT DOCUMENTS

| | | | |
|---|---|---|---|
| 8,407,979 | B1 | 4/2013 | Hofer |
| 9,591,741 | B2 | 3/2017 | Larigaldie |
| 9,874,202 | B2 | 1/2018 | Goebel et al. |
| 10,480,493 | B2 | 11/2019 | Hofer et al. |
| 10,919,649 | B2 | 2/2021 | Conversano et al. |
| 11,690,161 | B2 | 6/2023 | Daykin-Iliopoulos et al. |
| 2018/0226217 | A1* | 8/2018 | Martinez ............... H01J 27/146 |
| 2023/0136486 | A1 | 5/2023 | Keidar et al. |
| 2023/0213024 | A1 | 7/2023 | Simmonds et al. |

OTHER PUBLICATIONS

Aydoğdu et al. (2003) "Carbothermic formation of boron nitride," Journal of the EuropeanCeramic Society. 23(16):3153-3161. https://doi.org/10.1016/S0955-2219(03)00092-X.

Bartnitskaya et al. (1993) "Formation of highly disperse boron nitride in carbothermal reduction in the presence lithium compounds," Powder Metallurgy and Metal Ceramics. 32(1):63-72. https://doi.org/10.1007/BF00559737.

Bartnitskaya et al. (1995) "Effect oflithium on structure formation of graphite-like boron nitride with carbothermal synthesis," Powder Metallurgy and Metal Ceramics. 33(7-8):335-340.https://doi.org/10.1007/BF00559576.

Çamurlu et al. (2006) "Role of boron carbide in carbothermic formation ofhexagonal boron nitride," Journal of Materials Science. 41(15):4921-4927.https://doi.org/10.1007/s10853-006-0339-6.

Chari (2023) "Degradation of Ceramic Surfaces and its Mitigation: From Electric Propulsion to Cultural Heritage," Dissertation (Ph.D.), California Institute of Technology. DOI: 10.7907/22st-q436.

Chari et al. (Dec. 2022) "High-temperature carbothermal synthesis and characterization of graphite/h-BN bimaterials," J Am Ceram Soc., 106, 4, 2225-2239.

Chari et al. (Jul. 2022) "Oxidation resistance of AlN/BN via mullite-type Al18B4O33," Journal ofthe European Ceramic Society. 42(8):3437-3445.https://doi.org/10.1016/j.jeurceramsoc.2022.02.037.

Choueiri (2001) "Plasma oscillations in Hall thrusters," Phys. Plasmas, vol. 8, No. 4, 1411-1426.

Combat® (accessed Jul. 25, 2022) "Boron Nitride Solids Product Data Sheet," (2022). https://www.bn.saint-gobain.com/sites/hps-mac3-cma-boron-nitride/files/2022-06/combat-bn-solids-ds.pdf.

Crofton et al. (Dec. 2021) "Low energy Xe + sputter yields for alumina, Hiperco 50, and boron nitride," American Institute of Physics Advances. 11. 125126. https://doi.org/10.1063/5.0067346.

Faber et al. (1981) "Quantitative Studies of Thermal Shock in Ceramics Based on a Novel Test Technique," Journal of the American Ceramic Society, 64, 5, 296-301.

Garnier et al. (1999) "Investigation of xenon ion sputtering of one ceramic material used in SPT discharge chamber," in: 26th International Electric Propulsion Conference, IEPC Paper 1999-083, Kitakyushu, Japan.

Garnier et al. (Nov. 1999) "Low-energy xenon ion sputtering of ceramics investigated for stationary plasma thrusters," Journal of Vacuum Science & Technology A: Vacuum, Surfaces, and Films. 17. 3246-3254. https://doi.org/10.1116/1.582050.

Goebel et al. (2015) "Conducting Wall Hall Thrusters," IEEE Transactions on Plasma Science. 43. 118-126. https://doi.org/10.1109/TPS.2014.2321110.

Guo et al. (Jan. 2023) "Lateral Heterostructures of Graphene and h-BN with Atomic Lattice Coherence and Tunable Rotational Order," Small, 19, 2207217.

Hatta et al. (2003) "High temperature crack sealant based on SiO2—B2O3 for SiC coating on carbon-carbon composites," Advanced Composite Materials. 12(2-3):93-106. https://doi.org/10.1163/156855103772658498.

Hofer (2004) "Development and Characterization of High-Efficiency, High-Specific Impulse Xenon Hall Thrusters", University of Michigan, Ph.D. Thesis.

Hofer et al. (2017) "The H9 Magnetically Shielded HallThruster," 35th International Electric Propulsion Conference, IEPC-2017-232. Altanta, GA.

Hubáček et al. (May 1996) "Chemical reactions in hexagonal boron nitride system," Journal of SolidState Chemistry. 123:215-222. https://doi.org/10.1006/jssc.1996.0171.

Hubáček et al. (Jul. 1996) "High-temperature behaviour of hexagonal boronnitride," Thermochimica Acta. 282-283:359-367. https://doi.org/10.1016/0040-6031(96)02884-5.

Jacobson et al. (1999) "High-Temperature Oxidation of Boron Nitride: I, Monolithic Boron Nitride," J. Am. Ceram. Soc., 82 [2] 393-98.

Johnson-Walls et al. (1985) "Evaluation of Reliability of Brittle Components by Thermal Stress Testing," J. Am. Ceram. Soc., 68 [7] 363-67.

Kleer et al. (1991) "Interface crack resistance of zirconia base thermal barrier coatings," High performance ceramic films and coatings. 329-328.

Lu et al. (1998) "The Thermal Shock Resistance of Solids," Acta Materialia, 46 13, 4755-68.

Mashnitskii et al. (1971) "High-Temperature Graphite Protective Coatings," Institute of Material Physics Problems of the Academy of Sciences of the Ukrainian SSR. Translated from Ogneupory, No. 11, pp. 41-44.

Medvedovski (2018) "Preparation of boron nitride-based coatings through thermal diffusion process," Advances in Applied Ceramics. 117(4):221-230.https://doi.org/10.1080/17436753.2017.1397938.

Mikellides et al. (2014) "Magnetic shielding of a laboratory Hall thruster. I. Theory and validation", Journal of Applied Physics 115, 043303.

O'Connor (1962) "Synthesis of boron nitride," Journal of the American Chemical Society.84(9): 1753-1754. https://doi.org/10.1021/ja00868a065.

Opila et al. (2016) "Borosilicate glass-induced fiber degradation ofSiC/BN/SiC composites exposed in combustion environments," International Journal of Applied Ceramic Technology. 13(3):434-442. https://doi.org/10.1111/ijac.12499.

Parida et al. (Mar. 2022) "Sputtering yield and nanopattern formation study of BNSiO2 (Borosil) at elevated temperature relevance to Hall Effect Thruster," Nuclear Instruments and Methods in Physics Research Section B: Beam Interactions with Materials and Atoms. 514. 1-7. https://doi.org/10.1016/j.nimb.2022.01.001.

Park et al. (2017) "Large-scale synthesis of uniformhexagonal boron nitride films by plasma-enhanced atomic layer deposition," ScientificReports. 7(1):40091. https://doi.org/10.1038/srep40091.

Pikalov (1988) "Mechanism of formation of graphitelike boron nitride in the carbothermal process," Soviet Powder Metallurgy and Metal Ceramics. 27:404-406.

Readey (2017) "Chapter 14. Interdiffusion and Metals," Kinetics in Materials Science and Engineering. Boca Raton, FL: CRC Press, Taylor & Francis Group; 479-517.

Satonik et al. (2014) "Effects of plasma exposure on boron nitride ceramic insulators for hall-effect thrusters," Journal of Propulsion and Power. 30. 656-663. https://doi.org/10.2514/1.B34877.

Sawlani (2015) "Effects of Secondary Electron Emission on the Plasma Sheath and Local Electron Energy Distribution with Application to Hall Thrusters," Dissertation (Ph.D.), University of Michigan. https://hdl.handle.net/2027.42/111614.

Sheldon et al. (1996) "Oxidation of BN-coated SiC fibers in ceramic matrix composites," Journal of the American Ceramic Society. 79(2):539-543.https://doi.org/10.1111/j.1151-2916.1996.tb08163.x.

Solozhenko et al. (1999) "Refined phase diagram of boron nitride," TheJournal of Physical Chemistry B. 103(15):2903-2905.https://doi.org/10.1021/jp984682c.

Song et al. (2010) "Large scale growth and characterization of atomic hexagonalboron nitride layers," Nano Letters. 10(8):3209-3215.https://doi.org/10.1021/nl1022139.

Tartz et al. (2009) "Measuring sputter yields of ceramic materials," in: 31st International Electric Propulsion Conference, IEPC Paper 2009-240, Ann Arbor, Michigan, USA.

(56) References Cited

OTHER PUBLICATIONS

Thomas et al. (1963) "Turbostratic boron nitride, thermal transformation toordered-layer-lattice boron nitride," Journal of the American Chemical Society. 84(24):4619-4622. https://doi.org/10.1021/ja00883a001.

Tondu et al. (2011) "Sputtering yield of potential ceramics for hall effect thruster discharge channel," in: 32nd International Electric Propulsion Conference, IEPC Paper 2011-106, Wiesbaden, Germany.

Uberuaga et al. (2019) "Semicoherent oxide heterointerfaces: Structure, properties, and implications," APL Mater. 7, 100904.

Wakasugi et al. (Apr. 1991) "The solubilities of BN in B2O3 bearing melts," Journal of Non-Crystalline Solids, 135, 139-145.

Wakasugi et al. (Jul. 1991) "Thermodynamics of Nitrogen in B2O3, B2O3—SiO2, and B2O3—CaO Systems," J. Am Cerorn SOC., 74 [ 7 ] 1650-53.

Xiaowei et al. (2004) "Effect of temperature on graphite oxidation behavior," Nuclear Engineering and Design. 227(3):273-280.https://doi.org/10.1016/j.nucengdes.2003.11.004.

Yates et al. (1975) "The anisotropic thermal expansion of boron nitride," The Philosophical Magazine: A Journal of Theoretical Experimental and Applied Physics.32(4):847-857. https://doi.org/10.1080/14786437508221624.

Yim (2017) "A survey of xenon ion sputter yield data and fits relevant to electric propulsion spacecraft integration," in: 35th International Electric Propulsion Conference, IEPC Paper 2017-060, Atlanta, Georgia, USA.

Yim et al. (2008) "Modeling low energy sputtering of hexagonal boron nitride by xenon ions," Journal of Applied Physics. 104. 123507. https://doi.org/10.1063/1.2987090.

Yoon et al. (1995) "Vapour-phase reduction and the synthesis of boronbased ceramic phases," Journal of Materials Science, 30, 607-614.

Yoon et al. (1996) "Vapour-phase reduction and the synthesis of boron-based ceramic phases," Journal of Materials Science, 31, 2265-2277.

Zhang et al. (2019) "Preparation and anisotropic properties of textured structuralceramics: A review," Journal of Advanced Ceramics. 8(3):289-332.https://doi.org/10.1007/s40145-019-0325-5.

Zhang et al. (May 2021) "Experiment and simulation analysis on thermal shock resistance of laminated ceramics with graphite and boron nitride interfaces," CeramicsInternational. 47(9):11973-11978. https://doi.org/10.1016/j.ceramint.2021.01.039.

Zidar et al. (2012) "Hall-effect thruster channel surface properties investigation," Journal of Propulsion and Power. 28. 334-343. https://doi.org/10.2514/1.B34312.

\* cited by examiner

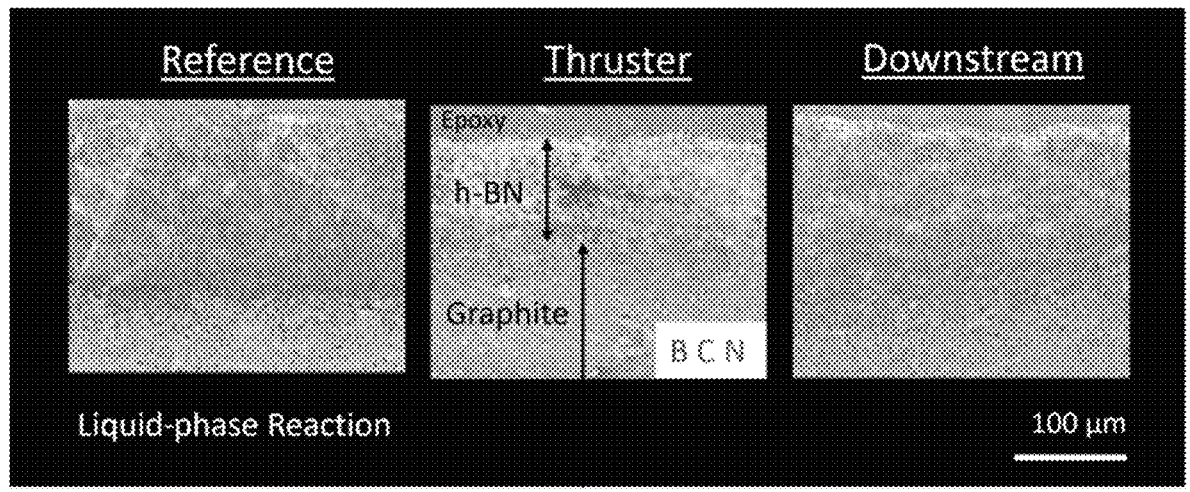
FIG. 18
FIG. 19A
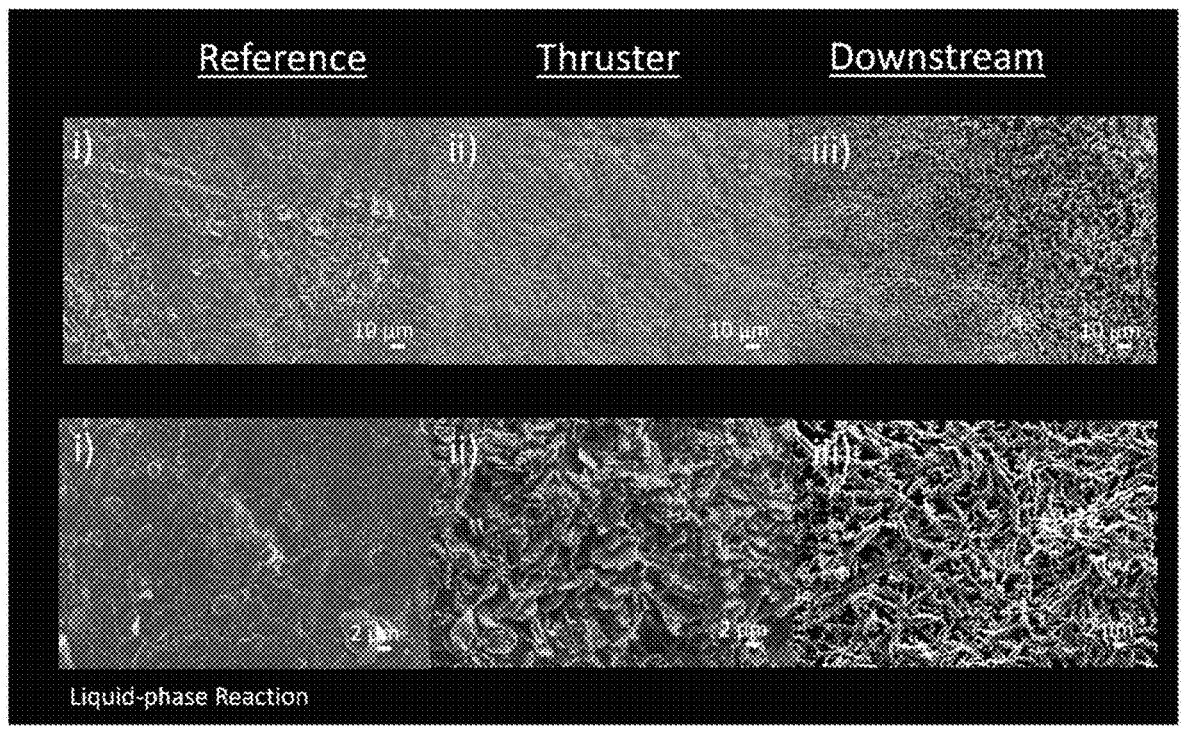
FIG. 19B

GRAPHITE/HEXAGONAL BORON NITRIDE BIMATERIALS FOR ELECTRIC PROPULSION

CROSS-REFERENCE TO RELATED APPLICATIONS

This application claims the benefit of priority to U.S. Provisional Patent Application No. 63/401,226, filed Aug. 26, 2022, which is hereby incorporated by reference in its entirety.

STATEMENT REGARDING FEDERALLY SPONSORED RESEARCH OR DEVELOPMENT

This invention was made with government support under Grant No. 80NMO0018D0004 awarded by NASA (JPL). The government has certain rights in the invention.

BACKGROUND OF INVENTION

Electric propulsion devices, which may also be referred to in the art as spacecraft electric propulsion, electric propulsion, and electric thrusters, are thrust-generating devices that may be incorporated in spacecraft, for example, for spacecraft propulsion in outer space. Advantages of electric propulsion devices over chemical rockets include use of less propellant and longer operability in outer space, although the thrust may be weaker than that of chemical rockets. Electric propulsion devices may utilize electrostatic or electromagnetic fields to accelerate mass, such as ions of a propellant gas, to high speed thereby generating thrust. Many technologies, techniques, and designs for electric propulsion devices have been developed in the art, including but not limited to, ion thrusters such as gridded ion thrusters and Hall-effect thrusters, as well as magnetoplasmadynamic (MPD) thrusters, pulsed inductive thrusters, pulsed plasma thrusters, magnetoplasma acceleration thrusters, helicon double layer thrusters, and others.

Hall-effect thrusters are a particularly useful electric propulsion technology which has been used on multiple spacecraft in the past, including the European Space Agency's SMART-1 spacecraft, various SpaceX Starlink satellites, and the Tiangong space station, and are in development for future spacecraft, such as for NASA's mission to the asteroid Psyche. Newest and in-development Hall-effect thrusters require high-performance dielectric systems to provide electrical isolation, thermal management, sputter resistance from plasma bombardment, and/or secondary electron emission for moderating plasma temperature. Hexagonal boron nitride is a chemically inert high-temperature ceramic with a low dielectric constant and high electrical resistivity, which are properties required for the operation of Hall-thrusters. Commercial hexagonal boron nitride discharge chambers, however, have demonstrated questionable reliability and have shown loss of mechanical strength near their operating temperatures of 600° C. At the same time, large monolithic hexagonal boron nitride is difficult or costly to obtain, which limits power-scalability of thruster development.

These challenges increase technical risk and cost which limits performance and demonstrates a clear need for new materials solutions.

SUMMARY OF THE INVENTION

Provided herein are graphite and hexagonal boron nitride bimaterials, methods of making these bimaterials, and electric propulsion devices or thrusters with these bimaterials. The bimaterials disclosed herein have the advantage of not only providing a high-quality electrically insulating hexagonal boron nitride material but also an electrically conductive graphite material, where the structural configuration of the two materials in the bimaterial is tunable. Accordingly, the bimaterials disclosed herein are suitable for many different uses and components of electric thrusters.

Aspects disclosed herein include electric propulsion devices comprising: at least one portion comprising or formed of a monolithic bimaterial; wherein the monolithic bimaterial comprises a graphite material and a hexagonal boron nitride material; and wherein the graphite material and hexagonal boron nitride material are monolithically integrated in the bimaterial. The electric propulsion device may have an anode, optionally an annular anode. The electric propulsion device may have a cathode, optionally a hollow cathode. The electric propulsion device may have a discharge chamber, optionally having an annular configuration, the inner wall of which optionally comprises the bimaterial. The electric propulsion device is optionally, but not necessarily, an ion thruster such as a Hall-effect thruster, or a magnetoplasmadynamic (MPD) thruster.

Aspects disclosed herein also include methods of making a monolithic bimaterial, the methods comprising: converting a portion of a graphite material into a hexagonal boron nitride material via a carbothermic reaction; wherein the monolithic bimaterial comprises the graphite material and the hexagonal boron nitride material; wherein the carbothermic reaction occurs at a temperature greater than or equal to 1500° C., for example.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIGS. 13A-13O: Histograms show pore size distributions at the surface of the h-BN layer for bimaterials synthesized at: (FIG. 13A) 1600° C. for 12 h, (FIG. 13B) 1650° C. for 12 h, and (FIG. 13C) 1700° C. for 18 h.

FIG. 18: SEM-EDS maps showing elemental composition of cross-sectioned samples synthesized from liquid-phase carbothermic reaction. Maps show h-BN layer (purple) over graphite (yellow, under h-BN).

FIGS. 19A-19B: Mechanical wear of liquid-phase developed h-BN layer: (FIG. 19A) surface microstructure of sample i) before exposure (Reference) and after ii) thruster and iii) downstream exposures; (FIG. 19B) magnification of FIG. 19A.

(FIG. 23A) surface microstructure of sample i) before exposure (Reference) and after ii) thruster and iii) downstream exposures; (FIG. 23B) magnification of FIG. 23A.

FIG. 31A: XRD spectrum and image of graphite/h-BN bimaterial synthesized from melt containing t-BN (89 wt %), h-BN (2 wt %), and $B_2O_3$ (9 wt %), at 1550° C. for 12 h. FIG. 31B: XRD spectrum and image of graphite/h-BN bimaterial synthesized from melt containing t-BN (50 wt %), h-BN (5.8 wt %), and $B_2O_3$ (44.2 wt %) at 1550° C. for 12 h, including electron micrograph of h-BN layer surface, and cross-sectioned image of bimaterial showing h-BN layer thickness of 50±20 μm.

Figure 1A:
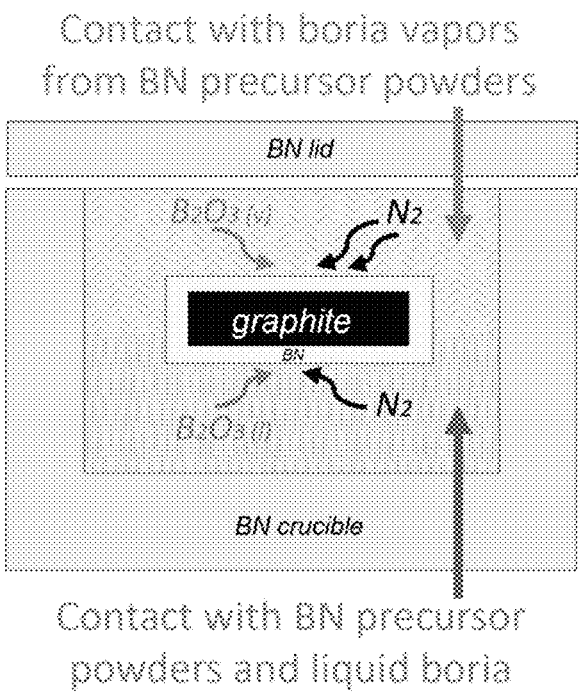
FIG. 1A: Illustration showing the conversion of graphite into h-BN by both liquid-phase $B_2O_3$ from melted precursor powders (bottom) and by vapor-phase $B_2O_3$ from the high-temperature evaporation of the precursor powders (top), according to aspects herein. The reaction may be performed using vapor-phase boria only, liquid-phase boria only, or both vapor and liquid.

STATEMENTS REGARDING CHEMICAL
COMPOUNDS AND NOMENCLATURE

In general, the terms and phrases used herein have their art-recognized meaning, which can be found by reference to standard texts, journal references and contexts known to those skilled in the art. The following definitions are provided to clarify their specific use in the context of the invention.

The term "electric propulsion device" broadly refers to a thruster or a propulsion device useful for applications such as, but not limited to, spacecraft propulsion in outer space or outside of Earth's or other planetary atmosphere. The electric propulsion devices according to aspects disclosed herein include, but are not limited to, ion thrusters, gridded ion thrusters, Hall-effect thrusters (or Hall thrusters), magnetoplasmadynamic (MPD) thrusters, electromagnetic thrusters, pulsed inductive thrusters, magnetoplasma acceleration thrusters, helicon double layer thrusters, plasmoid thrusters, any variations thereof, and any combinations thereof. Any electric propulsion device described herein is optionally, but not necessarily, a solar electric propulsion (SEP) device. Optionally, and preferably for some applications, but not necessarily, an electric propulsion device according to aspects disclosed herein is a Hall-effect thruster or a magnetoplasmadynamic (MPD) thruster. Particularly useful Hall-effect thrusters and aspects thereof, as well as other background information, configurations, components, features, devices, compositions, materials, properties, functions, benefits, and other embodiments and aspects, are found in (1) U.S. Pat. No. 9,874,202 (Goebel, et al, "Metallic wall hall thrusters"; Jan. 23, 2018) and in (2) U.S. Pat. No. 10,480,493 (Hofer, et al., "Hall effect thruster electrical configuration"; Nov. 19, 2019), both of which are incorporate herein by reference in their entirety. Optional embodiments and aspects, such as but not limited to configurations, components, features, devices, compositions, materials, properties, functions, and benefits, are also found in the following U.S. Patent documents, each of which is incorporated herein by reference in its entirety:

(3) U.S. Pat. No. 8,407,979 (Hofer; "Magnetically-Conformed, Variable Area Discharge Chamber for Hall Thruster, and Method"; Apr. 2, 2013);
(4) U.S. Pat. No. 8,143,788 (Hofer; "Compact high current rare-earth emitter hollow cathode for hall effect thrusters"; Mar. 27, 2012);
(5) U.S. Pat. No. 7,624,566 (Manzella; "Magnetic Circuit for Hall Effect Plasma Accelerator"; Dec. 1, 2009);
(6) U.S. Pat. No. 10,919,649 (Conversano; "Low-power hall thruster with an internally mounted low-current hollow cathode"; Feb. 16, 2021);
(7) U.S. Pat. No. 9,591,741 (Larigaldie "Plasma thruster and method for generating a plasma propulsion thrust"; Mar. 7, 2017);
(8) U.S. Pat. Pub. No. 2023/0136486 (Keidar; "Two-stage low-power and high-thrust to power electric propulsion system"; May 4, 2023);
(9) U.S. Pat. Pub. No. 2023/0213024 (Simmonds; "Segmented wall-less hall thruster"; Jul. 6, 2023); and
(10) U.S. Pat. No. 11,690,161 (Daykin-Iliopoulos; "Hollow cathode apparatus"; Jun. 27, 2023).

Further useful background information, configurations, components, features, devices, compositions, materials, properties, functions, benefits, and other embodiments and aspects may be found in (11) R. R. Hofer, "Development and Characterization of High-Efficiency, High-Specific Impulse Xenon Hall Thrusters", University of Michigan, Ph.D. Thesis, 2004, and (12) I. G. Mikellides, et al., "Magnetic shielding of a laboratory Hall thruster. I. Theory and validation", Journal of Applied Physics 115, 043303 (2014). Generally, devices or aspects thereof disclosed herein may be according to and/or include one or more aspects from any of the electric propulsion devices or thrusters disclosed herein, and/or described in the aforementioned and incorporated references, and/or described in other references provided herein, and/or any future or yet unknown devices, and/or any variation thereof, and/or any combination thereof. Generally, bimaterials and aspects thereof disclosed herein may be used in any electric propulsion device or thruster disclosed herein, and/or described in the aforementioned and incorporated references, and/or described in other references provided herein, and/or any future or yet unknown devices, and/or any variation thereof, and/or any combination thereof.

Figure 25A:
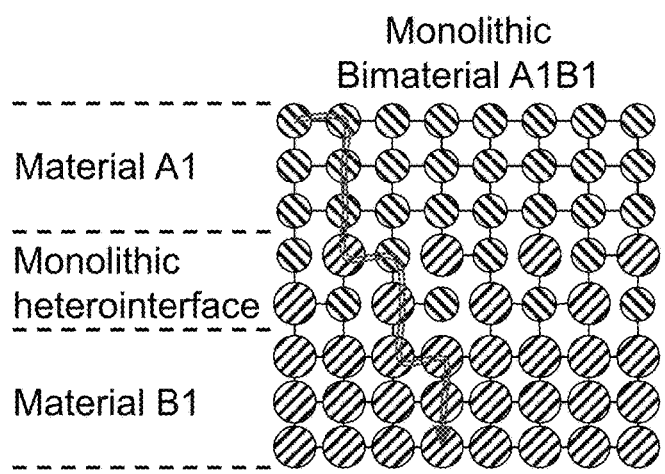
FIGS. 25A-25C: Conceptual illustrations of monolithic bimaterial A1B1 (FIG. 25A) and monolithic bimaterial A2B2 (FIG. 25B) and two materials (C and D) that do not form a monolithic bimaterial (FIG. 25C).
Figure 25B:
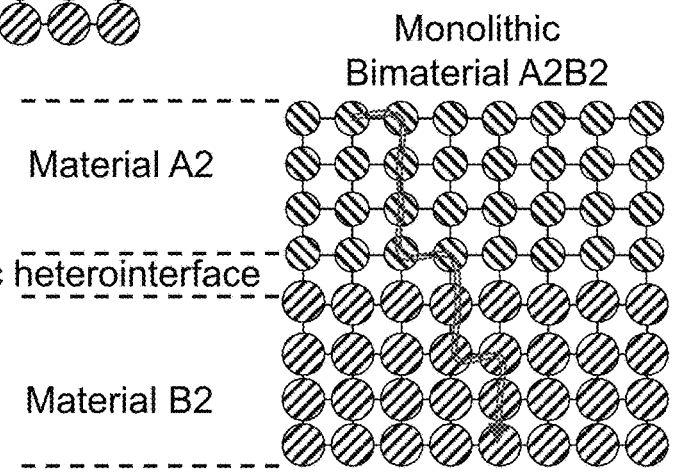
Figure 25C:
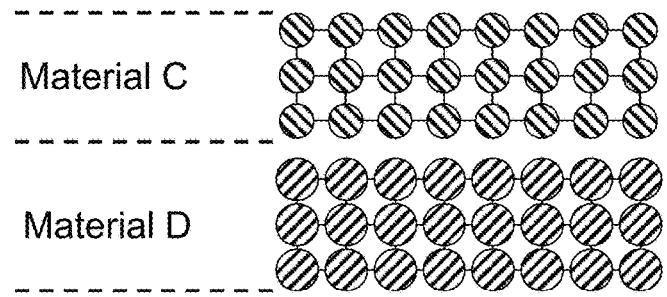

As used herein, two "monolithically integrated" materials are directly or indirectly connected or integrated together without seams or joints therebetween via a continuous atomic structure. As used herein, a continuous atomic structure refers to an atomic structure wherein atoms of the continuous atomic structure are directly or indirectly chemically bonded together. For example, a first material and a second material share a continuous atomic structure if there is at least one continuous uninterrupted path of chemically bonded atoms (e.g., a hypothetical path from a first atom to a second atom chemically bonded to the first, to a third atom chemically bonded to the second, to a fourth atom chemically bonded to the third, to a fifth atom chemically bonded to the fourth, etc.) between atoms of the first material and atoms of the second material. For example, as merely a conceptual illustration, FIG. 25A shows a hypothetical monolithic bimaterial ("Monolithic Bimaterial A1B1"), where two different materials A1 and B1 are monolithically integrated via a monolithic heterointerface. In FIGS. 25A-C, the circles represent atoms and lines connecting the circles represent chemical bonds between atoms. As illustrated, there is a continuous atomic structure between Materials A1 and B1, with the double-dash line showings an exemplary hypothetical path from Material A1 to Material B1 via chemical bonded atoms. Bimaterial A1B1 comprises a monolithic heterointerface with a mix of atoms belonging to Materials A1 and B1, with some chemical bonds broken, but there is nonetheless a continuous atomic structure and the bimaterial is monolithic. The Monolithic Bimaterial A2B2 illustrated in FIG. 25B shows a bimaterial with an abrupt and coherent interface between Materials A2 and B2. Both bimaterials A1B1 and A2B2 are monolithic. In contrast, FIG. 25C shows Materials C and D adjacent to each other but without chemical bonds between atoms of Material C and Material D. As such, Materials C and D do not form a monolithic bimaterial and Materials C and D are not monolithically integrated. There is no monolithic heterointerface between Materials C and D as illustrated in FIG. 25C. As used herein, chemically bonded atoms refers to atoms chemically bonded together via ionic bond(s), covalent bond(s), metallic bond(s), covalent-ionic bond(s), covalent-metallic bond(s), metallic-ionic bond(s), or any combination(s) thereof. In some aspects, two materials having only van der Waals (vdw) interactions or bonds between their atoms at the heterointerface (i.e., no ionic, covalent, metallic bonding, or combinations thereof) are not monolithically integrated, do not share a monolithic interface, and do not have a continuous atomic structure. In some aspects, two materials having only intermolecular forces or interactions between their atoms at the heterointerface (i.e., no intramolecular bonding or chemical-electric bonding such as ionic, covalent, metallic bonding, and combinations thereof) are not monolithically integrated, do not share a monolithic interface, and do not have a continuous atomic structure. Two monolithically integrated may be directly connected or integrated together via a continuous atomic structure such that the interface between the two is abrupt or substantially abrupt. Two monolithically integrated may be indirectly connected or integrated together via a continuous atomic structure such that there may be an interfacial region or interface layer which has a mixture of the two materials and/or one or more compositions that comprise elements of the two materials. For example, a graphite material or layer of a bimaterial and a boron nitride material or layer of the same bimaterial may have an interfacial region or interface layer therebetween, where the interfacial region or interface layer may comprise one or more graphite materials, one or more other allotropes of carbon, hexagonal boron nitride, one or more other boron nitride materials (e.g., optionally polymorph(s) other than hexagonal boron nitride such as but not limited to amorphous boron nitride), one or more other compositions have B, B and N, C and B, C and N, or C, B, and N, or any combinations thereof. Regardless of the specific composition(s) of a present interface layer, the monolithically integrated materials having the interface layer therebetween are nonetheless connected via a continuous atomic structure which includes the atomic structure of the interface layer. In aspects, the bimaterial, including the interface layer, if present therein, is the product of a chemical conversion reaction(s) of one of a first material (e.g., graphite) into a second material (e.g., boron nitride), where the bimaterial is a bimaterial of the first and the second materials (e.g., graphite and boron nitride), and the monolithic integration and continuous atomic structure of said bimaterial is the result of said chemical conversion reaction(s). In aspects, two materials bound indirectly via one or more adhesives and not sharing a continuous atomic structure except via said one or more adhesives do not form a monolithic bimaterial as defined herein. In aspects, graphite adhered to boron nitride via an adhesive, wherein any communication (e.g., thermal and/or electronic) between the graphite and boron nitride is necessarily via/through/across the adhesive, is not a bimaterial as defined herein. In aspects, foreign material(s) or layer(s) such as an adhesive binding the first and second materials, the foreign material(s) or layer(s) not being the first material (e.g., graphite), not being the second material (e.g., boron nitride), nor being or not comprising a mixture of the first and second materials or compositions thereof, wherein the first and second materials do not have a continuous atomic structure except via/through said foreign material(s) or layer(s), does not form or constitute a monolithic heterointerface. In some aspects, the bimaterial is free of an adhesive at an interface between its first material and its second material. As used herein, a "monolithic bimaterial" is a material comprising two different materials, such as graphite and boron nitride, which are monolithically integrated. As used herein, the term "monolithic heterointerface" refers to an interface between two different materials (therefore, hetero-interface) wherein said interface is monolithic such that the interface has a continuous atomic structure with the materials across said interface.

Figure 26:
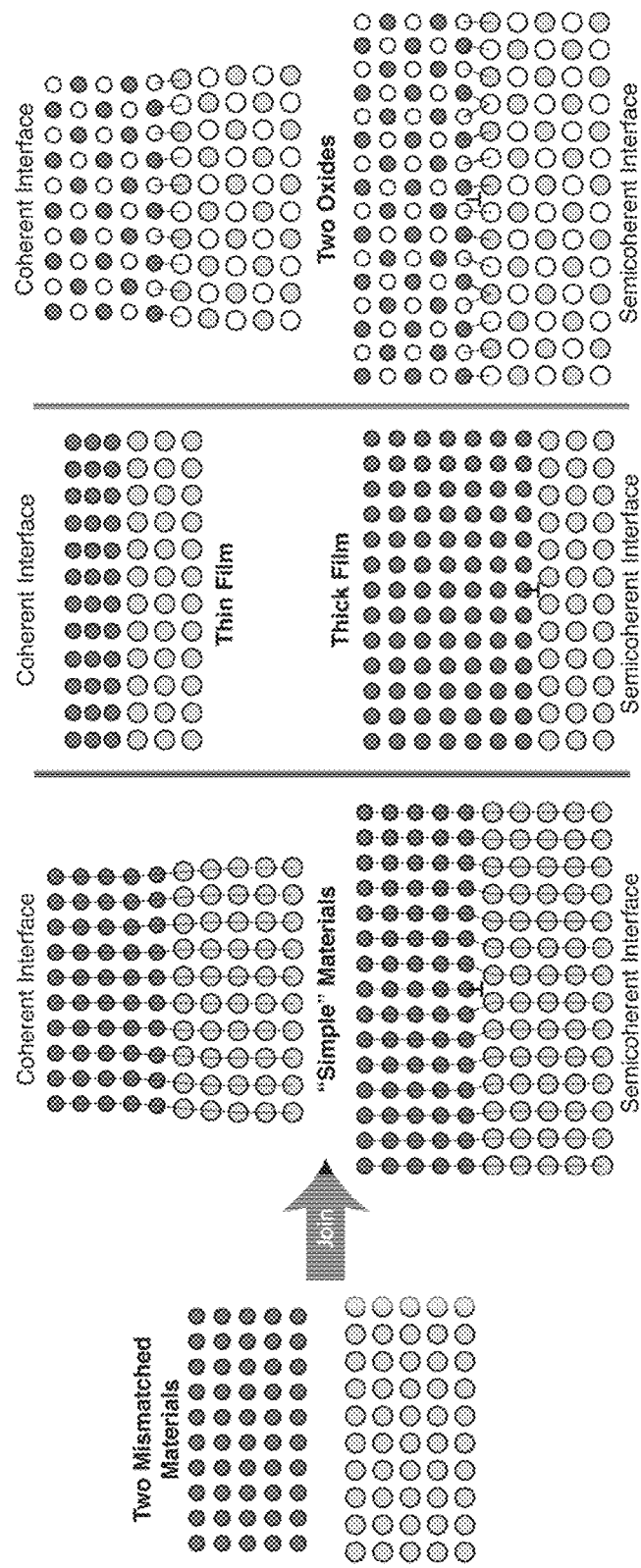
FIG. 26: A schematic illustrating coherent and semicoherent interfaces of two different materials. This schematic is based on a similar schematic from the following reference: "Semicoherent oxide heterointerfaces: Structure, properties, and implications," B. P. Uberuaga, P. P. Dholabhai, G. Pilania, et al., *APL Mater.* 7, 100904 (2019); doi: 10.1063/1.5121027.

Preferably, monolithically integrated materials have a coherent and/or semicoherent interface. The term coherent interface and semicoherent interface are consistent with the terms as known in the relevant arts, particularly materials science, and may be determined by art-known methods. For example, Uberuaga, et al. ("Semicoherent oxide heterointerfaces: Structure, properties, and implications" APL Mater. 7, 100904 (2019); doi: 10.1063/1.5121027) defines, describes, and illustrates coherent and semicoherent material interfaces as well as techniques useful to determination thereof. FIG. 26 is a reproduction from Uberuaga, et al., (2019), illustrating coherent and semicoherent interfaces, according some aspects herein. Useful definitions, discussions, and techniques are also found in Guo, et al. ("Lateral Heterostructures of Graphene and h-BN with Atomic Lattice Coherence and Tunable Rotational Order", Small, Volume 19, Issue 17, Apr. 26, 2023, 2207217). Generally, coherent interfaces are those with complete or perfect continuity in the arrangement of atoms, such as an interface in a bimaterial where boron or nitrogen atoms of boron nitride line up with carbon atoms of graphite with no dislocations. Semicoherent interfaces have dislocations in one direction but not others. An interface between graphite and hexagonal boron nitride ("h-BN") may be coherent, in some aspects herein, because graphite is generally isostructural with h-BN and the lattice parameters are close. For example, in some aspects, the a lattice parameters of graphite and h-BN are within approximately 1.8% and the c lattice parameters of graphite and h-BN are within approximately 0.7%. The coherent or semicoherent nature of an interface can be characterized with transmission electron microscopy (TEM), such as shown in Uberuaga, et al., (2019) and Guo, et al., (2023).

An electrically insulating material, layer, or component portion may electrically isolate a first material, component, or component portion from a second material, component, or component portion. Said first material, component, or component portion is optionally electrically conductive and said second material, component, or component portion is optionally electrically conductive. For example, in some aspects, a hexagonal boron nitride material of a bimaterial according to aspects disclosed herein may provide the function of electrically isolating an electrically conductive portion of a discharge chamber wall from electrically conductive portions of a magnetic circuit of an electric thruster. In some aspects, to perform the electrical isolation function, a hexagonal boron nitride material or a portion or layer or a bimaterial having hexagonal boron nitride has an electrical resistivity greater than or equal to $1 \cdot 10^{13}$ Ωcm, optionally greater than or equal to $1 \cdot 10^{13}$ Ωcm, optionally greater than or equal to $1.5 \cdot 10^{13}$ Ωcm, optionally greater than or equal to $2 \cdot 10^{13}$ Ωcm, optionally greater than or equal to $5 \cdot 10^{13}$ Ωcm, optionally greater than or equal to $1 \cdot 10^{13}$ Ωcm, optionally greater than or equal to $1 \cdot 10^{14}$ Ωcm, optionally greater than or equal to $1.5 \cdot 10^{14}$ Ωcm, optionally greater than or equal to $2 \cdot 10^{14}$ Ωcm, optionally greater than or equal to $5 \cdot 10^{14}$ Ωcm, optionally greater than or equal to $1 \cdot 10^{15}$ Ωcm.

In aspects, one of skill in the relevant art would be familiar with appropriate techniques and methods to determine various techniques and methods described herein, such as the appropriate ASTM standard (formerly "American Society for Testing and Materials"). Generally, properties and characteristics discussed herein are measured using appropriate techniques and methods described herein.

In an embodiment, a composition or compound of the invention, such as a precursor or ingredient used to make a composition described herein, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

The term "and/or" is used herein, in the description and in the claims, to refer to a single element alone or any combination of elements from the list in which the term and/or appears.

The term "±" refers to an inclusive range of values, such that "X±Y," wherein each of X and Y is independently a number, refers to an inclusive range of values selected from the range of X−Y to X+Y. In the cases of "X±Y" wherein Y is a percentage (e.g., 1.0±20%), the inclusive range of values is selected from the range of X−Z to X+Z, wherein Z is equal to X·(Y/100). For example, 1.0±20% refers to the inclusive range of values selected from the range of 0.8 to 1.2.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.
Overview:

Advanced electric propulsion systems, such as Hall-effect thrusters that will be flown on the Psyche mission by NASA's Jet Propulsion Laboratory, require high-performance dielectric systems to provide electrical isolation, thermal management, sputter resistance from plasma bombardment, and secondary electron emission for moderating plasma temperature and controlling plasma instabilities. Existing materials, particularly commercial hexagonal boron nitride discharge chambers, have demonstrated questionable reliability and have shown loss of mechanical strength near their operating temperatures of 600° C. These challenges increase technical risk and cost which limits performance and demonstrates a clear need for new materials solutions.

It is discovered that a bimaterial system comprising graphite and hexagonal boron nitride is a useful materials system for electric propulsion. In aspects, the bimaterial disclosed herein hexagonal boron nitride (h-BN) grown on a graphite substrate, optionally but not necessarily fully enclosing the graphite substrate. The bimaterial of aspects disclosed herein provides a mechanically robust and adherent dielectric surface layer (on the order of 50 to 150 μm) atop the conductive, compliant graphite substrate. In aspects herein, the h-BN layer is produced via the carbothermal reduction of boria ($B_2O_3$) in nitrogen in the presence of graphite at 1650° C. and 1700° C. In aspects, the reaction can take place either via liquid-phase or vapor-phase transport or a combination of both.

The thickness and microstructure of the h-BN layer can be controlled by adjusting the parameters of the carbothermic reaction, including the reaction temperature, holding time, and the phase of the reaction. The carbothermic reaction parameters are also discovered to influence size dimensions, such as thickness, and chemistry of the bimaterial interface, where for example boron carbide could develop from an absence of surrounding $N_2$. Aspects disclosed herein include processing conditions necessary for avoiding the production of boron carbide within the bimaterial, ensuring a clean interface between the graphite body and h-BN layer through vapor-phase carbothermic reactions. The processing-microstructure relationships determined from the experiments of this fabrication method can be used to better control the material design and processing of Hall-effect thrusters for electric propulsion.

It is determined that hexagonal boron nitride is an ideal match for graphite due to their common crystal structures, similar lattice parameters, and comparable coefficients of thermal expansion. The bi-material pair is expected to meet the disparate requirements for a dielectric in an electrical propulsion device. For example, graphite demonstrates high compliance to accommodate dynamic launch environments, thermal conductivity, and strength, all coupled to produce thermal shock resistance and machinability. At the high voltages present in Hall-effect thrusters (300-800 V), the low secondary electron yield and high electrical conductivity of graphite may degrade plasma stability and complicate electrical isolation. Hence, the selective use of the insulating h-BN layer is used to ameliorate these issues and achieve a system with optimal performance that can be engineered for flight.

In some aspects, vapor-phase carbothermic reactions are particularly attractive for converting the channel walls of Hall-effect thrusters into h-BN layers due to the gaseous nature of the reactants which ensure uniformity in the h-BN layer production, even with the most complex shaped samples. In some aspects, the vapor-phase method is also more attractive in contrast to the liquid-phase method due to its scalability. In some aspects, the vapor-phase method also produces the smoothest bimaterial interface and the smoothest h-BN surface layers. The graphite/h-BN bimaterials created through vapor-phase carbothermic reactions are identified as the excellent candidates for electric propulsion systems moving forward.

Brief Description of Electric Propulsion Devices Such as Hall-Effect Thrusters:

Electric propulsion devices, which may also be referred to in the art as spacecraft electric propulsion, electric propulsion, and electric thrusters, are thrust-generating devices that may be incorporated in spacecraft, for example, for spacecraft propulsion in outer space. Advantages of electric propulsion devices over chemical rockets include use of less propellant and longer operability in outer space, although the thrust may be weaker than that of chemical rockets. Generally, but not exclusively, electric propulsion devices utilize electrostatic or electromagnetic fields to accelerate mass, such as ions of a propellant gas, to high speed thereby generating thrust. Many technologies, techniques, and designs for electric propulsion devices have been developed in the art, including but not limited to, ion thrusters, gridded ion thrusters, Hall-effect thrusters (or Hall thrusters), magnetoplasmadynamic (MPD) thrusters, electromagnetic thrusters, pulsed inductive thrusters, pulsed plasma thrusters, magnetoplasma acceleration thrusters, helicon double layer thrusters, plasmoid thrusters, electrothermal thrusters such as microwave and arcjet thrusters, and others.

Figure 27A:
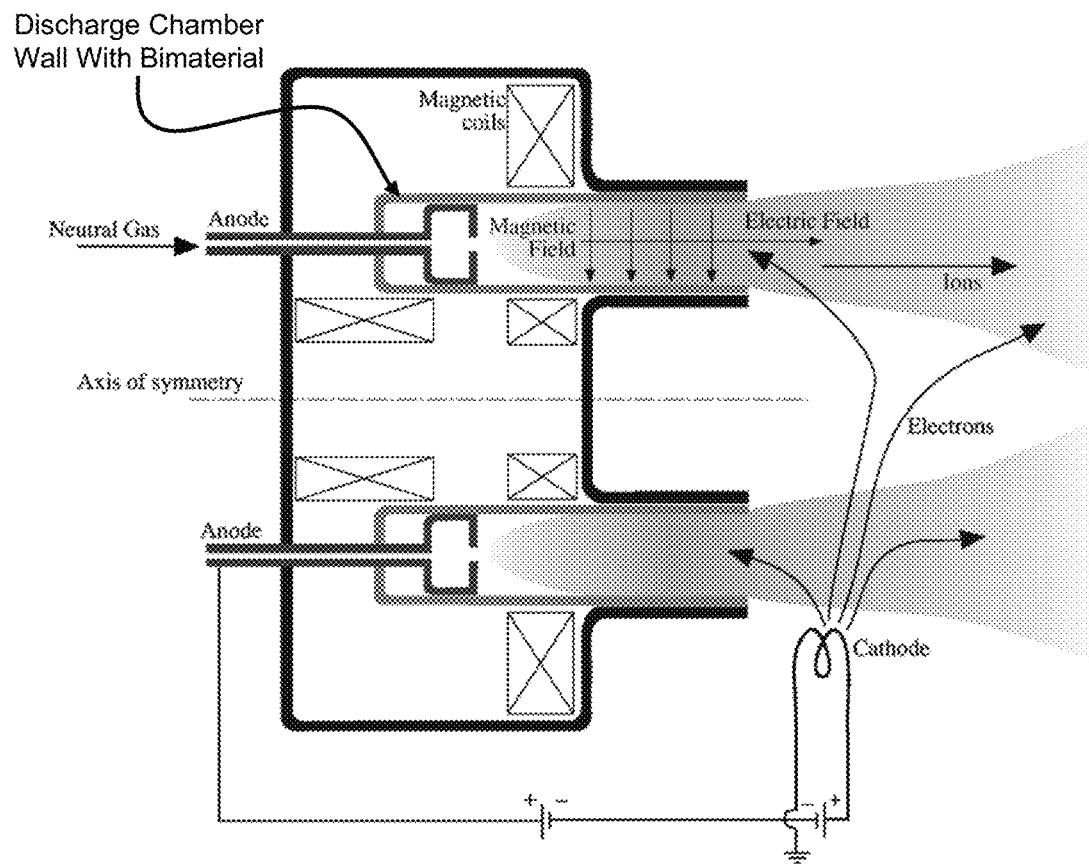
FIGS. 27A-27B: Schematics of exemplary Hall-effect thrusters, according to some aspects herein. Optionally, the inner discharge chamber wall comprises a bimaterial according to aspects herein, as shown.
Figure 27B:
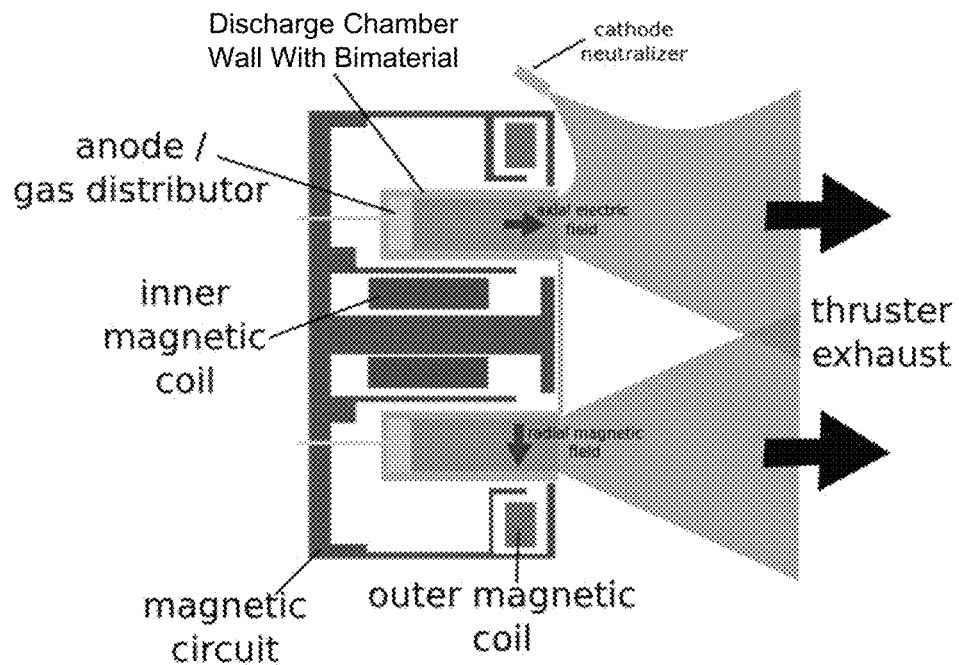

Electrostatic thrusters, in general, include ion thrusters, such as the gridded ion thruster, Hall-effect thruster, and field-emission thruster. Hall-effect thrusters are a particularly useful electric propulsion technology which has been used on multiple spacecraft in the past, including the European Space Agency's SMART-1 spacecraft, various SpaceX Starlink satellites, and the Tiangong space station, and are in development for future spacecraft, such as for NASA's mission to the asteroid Psyche. In general, Hall-effect thrusters accelerant a propellant gas using an electric field. A magnetic field is used to limit electrons' axial motion and to ionize the propellant gas. The ionized gas is accelerated by the electric field which produces thrust. The ions are then neutralized using a cathode. FIGS. 27A and 27B shows exemplary, non-limiting and non-exhaustive, schematics of Hall-effect thrusters. For example, again generally, the propellant gas may be provided via or through an anode, which may optionally be porous. The Hall thruster typically, but not necessarily, generally has a circular shape when viewed head-on (referred to herein as longitudinal direction) with the anode and discharge chamber walls themselves typically, but not necessarily, having an annular shape. FIGS. 27A-B show cross-sectional views of thusly shaped Hall thrusters with annular anode and discharge chambers. The propellant gas enters through the anode and is confined by the discharge chamber walls, where it is ionized and accelerated by a large electric field between the anode and cathode. A magnetic circuit, which may include magnetic coils surrounding at least a portion of the discharge chamber, may confine a large fraction of electrons to a spiral-like trajectory within the annular cavity of the discharge chamber.

For example, and in some aspects herein, a Hall thruster uses a radial magnetic field in the range of about 100 to 500 G to confine electrons. The combination of the radial magnetic field and axial electric field causes the electrons to drift in the azimuthal direction thus forming a Hall current. In some configurations of Hall thrusters, such as the configurations shown in FIGS. 27A-27B, a central or inner magnetic coil is surrounded by an annual anode and annular discharge chamber which then is surrounded by an outer magnetic coil, with the magnetic coils being connected by or part a magnetic circuit. The inner and outer magnetic coils and magnetic pole pieces are configured to provide the radial magnetic field in the discharge chamber. The confined electrons, which may have energy such as in range of 10 to 100 eV, ionize the propellant gas, such as Xe in the discharge chamber. The applied electric potential, such as in the range of 100 V to 1000 V, between the anode and cathode accelerate the propellant gas ions. For example, with a discharge voltage of about 300 V, the propellant ions may reach speeds of about 15 km/s for a specific impulse of 1,500 s. Upon exiting, however, the ions pull an equal number of electrons with them, creating a plasma plume with no net charge.

Figure 28:
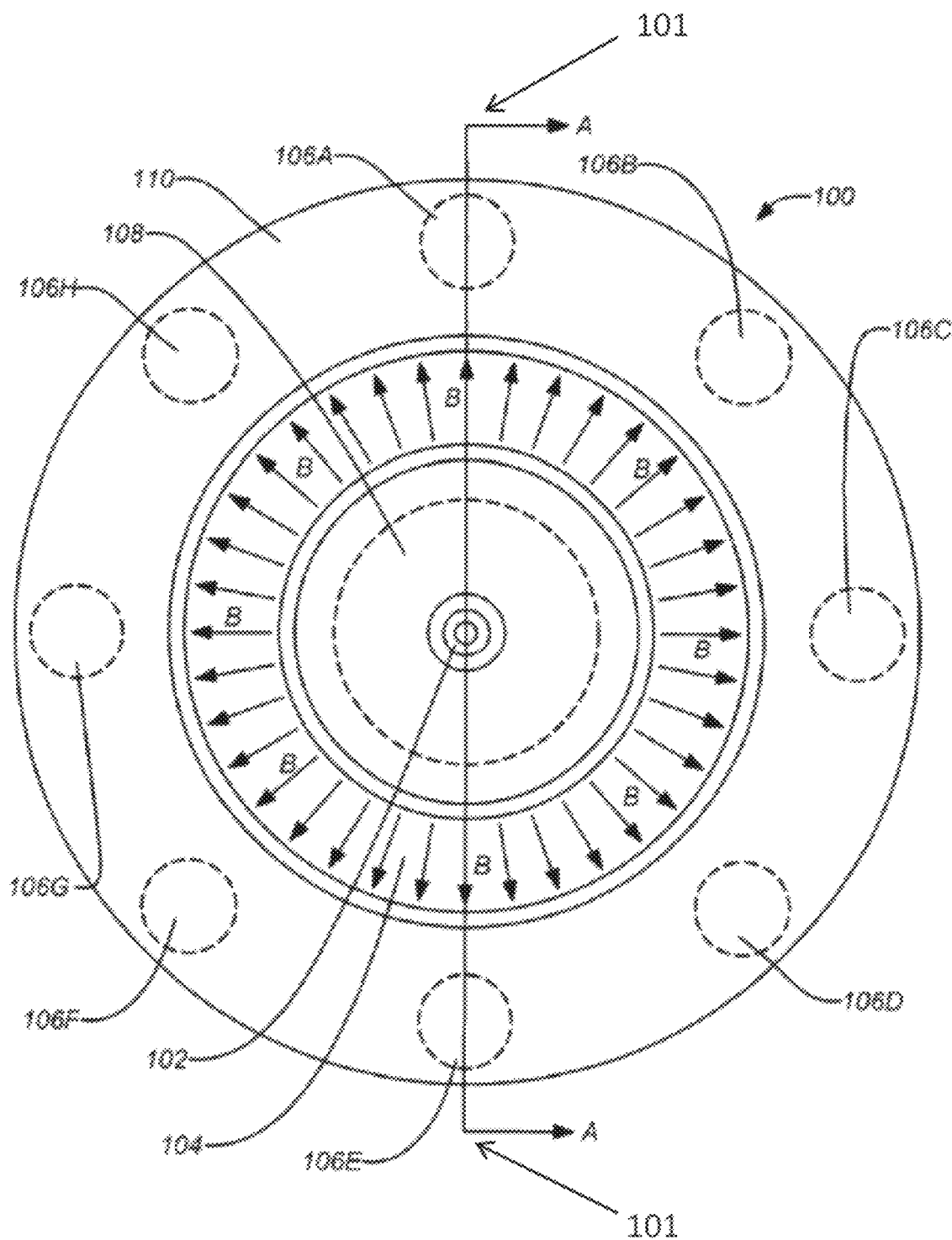
FIG. 28: Schematic of a top or head-on view of an exemplary Hall-effect thruster, according to some aspects herein.
Figure 29:
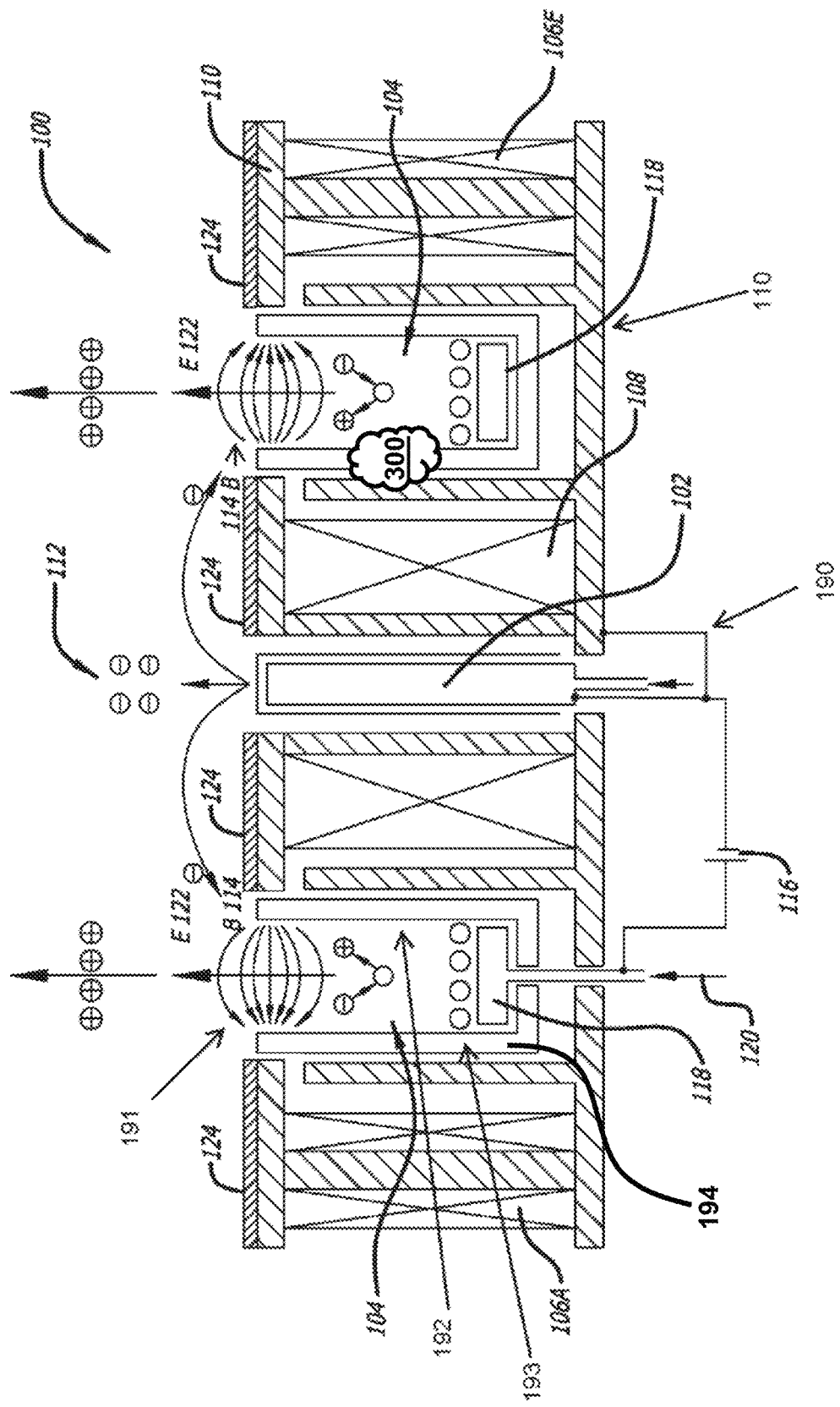
FIG. 29: Schematic of a cross-sectional view of the exemplary Hall-effect thruster of FIG. 28, according to some aspects herein.

Exemplary Hall-Effect Thruster Configurations, Features, and Details:

FIGS. 28 and 29 show exemplary aspects of Hall-type ion thrusters, according to some aspects useful herein. In particular, as examples, FIGS. 28 and 29 are schematic diagrams of an exemplary Hall effect thruster (100), employing a central electron emitting cathode (102). In other aspects, the cathode may be positioned away from the center of the circular cross-section. FIG. 28 shows a top view of the thruster and FIG. 29 shows a cross section along points A (101) of FIG. 28. The thruster (100) employs an annular cavity (104) for ionizing and accelerating gas particles which are ejected from the cavity to develop thrust. A magnetic (B) field is developed radially (from the center to the outer rim) across the open end of the annular cavity (104), for example with electromagnets or permanent magnets. Typically, a magnetic circuit is formed using multiple electromagnetic coils (106A-106H), (108) and a ferrous housing (110) appropriately constructed to produce the magnetic field as shown in FIGS. 28 and 29. In the example thruster, eight outer electromagnetic coils (106A-106H) and one larger central electromagnetic coil (108) are employed although those skilled in the art will appreciate that any combination of coil number and sizes may be employed as necessary to develop the proper magnetic field strength and shape.

Referring to FIG. 29, the centrally mounted electron emitter cathode (102) emits electrons (112) from an opening around a same level as that of the openings in the annular cavity (104) (the electrons are illustrated as circular symbols with a negative sign). In other words, in some aspects, the opening of the cathode lies in the same plane of the opening of the annular cavity (104). Positioning the cathode in this way reduces keeper sputtering of the cathode (102), which can increase as the cathode (102) is extended beyond the plane of the opening of the annular cavity (104). Performance can be optimized by iteratively adjusting the cathode (102) end extension position beyond the opening of the annular cavity (104) and testing each configuration. In this example, the cathode (102) is disposed in the center of the single large central coil (108) for developing the magnetic field B (114).

The electrons (112) from the emitter cathode (102) are drawn to the annular cavity (104) by a voltage (116) between the cathode (102) and at least one anode (118) disposed at the bottom of the annular cavity (104). Movement of the electrons (112) drawn to the annular cavity (104) is influenced by the magnetic field (114) such that the electrons become trapped and spiral around the annular cavity (104). Typically, the anode (118) is also used to deliver a gas (120) (e.g. xenon, krypton, argon, etc.) which flows through it to the bottom of the annular cavity (104) (illustrated as neutral circular symbols above the anode 118). The downstream side of the trapped cloud of electrons (112) in the annular cavity (104) forms a "virtual" cathode, an electrical extension of the central cathode (102). An electric (E) field (122) is defined from the anode (118) to this "virtual" cathode in a vertical direction out of the annular cavity (104). Energized electrons (112) in the annular cavity 104 also impact and ionize the gas (120). The gas (120) ions (illustrated as circular symbols with a positive sign) are driven by the electric field (122) and expelled out of the annular cavity (104) imparting a reactive force to the thruster (100) in the opposite direction. Some additional electrons (112) from the cathode (102) are attracted by the expelled gas (120) ions and drawn out with them, where they neutralize the ion beam.

It should be noted that the foregoing description of the electron emitter cathode (102) operating in the Hall-effect thruster (100) is only one example use for the cathode (102) aspects which demonstrates the cathode (102) disposed in the center of the annular cavity (104). Other applications and uses will be apparent to those skilled in the art based on the detailed description including key elements of the structure and method of operation of the cathode (102) as described in the following sections. A typical element of the electron emitter cathode is the rare earth insert which is the source of the electron emission.

In some aspects, the cathode (102) is electrically tied to the thruster chassis through electrical connection (190). In other aspects, a power supply can be placed at (190) to electrically bias the cathode with respect to the thruster body. In some aspects, pole covers (124) can be added. For example, the pole covers can be insulating or conducting. In some aspects, the pole covers (124) are made of or comprise graphite, where said graphite is optionally the graphite material of a bimaterial according to aspects herein. In some aspects, the pole covers (124) are made of or comprise a bimaterial according to aspects disclosed herein.

FIGS. 28-29 depict a thruster using outer coils that are arranged around the outside of the discharge chamber. In other aspects, a single outer coil goes around the outside of the discharge chamber. This configuration changes part of the magnetic circuit.

In a Hall thruster, the propellant is accelerated by the electric field. The electrons are trapped in the magnetic field and used to ionize the propellant and neutralize the ions in the plume. The magnetic poles can be subject to erosion from sputtering, therefore pole covers are advantageous. Generally, conducting or insulating pole covers can be used. Since insulating covers generally have higher erosion rates, Hall thrusters as described herein can advantageously have, in some aspects, conducting pole covers, for example made of graphite, where said graphite is optionally the graphite material of a bimaterial according to aspects herein, or of a bimaterial having graphite according to some aspects herein.

In some embodiments, a hollow cathode can be used, for example made of BaO or $LaB_6$. BaO has large current throttling capabilities, while $LaB_6$ is more tolerant to propellant impurities and high current operations. The cathode optionally has a hollow cylindrical shape, with a hole extending longitudinally throughout the structure.

In aspects, for example, three electrical configurations of Hall thrusters are contemplated: 1) an insulating surface on the pole pieces, and the thruster body electrically tied to the spacecraft chassis (i.e., spacecraft electrical common or sic); 2) exposed conducting pole pieces and the thruster body electrically tied to the spacecraft chassis; and 3) exposed conducting pole pieces and the thruster body tied to cathode common.

In aspects, for example, a thruster may have with pole covers or be without pole covers (the surfaces will be conducting in this case).

In some aspects, as illustrated in FIG. 29, the Hall thruster may comprise a thruster body comprising a housing, chassis or body comprising an annular discharge chamber (104) having an inner wall (194), the inner wall optionally being made of or comprising an electrically conductive material at its surface facing the plasma (radial inner surface 192), where the inner wall is optionally formed of a bimaterial according to aspects herein with the electrically conductive material of said inner wall surface being the graphite material of the bimaterial, and having a rear surface with an aperture (191) in the inner wall defined therein, said inner wall of said annular discharge chamber having a downstream end (191), a radially inner surface (192), and a radially outer surface (193), wherein said radially inner surface and said radially outer surface respectively radially inwardly and radially outwardly bound said annular discharge chamber. Optionally the annular discharge chamber (104) having an inner wall, the entire inner wall is optionally made of or comprises a bimaterial according to aspects herein with inner surface or radially inner surface 192 of the discharge chamber wall being entirely or at least partially formed of an electrically insulating material such as the hexagonal boron nitride material of the bimaterial according to aspects herein.

The thruster may also comprise an anode/gas distributor (118) having an anode electrical terminal, said anode/gas distributor situated in said aperture defined in said rear surface of said annular discharge chamber, said anode/gas distributor having at least one inlet configured to receive an ionizable gas (120) and configured to distribute said ionizable gas for use as a propellant; a cathode neutralizer (102) configured to provide electrons, said cathode neutralizer having a cathode electrical terminal that can be connected to said anode electrical terminal by way of a power supply (116) and a switch, said cathode neutralizer and said anode/gas distributor when operating generating an axial electrical field within said annular discharge chamber, and a magnetic circuit having a magnetic yoke, an inner magnetic coil and an outer magnetic coil, said magnetic circuit to be energized by way of a power supply and a switch, said magnetic circuit configured to provide a substantially radial magnetic field across an annular aperture of said annular discharge chamber, said magnetic circuit configured to provide magnetic shielding of said inner wall of said annular discharge chamber from high-energy ions.

In other aspects, the Hall thruster may also be unshielded instead of being magnetically shielded. In other aspects, the annular discharge chamber can be either electrically conducting—such as where the inner surface of the annual discharge chamber wall is formed of the graphite of a bimaterial disclosed herein—or insulating—such as wherein the inner surface of the annual discharge chamber wall is formed of the hexagonal boron nitride material of a bimaterial disclosed herein. In some aspects, the chamber may comprise graphite covers (124) on the magnetic poles, where said graphite is optionally the graphite material of a bimaterial according to aspects herein. The ferrous housing may also be termed as magnetic pole as it is part of the magnetic circuit when using electromagnets. In some aspects, the cathode electrical terminal is electrically connected to the thruster body by way of an electrically conducting material, for example a conducting wire or other similar techniques. In some aspects, the hollow cathode has a cylindrical hollow shape. In some aspects, the magnetic shielding allows diversion of the high-energy ions away from the inner walls.

Discussion of Certain Aspects of Using Bimaterials Disclosed Herein in Electric Propulsion Devices Such as Hall-Effect Thrusters—the Discharge Chamber:

In some aspects, the wall, or inner wall, or at least a portion of said wall forming the discharge chamber is formed of a bimaterial according to aspects herein. In some aspects, the wall, or inner wall, or at least a portion of the wall forming the discharge chamber comprises a bimaterial according to aspects herein. In some aspects, the wall, or inner wall, forming the discharge chamber is formed of a bimaterial according to aspects herein. In some aspects, the discharge chamber wall comprises or is at least partially formed of a bimaterial and wherein the discharge chamber is optionally magnetically shielded (e.g., shielded Hall thruster). In some aspects, the discharge chamber wall comprises or is at least partially formed of a bimaterial and wherein the discharge chamber is optionally not magnetically shielded (e.g., "unshielded" Hall thruster).

Figure 30:
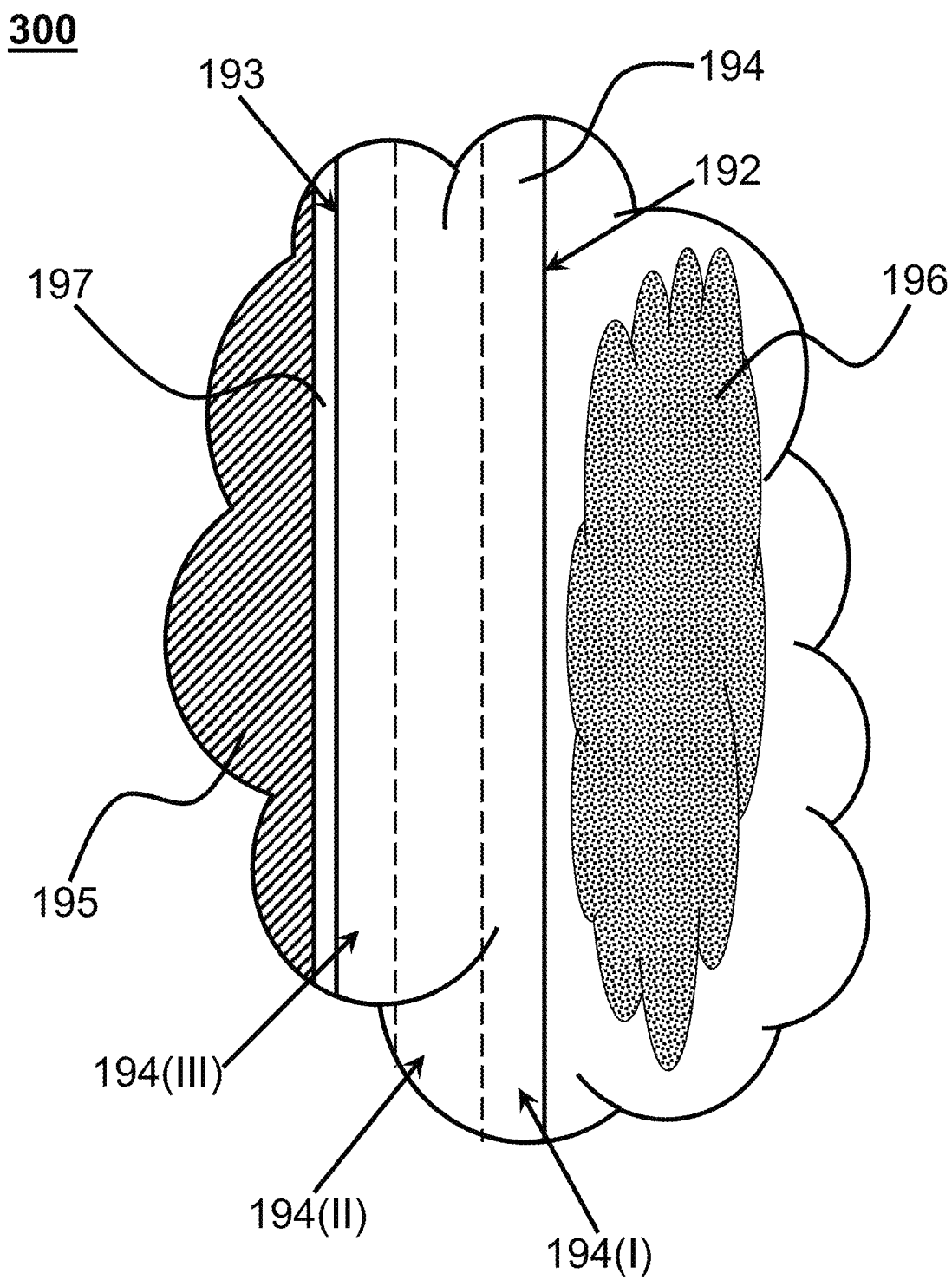
FIG. 30: Schematic showing a portion of discharge chamber inner wall of an exemplary ion thruster, according to some aspects herein, such as the Hall-effect thruster of FIG. 29.

In some aspects, the discharge chamber wall, or inner wall, has a bimaterial, according to aspects herein, such that the hexagonal boron nitride material of the bimaterial faces inward to the discharge chamber, such as, for example, radially inner surface 192 (e.g., see FIGS. 29 and 30), comprising or being at least partially formed of the hexagonal boron nitride material of the bimaterial, according to aspects herein. For example, the hexagonal boron nitride material of a bimaterial may face the ionized gas or plasma in the discharge chamber. In such aspects, the inner surface of the discharge chamber wall may be characterized as having an electrically insulating surface, due to the poor electrical conductivity of hexagonal boron nitride. In certain aspects, a Hall-effect thruster having the hexagonal boron nitride material, of a bimaterial facing, the plasma may be referred to as an insulating wall Hall-effect thruster or a Hall thruster having an insulating or dielectric discharge chamber. In these aforementioned aspects wherein the hexagonal boron nitride material faces the plasma, the hexagonal boron nitride material of the bimaterial optionally provides secondary electron emission (SEE) (i.e., from the wall), which may be useful for stabilizing the plasma in a Hall thruster. In these aforementioned aspects, the discharge chamber is optionally magnetically shielded (e.g., shielded Hall thruster). In these aforementioned aspects, the discharge chamber is optionally not magnetically shielded (e.g., "unshielded" Hall thruster).

In some aspects, the discharge chamber wall, or inner wall, has a bimaterial, according to aspects herein, wherein the graphite material of the bimaterial faces inward to the discharge chamber, such as, for example, radially inner surface 192 comprising or being at least partially formed of the graphite material of the bimaterial, according to aspects herein. For example, the graphite material of a bimaterial may face the ionized gas or plasma in the discharge chamber. In such aspects, the inner surface of the discharge chamber wall may be characterized as having an electrically conducting surface, due to the electrical conductivity of graphite. In certain aspects, a Hall-effect thruster having the graphite material, of a bimaterial facing, the plasma may be referred to as a conductive wall Hall-effect thruster or a Hall thruster having a conductive discharge chamber. In these aforementioned aspects, the discharge chamber is optionally magnetically shielded (e.g., shielded Hall thruster). In these aforementioned aspects, the discharge chamber is optionally not magnetically shielded (e.g., "unshielded" Hall thruster).

In some aspects, the discharge chamber wall or inner wall (or at least portions thereof) comprises or is formed of a bimaterial, according to aspects herein, wherein the outward surface of the discharge chamber wall, the outward surface facing opposite of the plasma or opposite of the discharge chamber cavity, comprises or is at least partially formed (or is entirely formed) of a bimaterial, according to aspects herein, such as said outward surface has the hexagonal boron nitride material, of the bimaterial, facing externally or outward (i.e., opposite the plasma or opposite the discharge chamber cavity). As such, in such latter aspects, the outward facing surface of the discharge chamber wall may be electrically insulating. In aspects, the outward facing surface of the discharge chamber wall faces electrically conductive portion(s) of the magnetic circuit, such as magnetic coils or a ferrous housing. Therefore, having the outward facing surface of the discharge chamber wall formed of the hexagonal boron nitride material provides for electrical insulation next to the magnetic circuit or electrical isolation of the discharge chamber wall from electrically conductive components such as the magnetic circuit, or portions thereof such as a ferrous housing. For example, in some aspects, the discharge chamber wall or outward facing surface thereof may be in directly physical contact with electrically conductive components of the magnetic circuit, such as a magnetic coil or a ferrous housing, where the hexagonal boron nitride material of a bimaterial, according to aspects herein, electrically isolates the discharge chamber or discharge chamber wall from the magnetic circuit. In these aforementioned aspects, the discharge chamber is optionally magnetically shielded (e.g., shielded Hall thruster). In these aforementioned aspects, the discharge chamber is optionally not magnetically shielded (e.g., "unshielded" Hall thruster).

In some aspects, for example, the bimaterial according to aspects herein may be configured with hexagonal boron nitride layers sandwiching the graphite material, or optionally the hexagonal boron nitride material may fully or largely encapsulate the graphite material (e.g., at 3 or more surfaces), such as, optionally, for example, in some aspects, at least 50% (optionally at least 55%, optionally at least 60%, optionally at least 65%, optionally at least 70%, optionally at least 75%, optionally at least 80%, optionally at least 85%, optionally at least 90%, optionally at least 95%, optionally at least 98%, optionally at least 99%, optionally at least 99.5%, optionally 100%) of a graphite material of a bimaterial disclosed herein is encapsulated by hexagonal boron nitride of the same bimaterial. In some aspects, the discharge chamber has a bimaterial such that a hexagonal boron nitride portion or layer of the bimaterial faces the plasma or discharge chamber cavity and a (optionally different) hexagonal boron nitride portion or layer faces the magnetic circuit or portion/component thereof, where a graphite material of the same bimaterial may be provided between the inner and outward surfaces of said discharge chamber wall. In some aspects, the discharge chamber (inner) wall, or at least a portion thereof, comprises or is formed of a bimaterial, according to aspects herein, wherein the outward wall surface facing opposite of the plasma, or opposite of the discharge chamber cavity, comprises or is at least partially formed (or is entirely formed) of a bimaterial, according to aspects herein, such that said outward surface has the hexagonal boron nitride material, of the bimaterial, facing externally or outward (i.e., opposite the plasma or opposite the discharge chamber cavity), and wherein the graphite material of the bimaterial faces inward to the discharge chamber, such as, for example, radially inner surface 192 comprising or being at least partially formed of the graphite material of the bimaterial, according to aspects herein. In these aforementioned aspects, the discharge chamber is optionally magnetically shielded (e.g., shielded Hall thruster). In these aforementioned aspects, the discharge chamber is optionally not magnetically shielded (e.g., "unshielded" Hall thruster).

To visualize certain aspects, such as some aspects described above, FIG. 30 shows a zoomed-in view of portion 300 identified in FIG. 29. Discharge chamber wall 194 has inner radial surface 192, facing plasma 196, and an outer radial surface 193 opposite inner radial surface 192. In some aspects, adjacent to outer radial surface 193 is an electrically conductive material, component, or component portion 195. In aspects, electrically conductive material, component, or component portion 195 is a magnetic circuit or portion thereof such as a magnetic coil or electrically conductive housing, such as optionally ferrous housing 110. Optionally, but not necessarily, a gap 197 separates outer radial surface 193 from portion 195. Optionally, gap 197 is less than 1 cm in width, optionally less than 3 mm in width, optionally less than or equal to 1 mm in width, optionally less than or equal to 500 µm in width, optionally less than or equal to 100 µm in width, optionally less than or equal to 50 µm in width, optionally less than or equal to 10 µm in width. Optionally, gap 197 is absent and optionally outer radial surface 193 is in physical contact with portion 195. Optionally, gap 197 is absent and is instead another material. For illustration, discharge chamber inner wall 194 is shown as having an inner portion 194(I) facing plasma 196, a middle portion 194(II), and an outer portion 194(III) facing conductive portion 195. Typically, ion thrusters or Hall-effect thrusters have either an electrically conductive discharge wall, where all portions 194(I-III) are electrically conductive, or an electrically insulating discharge wall, where all portions 194(I-III) are electrically insulating such as being formed of hexagonal boron nitride. In some aspects disclosed herein, however, discharge chamber inner wall 194 is formed of a bimaterial, according to aspects herein, wherein at least one of portions 194(I), 194(II), and 194(III) is different from at least one other of said portions. In some aspects, for example, inner wall portion 194(I) is formed of a hexagonal boron nitride material of a bimaterial disclosed herein such that inner radial surface 192 is electrically insulating, wherein middle portion 194(II) or both portions 194(II-III) are formed of the graphite material of the same bimaterial. In some aspects, for example, inner wall portion 194(I) is formed of a graphite material of a bimaterial disclosed herein such that inner radial surface 192 is electrically conductive, wherein middle portion 194(II) or both portions 194(II-III) are formed of the hexagonal boron nitride material of the same bimaterial. In some aspects, for example, outer wall portion 194(III) is formed of a hexagonal boron nitride material of a bimaterial disclosed herein such that outer radial surface 193 is electrically insulating, wherein middle portion 194(II) or both portions 194(I-II) are formed of the graphite material of the same bimaterial. In some aspects, for example, outer wall portion 194(III) is formed of a hexagonal boron nitride material of a bimaterial disclosed herein such that outer radial surface 193 is electrically insulating and outer radial surface 193 is in direct physical contact with electrically conductive portion 195. In some aspects, for example, inner wall portion 194(I) is formed of a hexagonal boron nitride material of a bimaterial disclosed herein such that inner radial surface 192 is electrically insulating and outer wall portion 194(III) is formed of a hexagonal boron nitride material of the same bimaterial such that outer radial surface 193 is electrically insulating, wherein middle portion 194(II) is formed of the graphite material of the same bimaterial.

Discussion of Certain Aspects of Using Bimaterials Disclosed Herein in Electric Propulsion Devices Such as Hall-Effect Thrusters—the Cathode:

In some aspects, a cathode of an electric propulsion device, such as a Hall-effect thruster, comprises a bimaterial according to aspects herein. In some aspects, at least one component of a cathode of an electric propulsion device, such as a Hall-effect thruster, comprises a bimaterial according to aspects herein. In some aspects, at least one component of a cathode of an electric propulsion device, such as a Hall-effect thruster, is formed of a bimaterial according to aspects herein.

For example, in some aspects, a bimaterial according to aspects herein may be used on the inside surface of a keeper electrode. The keeper is the component that surrounds the outside of the cathode tube itself, such that optionally the keeper is the part of the component one sees when viewing the cathode externally. The inside surface of the keeper is preferably electrically isolated, in aspects, from other portion(s) of the cathode and/or from the heater that surrounds the cathode. The electrical isolation may be achieved using the hexagonal boron nitride material of the bimaterial. In such aspects, various configurations of the bimaterial may be used. For example, optionally, the bimaterial may be configured with graphite being sandwiched between hexagonal boron nitride or the graphite being encapsulated (e.g., at least 60% encapsulated, at least 70% encapsulated, at least 80% encapsulated, at least 90% encapsulated, at least 95% encapsulated, at least 99% encapsulated, at least 99.9% encapsulated, or 100% encapsulated) by hexagonal boron nitride, thereby allowing the bimaterial to be electrically insulating where needed for a particular application or use thereof.

Discussion of Certain Aspects of Using Bimaterials Disclosed Herein in Electric Propulsion Devices Such as Hall-Effect Thrusters—Other Components:

In some aspects, any portion(s) or component(s) of an electric thruster that is or may be formed of graphite is optionally formed of a bimaterial according to aspects herein. For example, where an electrically conductive surface or graphite surface is needed or may be useful, a bimaterial optionally may be used configured such that the graphite material thereof provides the electrically conductive surface or graphite surface.

In some aspects, any portion(s) or component(s) of an electric thruster that is or may be formed of hexagonal boron nitride is optionally formed of a bimaterial according to aspects herein. For example, where an electrically insulating surface or h-BN surface is needed or may be useful, a bimaterial optionally may be used configured such that the hexagonal boron nitride material thereof provides the electrically insulating surface or h-BN surface. For example, where a monolithic hexagonal boron nitride material is needed or may be useful, a bimaterial according to aspects herein may be employed, wherein the bimaterial is optionally configured with the hexagonal boron nitride portion being as thick or otherwise large as needed, and the graphite portions optionally as thin or otherwise small as needed, to provide the useful hexagonal boron nitride functionality and benefits. For example, optionally, a bimaterial may have hexagonal boron nitride be covering or encapsulating a thin graphite material portion, such that the bimaterial is effectively primarily a hexagonal boron nitride material with a small portion being graphite as substrate or conductive contact, for example. In some aspects, for example, the bimaterial is at least 50% (optionally at least 55%, optionally at least 60%, optionally at least 65%, optionally at least 70%, optionally at least 75%, optionally at least 80%, optionally at least 85%, optionally at least 90%, optionally at least 95%, optionally at least 96%, optionally at least 97%, optionally at least 98%, optionally at least 99%) hexagonal boron nitride by volume with the graphite material being the remainder. In some aspects, for example, the bimaterial is at least 50% (optionally at least 55%, optionally at least 60%, optionally at least 65%, optionally at least 70%, optionally at least 75%, optionally at least 80%, optionally at least 85%, optionally at least 90%, optionally at least 95%, optionally at least 96%, optionally at least 97%, optionally at least 98%, optionally at least 99%) hexagonal boron nitride by mass with the graphite material being the remainder.

In some aspects, any portion(s) or component(s) of an electric thruster that is or may be formed of hexagonal boron nitride is optionally formed of a bimaterial according to aspects herein. For example, where an electrically insulating surface or h-BN surface is needed or may be useful, a bimaterial optionally may be used configured such that the hexagonal boron nitride material thereof provides the electrically insulating surface or h-BN surface.

It will be understood that various modifications from embodiments and aspects described herein may be made without departing from the spirit and scope of the present disclosure. Accordingly, other embodiments are within the scope of the following claims. The examples set forth herein are provided to those of ordinary skill in the art as a complete disclosure and description of how to make and use the embodiments of the disclosure, and are not intended to limit the scope of what the inventor/inventors regard as their disclosure. Modifications of the herein-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

CERTAIN EXEMPLARY ASPECTS AND EMBODIMENTS

Various aspects are contemplated and disclosed herein, several of which are set forth in the paragraphs below. It is explicitly contemplated and disclosed that any aspect or portion thereof can be combined to form an aspect. In addition, it is explicitly contemplated and disclosed that: any reference to Aspect 1 includes reference to Aspects 1a, 1b, 1c, 1d, 1m, and/or 1n, and any combination thereof (i.e., any reference to an aspect includes reference to that aspect's lettered versions). Moreover, the terms "any preceding aspect" and "any one of the preceding aspects" means any aspect that appears prior to the aspect that contains such phrase (for example, the sentence "Aspect 15: The material, device, electrolyte, or method of any preceding Aspect . . . " means that any Aspect prior to Aspect 15 is referenced, including letter versions). For example, it is contemplated and disclosed that, optionally, any composition, method, or formulation of any the below aspects may be useful with or combined with any other aspect provided below. Further, for example, it is contemplated and disclosed that any embodiment or aspect described above may, optionally, be combined with any of the below listed aspects or any portion(s) thereof.

Aspect 1a: An electric propulsion device comprising:
at least one portion comprising or formed of a monolithic bimaterial;
wherein the monolithic bimaterial comprises a graphite material and a hexagonal boron nitride material; and
wherein the graphite material and hexagonal boron nitride material are monolithically integrated in the bimaterial.

Aspect 1b: An electric propulsion device comprising:
a component comprising or formed of a monolithic bimaterial having a graphite material and a hexagonal boron nitride material;
wherein the graphite material and hexagonal boron nitride material are monolithically integrated in the bimaterial;
wherein the hexagonal boron nitride material provides the function of being an electrically insulating layer within the electric propulsion device.

Aspect 1c: An electric propulsion device comprising:
a hollow cathode; and
a discharge chamber containing a plasma of a gaseous propellant;
wherein at least a portion of a wall of the discharge chamber comprises or is formed of a monolithic bimaterial;
wherein the monolithic bimaterial comprises a graphite material and a hexagonal boron nitride material; and
wherein the graphite material and hexagonal boron nitride material are monolithically integrated in the bimaterial.

Aspect 1d: An electric propulsion device comprising:
a cathode; and
an annular anode; and
a discharge chamber containing a plasma of a gaseous propellant;
wherein at least a portion of a wall of the discharge chamber comprises or is formed of a monolithic bimaterial;
wherein the monolithic bimaterial comprises a graphite material and a hexagonal boron nitride material; and
wherein the graphite material and hexagonal boron nitride material are monolithically integrated in the bimaterial.

Aspect 1 e: An Hall-effect thruster comprising:
a hollow cathode; and
a discharge chamber containing a plasma of a gaseous propellant;
wherein at least a portion of a wall of the discharge chamber comprises or is formed of a monolithic bimaterial;
wherein the monolithic bimaterial comprises a graphite material and a hexagonal boron nitride material; and
wherein the graphite material and hexagonal boron nitride material are monolithically integrated in the bimaterial.

Aspect 1f: The electric propulsion device or thruster of any of the preceding Aspects or the method of any of Aspects 44-65, comprising an anode, optionally having an annular configuration.

Aspect 1g: The electric propulsion device or thruster of any of the preceding Aspects or the method of any of Aspects 44-65, comprising a cathode, optionally being a hollow cathode.

Aspect 1h: The electric propulsion device or thruster of any of the preceding Aspects or the method of any of Aspects 44-65, comprising a magnetic circuit for confining electrons to a discharge chamber.

Aspect 1i: The electric propulsion device or thruster of any of the preceding Aspects or the method of any of Aspects 44-65, comprising a discharge chamber, optionally having an annular configuration. Aspect 1j: The electric propulsion device or thruster of any of the preceding Aspects or the method of any of Aspects 44-65, comprising a discharge chamber, optionally having an annular configuration; wherein the discharge chamber is defined by an inner wall comprising the bimaterial; and wherein an inner surface (optionally inner radial surface) of the discharge chamber's inner wall comprises or is formed of the hexagonal boron nitride material of the bimaterial. Aspect 1 k: The electric propulsion device or thruster of any of the preceding Aspects or the method of any of Aspects 44-65, comprising a discharge chamber, optionally having an annular configuration; wherein the discharge chamber is defined by an inner wall comprising the bimaterial; and wherein an inner surface (optionally inner radial surface) of the discharge chamber's inner wall comprises or is formed of the graphite material of the bimaterial. Aspect 1 l: The electric propulsion device or thruster of any of the preceding Aspects or the method of any of Aspects 44-65, comprising a discharge chamber, optionally having an annular configuration; wherein the discharge chamber is defined by an inner wall comprising the bimaterial; and wherein an outer surface (optionally outer radial surface) of the discharge chamber wall inner comprises or is formed of the hexagonal boron nitride material of the bimaterial.

Aspect 1 m: The electric propulsion device or thruster of any of the preceding Aspects or the method of any of Aspects 44-65, comprising a cathode, optionally being a hollow cathode; wherein the cathode comprises the bimaterial or wherein a portion of the cathode or component thereof is formed of the bimaterial.

Aspect 1 n: The electric propulsion device or thruster of any of the preceding Aspects or the method of any of Aspects 44-65, wherein the bimaterial provides a benefit to the operability of the electric propulsion device.

Aspect 2: The electric propulsion device or thruster of any of the preceding Aspects or the method of any of Aspects 44-65, wherein the hexagonal boron nitride material provides the function of being an electrically insulating layer in the electric propulsion device.

Aspect 3: The electric propulsion device or thruster of any of the preceding Aspects or the method of any of Aspects 44-65, wherein the hexagonal boron nitride material electrically isolates:
  a first electrically conductive portion or component of the device from a second electrically conductive portion or component,
  at least one electrically conductive portion or component of the device from a cathodically-biased portion of the device,
  an anodically-biased portion from a cathodically-biased portion of the device;
  a portion of an anode or an anodically-biased portion from a magnetic circuit of the device; and/or
  a wall of a discharge chamber or a portion of the wall from the magnetic circuit of the device.

Aspect 4: The electric propulsion device or thruster of any of the preceding Aspects or the method of any of Aspects 44-65, wherein the hexagonal boron nitride material electrically isolates the graphite material for at least one other electrically conductive portion or component of the device.

Aspect 5: The electric propulsion device or thruster of any of the preceding Aspects comprising a discharge chamber having a plasma maintained therein; wherein the discharge chamber comprises a wall having a first surface facing the plasma and a second surface opposite the first surface; wherein at least a portion of a wall of the discharge chamber comprises or is formed of the bimaterial.

Aspect 6: The electric propulsion device or thruster of any of the preceding Aspects or the method of any of Aspects 44-65, wherein at least a portion of the first surface of the wall comprises the graphite material such that the graphite material of the bimaterial faces the plasma.

Aspect 7: The electric propulsion device or thruster of any of the preceding Aspects or the method of any of Aspects 44-65, wherein at least a portion of the first surface of the wall comprises the hexagonal boron nitride such that the hexagonal boron nitride material of the bimaterial faces the plasma.

Aspect 8: The electric propulsion device or thruster of any of the preceding Aspects or the method of any of Aspects 44-65, wherein the hexagonal boron nitride material undergoes secondary electron emission due to interaction with the plasma within the discharge chamber.

Aspect 9: The electric propulsion device or thruster of any of the preceding Aspects or the method of any of Aspects 44-65, wherein at least a portion of the second surface of the wall comprises the hexagonal boron nitride material.

Aspect 10: The electric propulsion device or thruster of any of the preceding Aspects or the method of any of Aspects 44-65, wherein the second surface of the wall comprises the hexagonal boron nitride material; and wherein the hexagonal boron nitride material is configured to electrically isolate the graphite material from an electrically conductive portion of another component of the device.

Aspect 11: The electric propulsion device or thruster of any of the preceding Aspects or the method of any of Aspects 44-65, wherein the another component is a magnetic circuit or a portion of the magnetic circuit of the device.

Aspect 12: The electric propulsion device or thruster of any of the preceding Aspects or the method of any of Aspects 44-65, wherein the device is characterized as a magnetically shielded conductive wall thruster or wherein the first surface of the wall of the discharge chamber is electrically conductive and the device comprise magnetic shielding to minimize erosion of the wall of the discharge chamber.

Aspect 13: The electric propulsion device or thruster of any of the preceding Aspects comprising a hollow cathode and wherein the plasma comprises ions of a gaseous propellant. Optionally, the propellant gas comprises xenon, krypton, neon, argon, hydrogen, hydrazine, lithium, bismuth, iodine, magnesium, zinc, adamantine, or any combination of these. Optionally, the propellant gas comprises xenon, krypton, neon, argon, or any combination of these.

Aspect 14: The electric propulsion device or thruster of any of the preceding Aspects being a solar electric propulsion (SEP) device, an ion thruster, a Hall-effect thruster, a gridded ion thruster, a magnetoplasmadynamic (MPD) thruster, any variation thereof, or any combination thereof.

Aspect 15: The electric propulsion device or thruster of any of the preceding Aspects or the method of any of Aspects 44-65, wherein a plurality of distinct portions of the device comprise said bimaterial.

Aspect 16: The electric propulsion device or thruster of any of the preceding Aspects or the method of any of Aspects 44-65, wherein the bimaterial comprises a first surface formed of the graphite material and a second surface formed of the hexagonal boron nitride material, the first surface being opposite of the second surface.

Aspect 17: The electric propulsion device or thruster of any of the preceding Aspects or the method of any of Aspects 44-65, wherein the bimaterial comprises a first surface formed of the graphite material and a second surface formed of the graphite material, the first surface being opposite of the second surface; wherein the graphite material is between the first and second surfaces.

Aspect 18: The electric propulsion device or thruster of any of the preceding Aspects or the method of any of Aspects 44-65, wherein the graphite material and hexagonal boron nitride material are connected via a continuous atomic structure.

Aspect 19: The electric propulsion device or thruster of any of the preceding Aspects or the method of any of Aspects 44-65, wherein the graphite material and hexagonal boron nitride material are connected via a monolithic heterointerface.

Aspect 20: The electric propulsion device or thruster of any of the preceding Aspects or the method of any of Aspects 44-65, wherein an interface between the graphite material and the hexagonal boron nitride material is coherent or semicoherent.

Aspect 21: The electric propulsion device or thruster of any of the preceding Aspects or the method of any of Aspects 44-65, wherein the graphite material and the hexagonal boron nitride material are connected via an interface layer therebetween; wherein the interface layer comprises C, B, and N.

Aspect 22: The electric propulsion device or thruster of any of the preceding Aspects or the method of any of Aspects 44-65, wherein the interface layer comprises a combination of graphite and boron nitride.

Aspect 23a: The electric propulsion device or thruster of any of the preceding Aspects or the method of any of Aspects 44-65, wherein the interface layer has a thickness less than or equal to approximately 200 µm, optionally less than or equal to approximately 150 µm, optionally less than or equal to approximately 125 µm, optionally less than or equal to approximately 100 µm, optionally less than or equal to approximately 95 µm, optionally less than or equal to approximately 90 µm, optionally less than or equal to approximately 75 µm, optionally less than or equal to approximately 60 µm, optionally less than or equal to approximately 50 µm, optionally less than or equal to approximately 45 µm, optionally less than or equal to approximately 40 µm, optionally less than or equal to approximately 30 µm, optionally less than or equal to approximately 20 µm, optionally less than or equal to approximately 15 µm, optionally less than or equal to approximately 10 µm, optionally less than or equal to approximately 5 µm, optionally less than or equal to approximately 1 µm, optionally less than or equal to approximately 500 nm. Aspect 23b: The electric propulsion device or thruster of any of the preceding Aspects or the method of any of Aspects 44-65, wherein the interface layer has a thickness selected from the range of approximately 100 nm to approximately 100 µm, wherein any range and value therebetween is explicitly contemplated and disclosed herein.

Aspect 24a: The electric propulsion device or thruster of any of the preceding Aspects or the method of any of Aspects 44-65, wherein the interface layer is free of oxide materials (such as but not limited to $B_2O_3$) and carbide compositions (such as but not limited to boron carbide) or comprises less than approximately 0.005 mol/cm$^3$ of oxide and carbide compositions. Aspect 24b: The electric propulsion device or thruster of any of the preceding Aspects or the method of any of Aspects 44-65, wherein the interface layer is free of oxide materials (such as but not limited to $B_2O_3$) and carbide compositions (such as but not limited to boron carbide) or comprises less than approximately 0.1 mol/cm$^3$ of oxide and carbide compositions, optionally comprises less than or equal to approximately 0.09 mol/cm$^3$ of oxide and carbide compositions, optionally comprises less than or equal to approximately 0.08 mol/cm$^3$ of oxide and carbide compositions, optionally comprises less than or equal to approximately 0.05 mol/cm$^3$ of oxide and carbide compositions, optionally comprises less than approximately 0.03 mol/cm$^3$ of oxide and carbide compositions, optionally comprises less than or equal to approximately 0.02 mol/cm$^3$ of oxide and carbide compositions, optionally comprises less than approximately 0.01 mol/cm$^3$ of oxide and carbide compositions, optionally comprises less than or equal to approximately 0.009 mol/cm$^3$ of oxide and carbide compositions, optionally comprises less than or equal to approximately 0.008 mol/cm$^3$ of oxide and carbide compositions, optionally comprises less than approximately 0.007 mol/cm$^3$ of oxide and carbide compositions, optionally comprises less than or equal to approximately 0.005 mol/cm$^3$ of oxide and carbide compositions, optionally comprises less than or equal to approximately 0.004 mol/cm$^3$ of oxide and carbide compositions, optionally comprises less than or equal to approximately 0.001 mol/cm$^3$ of oxide and carbide compositions.

Aspect 25a: The electric propulsion device or thruster of any of the preceding Aspects or the method of any of Aspects 44-65, wherein the interface layer is free of boron carbide or comprises less than 0.005 mol/cm$^3$ of boron carbide. Aspect 25b: The electric propulsion device or thruster of any of the preceding Aspects or the method of any of Aspects 44-65, wherein the interface layer is free of boron carbide or comprises less than approximately 0.1 mol/cm$^3$ of boron carbide, optionally comprises less than or equal to approximately 0.09 mol/cm$^3$ of boron carbide, optionally comprises less than or equal to approximately 0.08 mol/cm$^3$ of boron carbide, optionally comprises less than or equal to approximately 0.05 mol/cm$^3$ of boron carbide, optionally comprises less than approximately 0.03 mol/cm$^3$ of boron carbide, optionally comprises less than or equal to approximately 0.02 mol/cm$^3$ of boron carbide, optionally comprises less than approximately 0.01 mol/cm$^3$ of boron carbide, optionally comprises less than or equal to approximately 0.009 mol/cm$^3$ of boron carbide, optionally comprises less than or equal to approximately 0.008 mol/cm$^3$ of boron carbide, optionally comprises less than approximately 0.007 mol/cm$^3$ of boron carbide, optionally comprises less than or equal to approximately 0.005 mol/cm$^3$ of boron carbide, optionally comprises less than or equal to approximately 0.004 mol/cm$^3$ of boron carbide, optionally comprises less than or equal to approximately 0.001 mol/cm$^3$ of boron carbide.

Aspect 26: The electric propulsion device or thruster of any of the preceding Aspects or the method of any of Aspects 44-65, wherein the hexagonal boron nitride material covers or encapsulates at least a portion of the graphite material.

Aspect 27: The electric propulsion device or thruster of any of the preceding Aspects or the method of any of Aspects 44-65, wherein the hexagonal boron nitride material covers or encapsulates at least a portion of the graphite material such that the graphite material is not in electrical communication with a magnetic circuit of the device.

Aspect 28: The electric propulsion device or thruster of any of the preceding Aspects or the method of any of Aspects 44-65, wherein the hexagonal boron nitride material covers or encapsulates at least a portion of the graphite material such that the graphite material is not exposed to a propellant gas, a vacuum, air, and/or oxygen gas.

Aspect 29: The electric propulsion device or thruster of any of the preceding Aspects or the method of any of Aspects 44-65, wherein the hexagonal boron nitride material has a thickness greater than or equal to 50 µm.

Aspect 30a: The electric propulsion device or thruster of any of the preceding Aspects or the method of any of Aspects 44-65, wherein the hexagonal boron nitride material has a thickness selected from the range of approximately 40 µm to approximately 5000 µm. Aspect 30b: The electric propulsion device or thruster of any of the preceding Aspects or the method of any of Aspects 44-65, wherein the hexagonal boron nitride material has a thickness selected from the range of approximately 40 µm to approximately 5000 µm, wherein any range and value therebetween is explicitly contemplated and disclosed, such as but not limited to, optionally the range of approximately 50 µm to approximately 5000 µm, optionally the range of approximately 80 µm to approximately 5000 µm, optionally the range of approximately 90 µm to approximately 5000 µm, optionally the range of approximately 100 µm to approximately 5000 µm, optionally the range of approximately 120 µm to approximately 5000 µm, optionally the range of approximately 150 µm to approximately 5000 µm, optionally the range of approximately 175 µm to approximately 5000 µm, optionally the range of approximately 200 µm to approximately 5000 µm, optionally the range of approximately 250 µm to approximately 5000 µm, optionally the range of approximately 300 µm to approximately 5000 µm, optionally the range of approximately 350 µm to approximately 5000 µm, optionally the range of approximately 400 µm to approximately 5000 µm, optionally the range of approximately 450 µm to approximately 5000 µm, optionally the range of approximately 500 µm to approximately 5000 µm, optionally the range of approximately 550 µm to approximately 5000 µm, optionally the range of approximately 600 µm to approximately 5000 µm, optionally the range of approximately 1000 µm to approximately 5000 µm, optionally the range of approximately 40 µm to approximately 1000 µm, optionally the range of approximately 80 µm to approximately 1000 µm, optionally the range of approximately 100 µm to approximately 1000 µm. Aspect 30c: The electric propulsion device or thruster of any of the preceding Aspects or the method of any of Aspects 44-65, wherein the hexagonal boron nitride material has a thickness selected from the range of approximately 40 µm to approximately 2 cm, wherein any range and value therebetween is explicitly contemplated and disclosed, such as but not limited to, optionally the range of approximately 40 µm to approximately 1 cm.

Aspect 31a: The electric propulsion device or thruster of any of the preceding Aspects or the method of any of Aspects 44-65, wherein the hexagonal boron nitride material is free of oxide and carbide compositions or comprises less than approximately 0.001 mol/cm$^3$ of oxide and carbide compositions. Aspect 31b: The electric propulsion device or thruster of any of the preceding Aspects or the method of any of Aspects 44-65, wherein the hexagonal boron nitride material is free of oxide and carbide compositions or comprises less than approximately 0.05 mol/cm$^3$ of oxide and carbide compositions, optionally comprises less than or equal to approximately 0.04 mol/cm$^3$ of oxide and carbide compositions, optionally comprises less than or equal to approximately 0.02 mol/cm$^3$ of oxide and carbide compositions, optionally comprises less than or equal to approximately 0.01 mol/cm$^3$ of oxide and carbide compositions, optionally comprises less than approximately 0.009 mol/cm$^3$ of oxide and carbide compositions, optionally comprises less than or equal to approximately 0.008 mol/cm$^3$ of oxide and carbide compositions, optionally comprises less than approximately 0.007 mol/cm$^3$ of oxide and carbide compositions, optionally comprises less than or equal to approximately 0.006 mol/cm$^3$ of oxide and carbide compositions, optionally comprises less than or equal to 0.005 mol/cm$^3$ of oxide and carbide compositions, optionally comprises less than approximately 0.004 mol/cm$^3$ of oxide and carbide compositions, optionally comprises less than or equal to 0.003 mol/cm$^3$ of oxide and carbide compositions, optionally comprises less than or equal to 0.002 mol/cm$^3$ of oxide and carbide compositions, optionally comprises less than or equal to 0.001 mol/cm$^3$ of oxide and carbide compositions.

Aspect 32a: The electric propulsion device or thruster of any of the preceding Aspects or the method of any of Aspects 44-65, wherein the boron nitride material is free of boron carbide or comprises less than 0.001 mol/cm$^3$ of boron carbide. Aspect 31b: The electric propulsion device or thruster of any of the preceding Aspects or the method of any of Aspects 44-65, wherein the hexagonal boron nitride material is free of oxide and carbide compositions or comprises less than approximately 0.05 mol/cm$^3$ of boron carbide, optionally comprises less than or equal to approximately 0.04 mol/cm$^3$ of boron carbide, optionally comprises less than or equal to approximately 0.02 mol/cm$^3$ of boron carbide, optionally comprises less than or equal to approximately 0.01 mol/cm$^3$ of boron carbide, optionally comprises less than approximately 0.009 mol/cm$^3$ of boron carbide, optionally comprises less than or equal to approximately 0.008 mol/cm$^3$ of boron carbide, optionally comprises less than approximately 0.007 mol/cm$^3$ of boron carbide, optionally comprises less than or equal to approximately 0.006 mol/cm$^3$ of boron carbide, optionally comprises less than or equal to approximately 0.005 mol/cm$^3$ of boron carbide, optionally comprises less than approximately 0.004 mol/cm$^3$ of boron carbide, optionally comprises less than or equal to approximately 0.003 mol/cm$^3$ of boron carbide, optionally comprises less than or equal to approximately 0.002 mol/cm$^3$ of boron carbide, optionally comprises less than or equal to approximately 0.001 mol/cm³ of boron carbide.

Aspect 33: The electric propulsion device or thruster of any of the preceding Aspects or the method of any of Aspects 44-65, wherein the hexagonal boron nitride material is substantially free of graphite.

Aspect 34a: The electric propulsion device or thruster of any of the preceding Aspects or the method of any of Aspects 44-65, wherein the hexagonal boron nitride material has a work function of 5.74 eV±0.50 eV. Aspect 34b: The electric propulsion device or thruster of any of the preceding Aspects The device of any one of the preceding claims, wherein the hexagonal boron nitride material has an electrical resistivity greater than or equal to approximately $1 \cdot 10^{14}$ Ωcm at 25° C. Aspect 34c: The electric propulsion device or thruster of any of the preceding Aspects The device of any one of the preceding claims, wherein the hexagonal boron nitride material has an electrical resistivity greater than or equal to approximately $1 \cdot 10^{13}$ Ωcm at 25° C., optionally greater than or equal to approximately $1 \cdot 10^{13}$ Ωcm, optionally greater than or equal to approximately $1.5 \cdot 10^{13}$ Ωcm, optionally greater than or equal to approximately $2 \cdot 10^{13}$ Ωcm, optionally greater than or equal to approximately $5 \cdot 10^{13}$ Ωcm, optionally greater than or equal to approximately $1 \cdot 10^{13}$ Ωcm, optionally greater than or equal to approximately $1 \cdot 10^{14}$ Ωcm, optionally greater than or equal to approximately $1.5 \cdot 10^{14}$ Ωcm, optionally greater than or equal to approximately $2 \cdot 10^{14}$ Ωcm, optionally greater than or equal to approximately $5 \cdot 10^{14}$ Ωcm, optionally greater than or equal to approximately $1 \cdot 10^{15}$ Ωcm at 25° C. Aspect 34d: The electric propulsion device or thruster of any of the preceding Aspects or the method of any of Aspects 44-65, wherein the hexagonal boron nitride material of the bimaterial has an emissivity within 20% of bulk hexagonal boron nitride at equivalent conditions, such as at 25° C. and 1 atm. Aspect 34e: The electric propulsion device or thruster of any of the preceding Aspects or the method of any of Aspects 44-65, wherein the hexagonal boron nitride material of the bimaterial has an electrical resistivity, work function, emissivity, hardness, dielectric strength, thermal shock resistance, refractoriness, refractive index, machinability, density, secondary-ion erosion resistance, heat capacity, thermal conductivity, dielectric constant, or any combination thereof within 20% of bulk hexagonal boron nitride according to published value(s) at equivalent conditions, such as at 25° C. and 1 atm. Aspect 34f: The electric propulsion device or thruster of any of the preceding Aspects or the method of any of Aspects 44-65, wherein the hexagonal boron nitride material of the bimaterial has an electrical resistivity, work function, emissivity, hardness, dielectric strength, thermal shock resistance, refractoriness, refractive index, machinability, density, secondary-ion erosion resistance, heat capacity, thermal conductivity, dielectric constant, or any combination thereof within 10% of bulk hexagonal boron nitride according to published value(s) at equivalent conditions, such as at 25° C. and 1 atm. Aspect 34g: The electric propulsion device or thruster of any of the preceding Aspects or the method of any of Aspects 44-65, wherein the hexagonal boron nitride material of the bimaterial has an electrical resistivity, work function, emissivity, hardness, dielectric strength, thermal shock resistance, refractoriness, refractive index, machinability, density, secondary-ion erosion resistance, heat capacity, thermal conductivity, dielectric constant, or any combination thereof within 5% of bulk hexagonal boron nitride according to published value(s) at equivalent conditions, such as at 25° C. and 1 atm.

Aspect 35a: The electric propulsion device or thruster of any of the preceding Aspects or the method of any of Aspects 44-65, wherein the graphite material has a molar purity, a mass purity, or both a molar purity and mass purity greater than or equal to 95%, preferably greater than or equal to 96%, preferably greater than or equal to 97%, preferably greater than or equal to 98%, optionally greater than or equal to 98.5%, optionally greater than or equal to 99%, optionally greater than or equal to 99.1%, optionally greater than or equal to 99.5%, optionally greater than or equal to 99.9%, optionally greater than or equal to 99.95% optionally greater than or equal to 99.99%. Aspect 35b: The electric propulsion device or thruster of any of the preceding Aspects or the method of any of Aspects 44-65, wherein the graphite material has an impurity concentration less than or equal to approximately 2000 ppm by mass and/or by moles, optionally less than or equal to approximately 1500 ppm by mass and/or by moles, optionally less than or equal to approximately 1250 ppm by mass and/or by moles, optionally less than or equal to approximately 1000 ppm by mass and/or by moles, optionally less than or equal to approximately 900 ppm by mass and/or by moles, optionally less than or equal to approximately 800 ppm by mass and/or by moles, optionally less than or equal to approximately 700 ppm by mass and/or by moles, optionally less than or equal to approximately 600 ppm by mass and/or by moles, optionally less than or equal to approximately 500 ppm by mass and/or by moles, optionally less than or equal to approximately 400 ppm by mass and/or by moles, optionally less than or equal to approximately 300 ppm by mass and/or by moles, optionally less than or equal to approximately 200 ppm by mass and/or by moles, optionally less than or equal to approximately 100 ppm by mass and/or by moles, optionally less than or equal to approximately 50 ppm by mass and/or by moles, optionally selected from the range of approximately 100 ppm to approximately 2000 ppm by mass and/or by moles, optionally selected from the range of approximately 100 ppm to approximately 1000 ppm by mass and/or by moles, optionally selected from the range of approximately 100 ppm to approximately 500 ppm by mass and/or by moles.

Aspect 36a: The electric propulsion device or thruster of any of the preceding Aspects or the method of any of Aspects 44-65, wherein the graphite material has an electrical conductivity greater than or equal to 400 $\Omega^{-1}$ cm$^{-1}$ or selected from the range of approximately 400 $\Omega^{-1}$ cm$^{-1}$ to approximately 3000 $\Omega^{-1}$ cm$^{-1}$. Aspect 36b: The electric propulsion device or thruster of any of the preceding Aspects or the method of any of Aspects 44-65, wherein the graphite material has an electrical conductivity greater than or equal to approximately 400 $\Omega^{-1}$ cm$^{-1}$, optionally greater than or equal to approximately 500 $\Omega^{-1}$ cm$^{-1}$, optionally greater than or equal to approximately 600 $\Omega^{-1}$ cm$^{-1}$, optionally greater than or equal to approximately 700 $\Omega^{-1}$ cm$^{-1}$, optionally greater than or equal to approximately 800 $\Omega^{-1}$ cm$^{-1}$, optionally greater than or equal to approximately 900 $\Omega^{-1}$ cm$^{-1}$, or selected from the range of approximately 400 $\Omega^{-1}$ cm$^{-1}$ to approximately 900 $\Omega^{-1}$ cm$^{-1}$. For example, electrical resistivity of graphite may be measured using ASTM Standard C611 and/or Research & Development—Analytical Services Laboratory Instruction (TDI) 4.1.1.2.

Aspect 37: The electric propulsion device or thruster of any of the preceding Aspects or the method of any of Aspects 44-65, wherein the graphite material is substantially free of boron nitride.

Aspect 38: The electric propulsion device or thruster of any of the preceding Aspects or the method of any of Aspects 44-65, wherein the graphite material has a density selected from the range of approximately 1.6 g/cm$^3$ to approximately 2.26 g/cm$^3$, optionally selected from the range of approximately 1.6 g/cm$^3$ to approximately 2 g/cm$^3$, selected from the range of approximately 1.6 g/cm$^3$ to approximately 1.9 g/cm$^3$. For example, density of graphite may be measured using ASTM Standard C559 and/or Research & Development—Analytical Services Laboratory Instruction (TDI) 4.1.1.1.

Aspect 39: The electric propulsion device or thruster of any of the preceding Aspects or the method of any of Aspects 44-65, wherein the graphite material has a thickness selected from the range of approximately 0.1 cm to approximately 100 cm, wherein any range and value therebetween is explicitly contemplated and disclosed, such as optionally selected from the range of approximately 0.5 cm to approximately 100 cm.

Aspect 40a: The electric propulsion device or thruster of any of the preceding Aspects or the method of any of Aspects 44-65, wherein at least one portion of the device formed of the bimaterial has at least one dimension greater than or equal to approximately 1 cm and/or the bimaterial portion has a volume greater than or equal to approximately 0.1 cm$^3$. Aspect 40b: The electric propulsion device or thruster of any of the preceding Aspects or the method of any of Aspects 44-65, wherein at least one portion of the device formed of the bimaterial has at least one dimension greater than or equal to approximately 1 cm, optionally greater than or equal to approximately 2 cm, optionally greater than or equal to approximately 3 cm, optionally greater than or equal to approximately 4 cm, optionally greater than or equal to approximately 5 cm, optionally greater than or equal to approximately 6 cm, optionally greater than or equal to approximately 7 cm, optionally greater than or equal to approximately 8 cm, optionally greater than or equal to approximately 9 cm, optionally greater than or equal to approximately 10 cm. Aspect 40c: The electric propulsion device or thruster of any of the preceding Aspects or the method of any of Aspects 44-65, wherein at least one portion of the device formed of the bimaterial has a volume greater than or equal to approximately 0.1 cm$^3$, optionally greater than or equal to approximately 0.2 cm$^3$, optionally greater than or equal to approximately 0.3 cm$^3$, optionally greater than or equal to approximately 0.5 cm$^3$, optionally greater than or equal to approximately 0.7 cm$^3$, optionally greater than or equal to approximately 0.8 cm$^3$, optionally greater than or equal to approximately 0.9 cm$^3$, optionally greater than or equal to approximately 1 cm$^3$, optionally greater than or equal to approximately 2 cm$^3$, optionally greater than or equal to approximately 3 cm$^3$, optionally greater than or equal to approximately 4 cm$^3$, optionally greater than or equal to approximately 5 cm$^3$, optionally greater than or equal to approximately 6 cm$^3$, optionally greater than or equal to approximately 7 cm$^3$, optionally greater than or equal to approximately 8 cm$^3$, optionally greater than or equal to approximately 9 cm$^3$, optionally greater than or equal to approximately 10 cm$^3$.

Aspect 41a: The electric propulsion device or thruster of any of the preceding Aspects or the method of any of Aspects 44-65, wherein the graphite material of the bimaterial portion has a thermal shock resistance parameter $k\sigma_f/E\alpha$ selected from the range of approximately 10,000 to approximately $1\cdot10^6$ Wm$^{-1}$, wherein any value and range therebetween is explicitly contemplated and disclosed, and/or a thermal shock resistance parameter $\sigma_f/E\alpha$ selected from the range of approximately 300 K to approximately 7000 K, wherein any value and range therebetween is explicitly contemplated and disclosed, wherein E is the elastic modulus, a is the coefficient of thermal expansion, k is the thermal conductivity, and $\sigma_f$ is the fracture strength. Aspect 42b: The electric propulsion device or thruster of any of the preceding Aspects or the method of any of Aspects 44-65, wherein the hexagonal boron nitride material of the bimaterial portion has a thermal shock resistance parameter $k\sigma_f/E\alpha$ selected from the range of approximately 3000 to approximately 50,000 Wm$^{-1}$, wherein any value and range therebetween is explicitly contemplated and disclosed, and/or a thermal shock resistance parameter $\sigma_f/E\alpha$ selected from the range of approximately 130 K to approximately 1800 K, wherein any value and range therebetween is explicitly contemplated and disclosed, wherein E is the elastic modulus, a is the coefficient of thermal expansion, k is the thermal conductivity, and $\sigma_f$ is the fracture strength. Additional details and techniques regarding thermal shock resistance is found in the following reference, which is incorporated herein by reference: T. J. Lu, and N. A. Fleck, The Thermal Shock Resistance of Solids, *Acta Materialia*, 46 13, 4755-68 (1998). It is contemplated that the values of the thermal shock resistance parameters will depend on material density and porosity. In aspects, for example, thermal shock resistance parameter $k\sigma_f/E\alpha$ may be lower and thermal shock resistance parameter $\sigma_f/E\alpha$ may be higher for more porous or less dense materials.

Aspect 42: The electric propulsion device or thruster of any of the preceding Aspects or the method of any of Aspects 44-65, wherein the bimaterial portion is substantially free of macrofractures and microfractures.

Aspect 43: The electric propulsion device or thruster of any of the preceding Aspects or the method of any of Aspects 44-65, wherein the bimaterial portion is substantially free of macrofractures and microfractures after at least 5, preferably at least 10, optionally at least 20, optionally at least 100, thermal cycles between approximately 25° C. and approximately 250° C. at a rate of approximately 3.75° C./min with approximately 30 minute hold time at approximately 250° C. It is noted that robustness of the material under operating conditions is assessed using the profilometry measurements and microstructure assessments as described herein, which, for example, involves analyzing the sample before the thruster test (e.g., measuring the roughness of the surface before the test) and then re-analyzing afterwards to determine how the surface has altered and how the material performed under the thruster conditions.

Aspect 44: A method of making a monolithic bimaterial, the method comprising:
converting a portion of a graphite material into a hexagonal boron nitride material via a carbothermic reaction;
wherein the monolithic bimaterial comprises the graphite material and the hexagonal boron nitride material;
wherein the carbothermic reaction occurs at a temperature greater than or equal to 1500° C.

Aspect 45: The method the preceding Aspect, wherein the graphite material is exposed to liquid $B_2O_3$, gaseous $B_2O_3$, or both during the carbothermic reaction.

Aspect 46: The method of any of the preceding Aspects, wherein the graphite material is exposed to gaseous $B_2O_3$ and is not exposed to liquid $B_2O_3$ during the carbothermic reaction.

Aspect 47a: The method of any of the preceding Aspects, wherein the carbothermic reaction occurs for a time greater than or equal to approximately 3 hours.

Aspect 47b: The method of any of the preceding Aspects, wherein the carbothermic reaction occurs for a time greater than or equal to approximately 12 hours. Aspect 47c: The method of any of the preceding Aspects, wherein the carbothermic reaction occurs for a time selected from the range of 3 hours to 24 hours. Generally, longer carbothermic reaction time yields greater thickness of the hexagonal boron nitride. Large thicknesses (e.g., greater than 100 μm) may be desired for some applications to help ensure both adequate coverage of the electrically conductive graphite and so that the exposed hexagonal boron nitride of the bimaterial has one or more properties of interest being equal to or within 20% of the corresponding one or more properties of bulk hexagonal boron nitride.

Aspect 48: The method of any of the preceding Aspects, wherein the graphite material is exposed to $N_2$ gas and/or a different source of N such as but not limited to $NH_3$ and/or urea during the carbothermic reaction.

Aspect 49: The method of any of the preceding Aspects, wherein the carbothermic reaction is characterized by equation EQ1:

$$B_2O_3 + 3C + N_2 \rightarrow 2BN + 3CO \qquad (EQ1).$$

Aspect 50: The method of any of the preceding Aspects, wherein the carbothermic reaction occurs at a temperature selected from the range of 1500° C. to 1800° C.

Aspect 51: The method of any of the preceding Aspects wherein graphite material is not entirely converted to hexagonal boron nitride such that the mass of the converted portion of the graphite material is less than that of the starting graphite material.

Aspect 52: The method of any of the preceding Aspects, wherein the bimaterial comprises the hexagonal boron nitride material covering at least a portion of or fully encapsulating the graphite material.

Aspect 53: The method of any of the preceding Aspects, wherein bimaterial comprises the hexagonal boron nitride material having a thickness greater than or equal to 50 μm.

Aspect 54: The method of any of the preceding Aspects, wherein bimaterial comprises the graphite material and hexagonal boron nitride material being connected via a coherent or semicoherent monolithic heterointerface.

Aspect 55: The method of any of the preceding Aspects, wherein the bimaterial comprises the graphite material and the hexagonal boron nitride material being connected via an interface layer therebetween; wherein the interface layer comprises C, B, and N.

Aspect 56: The method of any of the preceding Aspects, wherein the interface layer comprises a combination of graphite and boron nitride.

Aspect 57a: The method of any of the preceding Aspects, wherein the interface layer has a thickness less than or equal to 200 μm, optionally less than or equal to 150 μm, optionally less than or equal to 125 μm, optionally less than or equal to 100 μm, optionally less than or equal to 95 μm, optionally less than or equal to 90 μm, optionally less than or equal to 75 μm, optionally less than or equal to 60 μm, optionally less than or equal to 50 μm, optionally less than or equal to 45 μm, optionally less than or equal to 40 μm, optionally less than or equal to 30 μm, optionally less than or equal to 20 μm, optionally less than or equal to 15 μm, optionally less than or equal to 10 μm, optionally less than or equal to 5 μm, optionally less than or equal to 1 μm, optionally less than or equal to 500 nm. Aspect 57b: The electric propulsion device or thruster of any of the preceding Aspects, wherein the interface layer has a thickness selected from the range of 100 nm to 100 μm, wherein any range and value therebetween is explicitly contemplated and disclosed herein.

Aspect 58: The method of any of the preceding Aspects, wherein the bimaterial comprises the hexagonal boron nitride material being free of oxide and carbide compositions or comprises less than approximately 0.001 mol/cm$^3$ of oxide and carbide compositions.

Aspect 59: The method of any of the preceding Aspects, wherein the bimaterial comprises the hexagonal boron nitride material being substantially free of graphite.

Aspect 60: The method of any of the preceding Aspects, wherein the bimaterial has at least one dimension greater than or equal to approximately 1 cm and/or the bimaterial portion has a volume greater than or equal to approximately 0.1 cm$^3$.

Aspect 61: The method of any of the preceding Aspects, wherein the bimaterial comprises the graphite material being substantially free of boron nitride.

Aspect 62: The method of any of the preceding Aspects, wherein the bimaterial comprises the hexagonal boron nitride being free of macrofractures and microfractures.

Aspect 63: The method of any of the preceding Aspects, wherein the resulting bimaterial is according to any one of Aspects 16-43 or any combination of Aspects 16-43.

Aspect 64: The electric propulsion device or thruster or the method of any of the preceding Aspects, wherein the graphite material or at least a portion thereof has an a lattice constant of approximately 2.46 Å, optionally approximately 2.5±0.1 Å, and/or a c lattice constant of approximately 6.71 Å, optionally approximately 6.7±0.1 Å.

Aspect 65: The electric propulsion device or thruster or the method of any of the preceding Aspects, wherein the hexagonal boron nitride material or at least a portion thereof has an a lattice constant of approximately 2.50 Å, optionally approximately 2.5±0.1 Å, and/or a c lattice constant of approximately 6.66 Å, optionally approximately 6.7±0.1 Å.

Aspect 66: The electric propulsion device or thruster or the method of any of the preceding Aspects, wherein the graphite material is sandwiched between or positioned between the hexagonal boron nitride material. For example, optionally, the graphite material is in the form of a layer between two layers of the hexagonal boron nitride material.

Aspect 67a: The electric propulsion device or thruster or the method of any of the preceding Aspects, wherein the graphite material is encapsulated the hexagonal boron nitride material. Aspect 67b: The electric propulsion device or thruster or the method of any of the preceding Aspects, wherein at least 50% (optionally at least 55%, optionally at least 60%, optionally at least 65%, optionally at least 70%, optionally at least 75%, optionally at least 80%, optionally at least 85%, optionally at least 90%, optionally at least 95%, optionally at least 98%, optionally at least 99%, optionally at least 99.5%, optionally 100%) of the surface area or outermost faces or edges of the graphite material are encapsulated by the hexagonal boron nitride material.

Aspect 68: The electric propulsion device or thruster or the method of any of the preceding Aspects, wherein the hexagonal boron nitride material is in the form of one or more layers of the bimaterial.

Aspect 69: The electric propulsion device or thruster or the method of any of the preceding Aspects, wherein the graphite material is in the form of one or more layers of the bimaterial.

The invention can be further understood by the following non-limiting examples.

Example 1A: High-Temperature Carbothermal Synthesis and Characterization of Graphite/h-BN Bimaterials Exemplary details, features, compositions, materials, characterization, properties, applications, benefits, devices, configurations, components, and other aspects are provided in this Example 1A and sub-examples herein. All aspects combined, each and any aspect individually, and each and any combination of any of the aspects provided herein are contemplated and explicitly disclosed herein.

Summary: Hexagonal boron nitride (h-BN) and graphite have similar crystal structures, comparable lattice parameters and coefficients of thermal expansion, but vastly different electrical and thermal transport. Despite their key differences, it is possible to couple h-BN and graphite in a bimaterial system allowing the unique properties of both materials to be utilized in a single component. Through carbothermal reduction of $B_2O_3$ in nitrogen, the surface of graphite can be converted to h-BN. This results in a layered system that is electrically insulating on the surface due to h-BN, and more compliant as well as conductive within the substrate due to the graphite structural body. Provided herein are the high-temperature synthesis and characterization of this layered material, including the processing-microstructure relationship as well as the interface of graphite/h-BN to assess the chemical and mechanical adhesion of the layers, and to establish how such properties are contingent on the reacting phase of $B_2O_3$. This is achieved by investigating the origin of h-BN formation and the unwanted side reaction of boron carbide formation, through the evaluation of the thermochemistry and kinetics governing the carbothermic reactions. Contemplated herein is that a reaction temperature and holding time of 1700° C. for 18 h produced the thickest h-BN layers which exhibited the highest fracture toughness over all lower temperature synthesis conditions.

Hexagonal boron nitride (h-BN) is one of many boron nitride polymorphs, and is widely valued for its dielectric properties, emissivity, and oxidation resistance up to 1000° C.[1]. Structurally, h-BN is composed of alternating B and N atoms arranged in a two-dimensional hexagonal structure, achieved when BN is crystallized past 1600° C. at ambient pressures[2, 3]. The highly anisotropic sheets of h-BN are bound together by weak van der Waals forces, making this material lubricating, with a low elastic modulus in the c-direction[4]. It can be synthesized from boria ($B_2O_3$) through several high-temperature routes, including by reacting the oxide with N-containing compounds[5-8] (e.g., $NH_3$, $CO(NH_2)_2$, etc.), or via carbothermic reactions in nitriding atmospheres[9-14]. The thermal shock resistance of h-BN has made it sought-after for nuclear and aerospace applications; for example, it is used in the discharge chamber of Hall effect thrusters in electric propulsion (EP) systems[15]. Additionally, its elastic properties have made h-BN a standard in the combustion engine industries, where it is featured in SiC/BN/SiC ceramic-matrix composites to facilitate crack deflection[18,17] Despite these desirable properties, bulk h-BN is expensive to process and difficult to machine into complex shapes due to its brittle nature.

Graphite is isostructural with h-BN. It has a comparable coefficient of thermal expansion to h-BN[18], but unlike h-BN, graphite is electrically conductive and starts to oxidize at temperatures as low as 400° C.[19], making it unsuitable for some high-temperature applications. Nevertheless, it is more compliant, easier to machine, and less prone to fracture than h-BN, making it more economical to manufacture and process. It also has an even greater resistance to thermal shock than h-BN[20], which could be attractive for aerospace and automotive applications were it not for its tendency to oxidize so readily.

Coupling the disparate properties of the two materials is possible when they are made into a single bimaterial composed of a graphite core and a h-BN exterior. In fact, h-BN can be grown directly on graphite samples through the high-temperature carbothermic reaction of $B_2O_3$ in nitrogen, which converts the surface of graphite into h-BN[9, 12]. This method allows for superior adhesion of the layers compared to simpler methods, such as depositions of h-BN coatings from commercial powders or slurries. The graphite body is completely enclosed by a layer of h-BN that is dielectric, emissive, and resistant to oxidation. In this way, the h-BN layer can protect the internal graphite from degradation under high-temperature environments, making this bimaterial an innovative candidate for applications functioning between 400° C. and 1000° C., while still retaining the machinability, thermal shock resistance, and fracture resistance of the graphite body. The bi material is therefore a contender for next-generation Hall-effect thrusters used in electric propulsion systems, given its improvements over the state-of-the-art bulk h-BN that is relatively brittle and prone to fracture[21].

The present Example reports the processing-microstructure relationship of graphite/h-BN bimaterials, to understand how carbothermal synthesis conditions can control the thickness and microstructure of the h-BN layer. Additionally, this Example provides chemical and mechanical properties of the interface between graphite and the h-BN layer. A detailed evaluation is provided to understand how both the reactive phases of $B_2O_3$, liquid-phase and vapor-phase, can influence the size and composition of the interfacial region as well as the properties of the h-BN layer. By doing so, this work serves as a guide to understanding the tunability of the carbothermic process in the creation of graphite/h-BN bimaterials.

Example 1A(2). Materials & Methods

Example 1A(2.1). Graphite/h-BN Synthesis

Example 1A(2.1.1). h-BN Precursor Powders

High-temperature carbothermal reduction reactions, also known as carbothermic reactions, are used to convert surfaces of bulk graphite bodies to hexagonal boron nitride (h-BN) layers, both rectangular and cylindrical coupons. To prepare the precursor powders, 9.89 g of boric acid (H2B03, Sigma Aldrich) are mixed with 0.74 g of h-BN (IDL-500, Saint-Gobain), the latter which is added as a lubricant to facilitate the removal of the bimaterials from the crucible. The blend of powders is then melted in an $Al_2O_3$ crucible at 800° C. for 30 min using a high-temperature box furnace (CM Rapid Temp). This step allowed the boric acid to dehydrate into glassy $B_2O_3$ before the h-BN-forming reaction is carried out, limiting the effects of water vapor on the porosity and growth of the h-BN layer. Temperatures higher than 800° C. are avoided to prevent $B_2O_3$ from reacting with the $Al_2O_3$ crucible to generate aluminum borate[22]. The heating and cooling rates are both 3° C./min. After heating, the $B_2O_3$-rich precursor powders are removed from the crucible and ground to particles of 1 μm in diameter or less, the latter which is determined by using a sieve to help screen the particle size.

Example 1A(2.1.2). Carbothermic Reactions

Figure 1B:
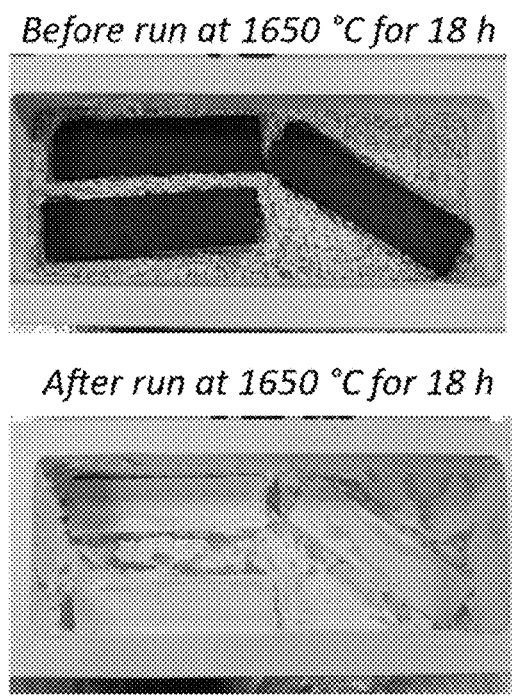
FIG. 1B: Example of materials prior to carbothermic reaction at 1650° C. for 18 h (top), and after reaction (bottom).

Approximately 4 g of the $B_2O_3$-rich precursor powders are placed inside a boron nitride crucible. Although more expensive, a boron nitride crucible is selected over an $Al_2O_3$ crucible in order to ensure that $B_2O_3$ did not react with the container, and to avoid the formation of aluminum borate as noted earlier in Section 2.1.1. Three rectangular graphite strips (G540, Tokai Carbon) are then placed atop the powders. Each 30 mm×2 mm×6 mm strip weighed approximately 4.3 g. The 30 mm×6 mm face of each strip is in contact with the precursor powders while the opposite 30 mm×6 mm face is exposed to $B_2O_3$ vapors during the carbothermic reaction, as seen in FIGS. 1A-1B.

A boron nitride lid is then placed over the crucible with a visible gap between the lid and the crucible wall. The area of the gap is manually positioned as 1.2 cm², and measured after the carbothermic reaction, ensuring that the area of the gap is constant during firing. This set-up permitted the flow of nitrogen gas into the crucible, while still ensuring a high concentration of $B_2O_3$ vapor within the crucible's enclosure. The h-BN forming carbothermic reaction is described in Eqn. 1.

$$B_2O_{3(l)} + 3C_{(s)} + N_{2(g)} \rightarrow 2BN_{(s)} + 3CO_{(g)} \qquad (1)$$

The lidded crucible and its contents are placed in a high-temperature tube furnace with flowing nitrogen gas (UHP200, Airgas) to synthesize h-BN, at a constant flow rate of 2 SCFH. A Carbolite CTF 17/300 Tube Furnace is used for syntheses taking place at 1600° C. The holding times ranged from 3 h to 12 h. The heating rate is 3° C./min up to 900° C., then 2° C./min up to the target temperature, while the cooling rate is 1° C./min until 1100° C., then 2° C./min to room temperature. An MTI GSL-1800X tube furnace with a SiC tube (Saint Gobain) and a Eurotherm 3504 controller is used for syntheses taking place at 1650° C. and 1700° C. The temperature is calibrated for the SiC tube with a B-type thermocouple resting on an empty BN crucible with the same gas flow rate used in the experiments. The holding times at each temperature ranged from 8 h to 18 h. With the 1650° C. and 1700° C. temperature reactions, the SiC tube furnace is not able to reach the target temperature as quickly, therefore the heating rate used is 3° C./min up to 900° C., then −2° C./min up to the target temperature. Additionally, the cooling rate is 1° C./min until 1100° C., then 2° C./min to room temperature. Processing conditions are further summarized in Table 1.

TABLE 1

Summary of reaction conditions for each experiment.

| Reaction Temperature (° C.) | Holding time (h) | Phase of $B_2O_3$ Reaction |
|---|---|---|
| 1600 | 12 | Liquid |
| 1650 | 8, 12, 18 | Liquid & Vapor |
| 1700 | 8, 12, 18 | Liquid & Vapor |

After the carbothermic reaction, the graphite/h-BN bimaterials are removed from the crucible. The surrounding precursor powders fully converted into lubricating h-BN powders during the reaction, which facilitated the removal of the samples. Excess powders are washed off the bimaterials with deionized water, revealing ceramic h-BN layers over the graphite bodies, as illustrated in FIG. 1B.

Additionally, the boron carbide forming carbothermic reaction described in Eqn. 2 is also investigated to gain a better understanding of the mechanisms involved in h-BN formation.

$$2B_2O_{3(l)} + 7C_{(s)} \rightarrow B_4C_{(s)} + 6CO_{(g)} \qquad (2)$$

Flowing argon gas (AR200, Airgas) is used during the boron carbide forming reaction, taking place at 1600° C. by holding for 12 h.

Example 1A(2.2) Characterization

Scanning electron microscopy and energy dispersive X-ray spectroscopy (SEM-EDS, ZEISS 1550VP FESEM, Carl Zeiss Microscopy GmbH, Jena, Germany) are used to study the microstructure of the bimaterials and synthesized h-BN layers. The diffusion profiles of the interface of graphite/h-BN are obtained using EDS line scans comprising of at least 100 data points per line, each of which is drawn perpendicular to the layers of each bimaterial sample. The h-BN layer thicknesses are measured using an optical microscope and the image-processing tool ImageJ (National Institutes of Health). An average of 15 thickness measurements are carried out for each sample over lengths up to 6 mm, with measurements being made in evenly spaced intervals. The reported values of the h-BN layer thickness are determined using number averaging, with the error term representing one standard deviation. Macroscale images (Nikon D7500, AF-S Micro Nikkor 40 mm Lens, Nikon, Tokyo, Japan) are also collected. X-ray powder diffraction (XRD, PANalytical X'Pert Pro) and transmission electron microscopy (TEM, TF-30, Tecnai) are also carried out to characterize the bimaterials and h-BN layers, respectively.

Figure 2:
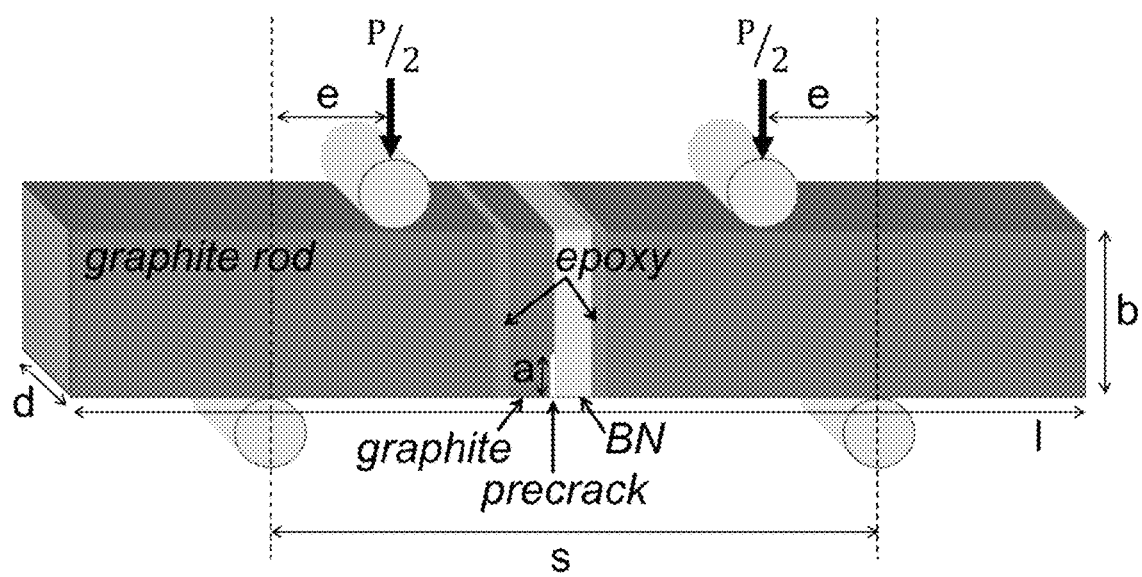
FIG. 2: Single-edge notched beam test specimen used on the bimaterial to investigate the interfacial fracture toughness of graphite/h-BN.

Single-edge-notch-beam (SENB) tests are carried out to measure the fracture toughness of the bimaterial interface[23, 24]. A 4-point-bend test set-up, with an outer span of 40 mm and an inner span of 20 mm, is mounted in an Instron 5982 mechanical testing frame (Instron Corporation, Norwood, MA), operated at a cross-head rate is 0.5 mm/min. FIG. 2 illustrates the beam geometry and test set-up, where s is 40 mm, e is 10 mm, and the dimensions of the beam (l×d×b) are approximately 50×2×8 mm³. The beams are fabricated by sandwiching a graphite/h-BN coupon between two graphite rods of dimension 20×2×8 mm³ using epoxy (J-B Weld). The precrack notch is prepared using a 0.3 mm thick razor and an optical microscope. Of the SENB tests, four pure graphite specimens are to study the substrate; four pure h-BN specimens are to evaluate a commercial grade of binderless h-BN (AX05, Saint-Gobain); eight h-BN/graphite biomaterial specimens are to examine bimaterials synthesized at 1700° C. for 18 h. Of the latter eight, four are from graphite/h-BN coupons produced from liquid-phase $B_2O_3$, while four are from graphite/h-BN coupons created from vapor-phase $B_2O_3$, as depicted in the FIG. 1A schematic.

Example 1A(3). Results and Discussion

Example 1A(3.1) Development of h-BN Layer

Figure 3A:
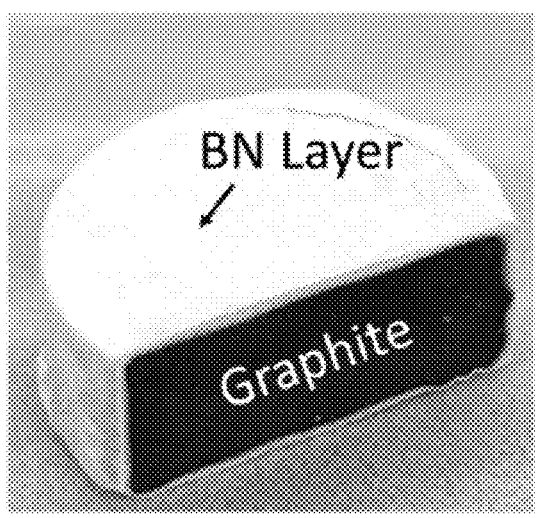
FIG. 3A: Bimaterial cylinder of graphite and h-BN processed at 1600° C.
Figure 12A:
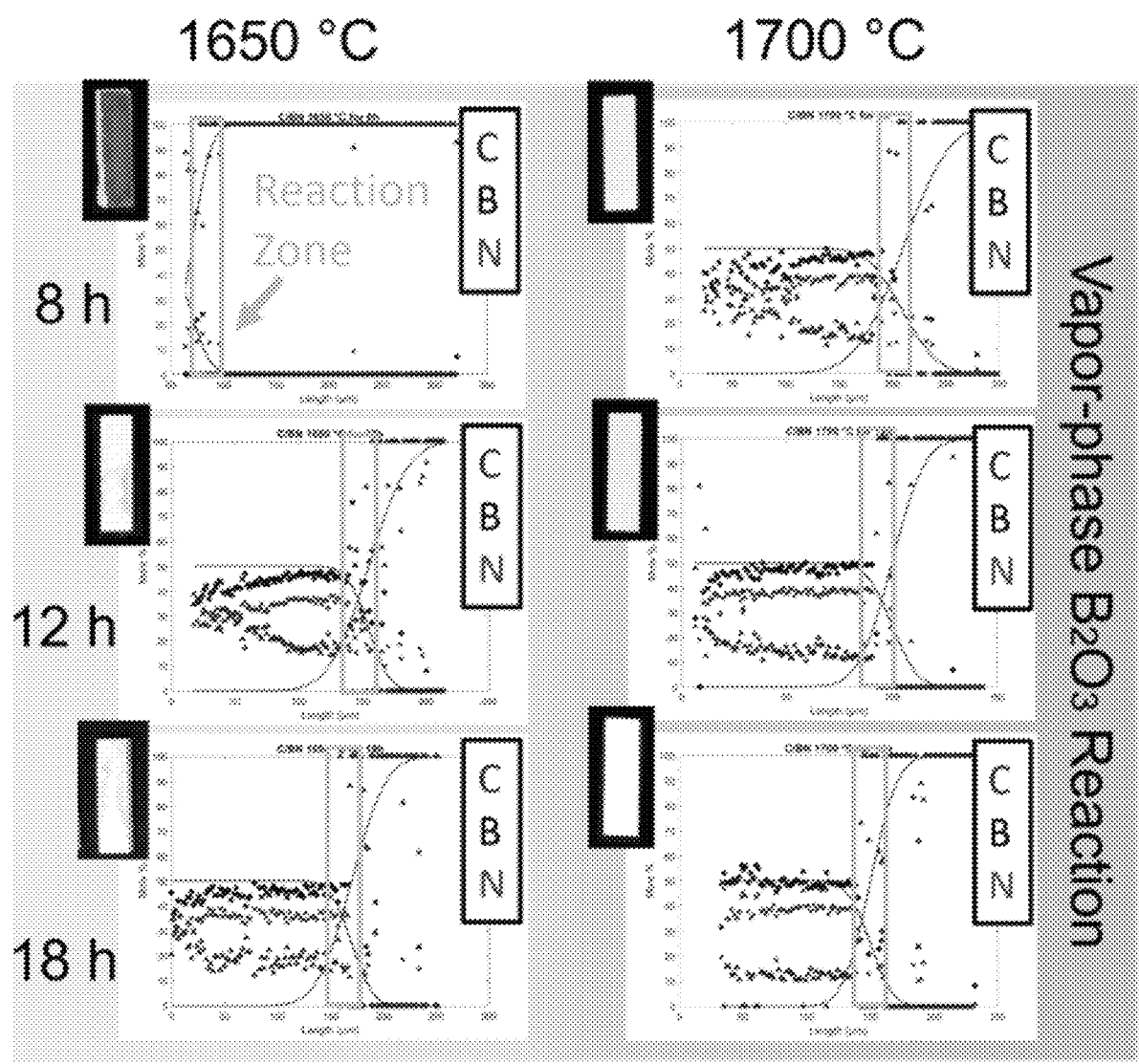
FIGS. 12A-12B: Diffusion profile showing elemental composition (mole %) of the interface for both vapor-phase $B_2O_3$ (FIG. 12A) and liquid-phase $B_2O_3$ (FIG. 12B) developed h-BN. Insets show photographs of the surface of graphite/h-BN bimaterials.
Figure 12B:
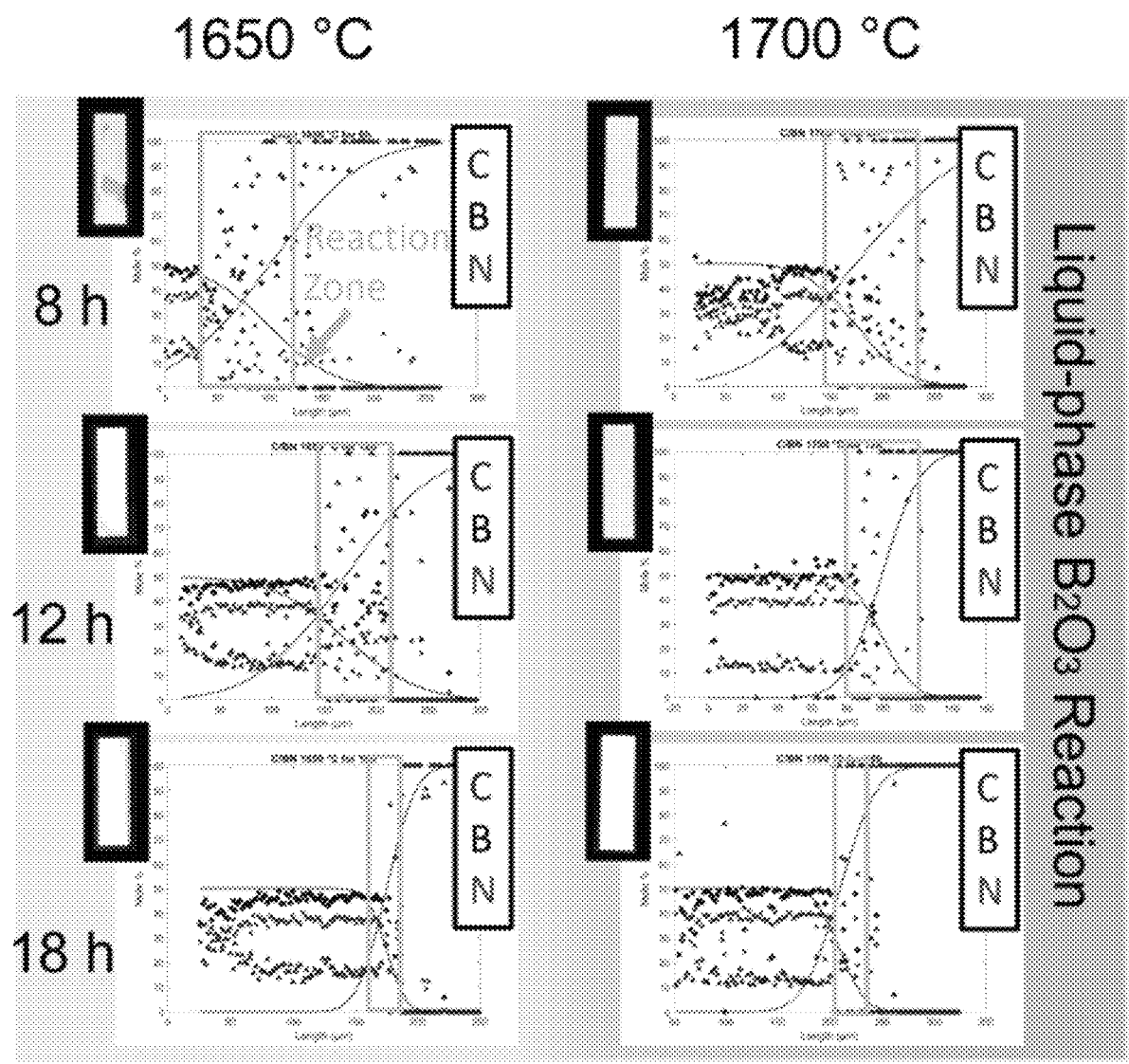

The graphite/h-BN bimaterial, shown in FIG. 3A, has a graphite body with a carbothermic reduction-produced h-BN ceramic layer, synthesized at 1600° C. A cross-sectional view of the bimaterial, shown in the SEM-EDS map of FIG. 3B, and also further seen in FIGS. 12A-12B, confirmed that the outer layer is rich in B and N, and indicated a rough graphite/h-BN interface with a complex chemistry, showing signs of a second B-rich material below the h-BN layer. Diffraction patterns and transmission electron micrographs, shown in FIGS. 3C-3D, are used to confirm the phase of the synthesized BN layer, indicating that it crystallized into h-BN past 1600° C. as expected from phase diagrams in the literature[2].

The carbothermic reaction used to synthesize the graphite/h-BN bimaterial is described in Eqn. 1. The $B_2O_3$-rich precursor powders reacted with the surface of the graphite bodies, converting the outer layer of graphite into h-BN with the release of CO. In this way, the h-BN layers could be grown directly from the graphite sample, ensuring better adhesion and thicker layers (on the order of hundreds of microns) than the thickness expected by other methods such as chemical vapor deposition[25] or atomic layer deposition[26].

Figure 3B:
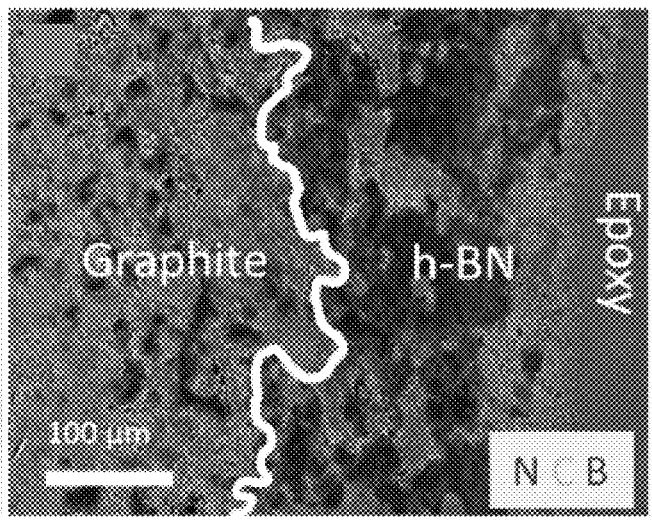
FIG. 3B: SEM-EDS map showing cross-sectioned view of the rough interface between the h-BN layer and graphite of FIG. 3A.
Figure 3C:
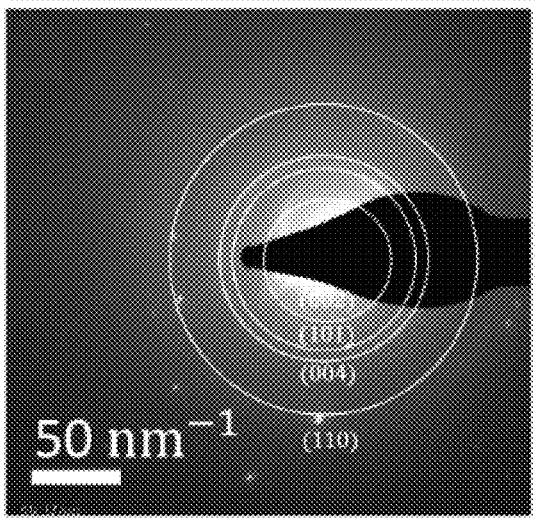
FIG. 3C: Diffraction pattern (ring pattern) of polycrystalline h-BN layer synthesized at 1600° C., confirming polycrystalline hexagonal phase.
Figure 3D:
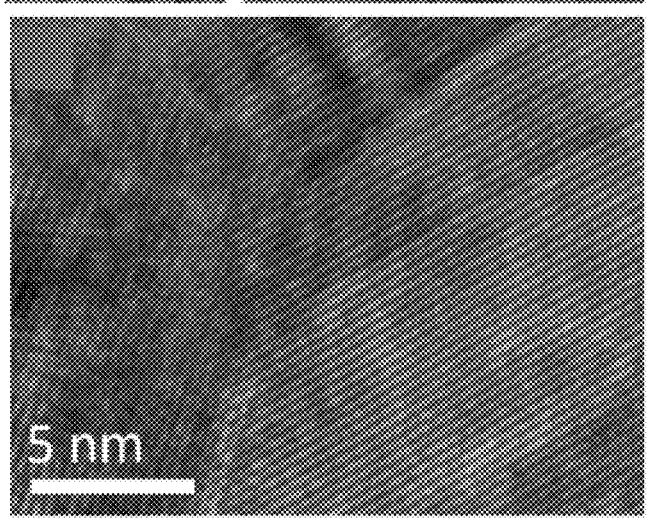
FIG. 3D: Transmission electron micrograph of h-BN layer from FIG. 3B. SEM micrograph of h-BN layer grown at (FIG. 3E) 1600° C.
Figure 3E:
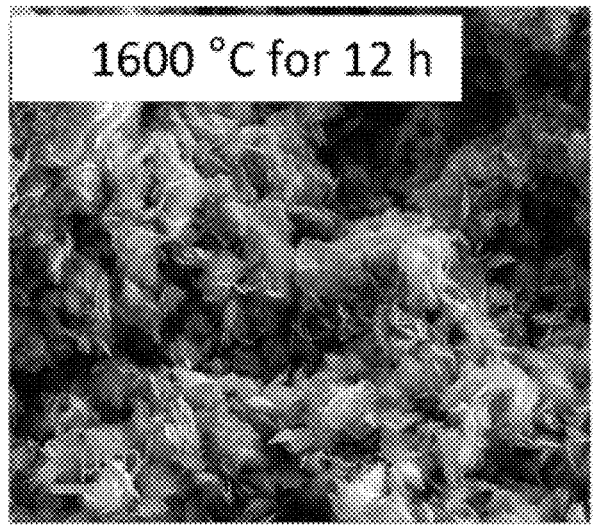
(FIG. 3F) 1650° C. for 12 h.
FIG. 3G: Accompanying XRD spectra of e) and f), showing presence of BN (○), graphite (Δ), and boron carbide (□).
Figure 3F:
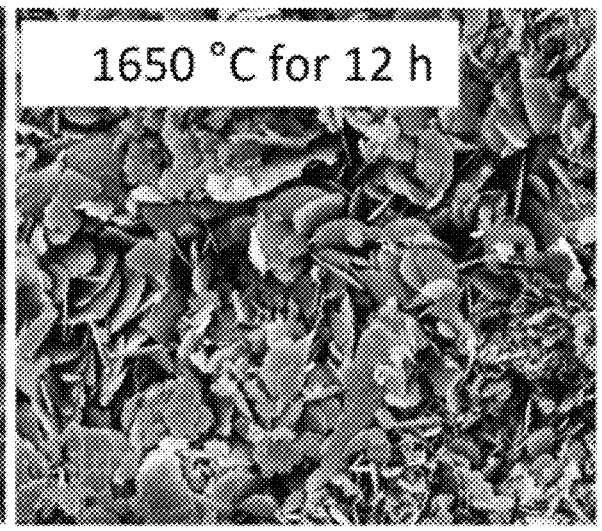
Figure 3G:
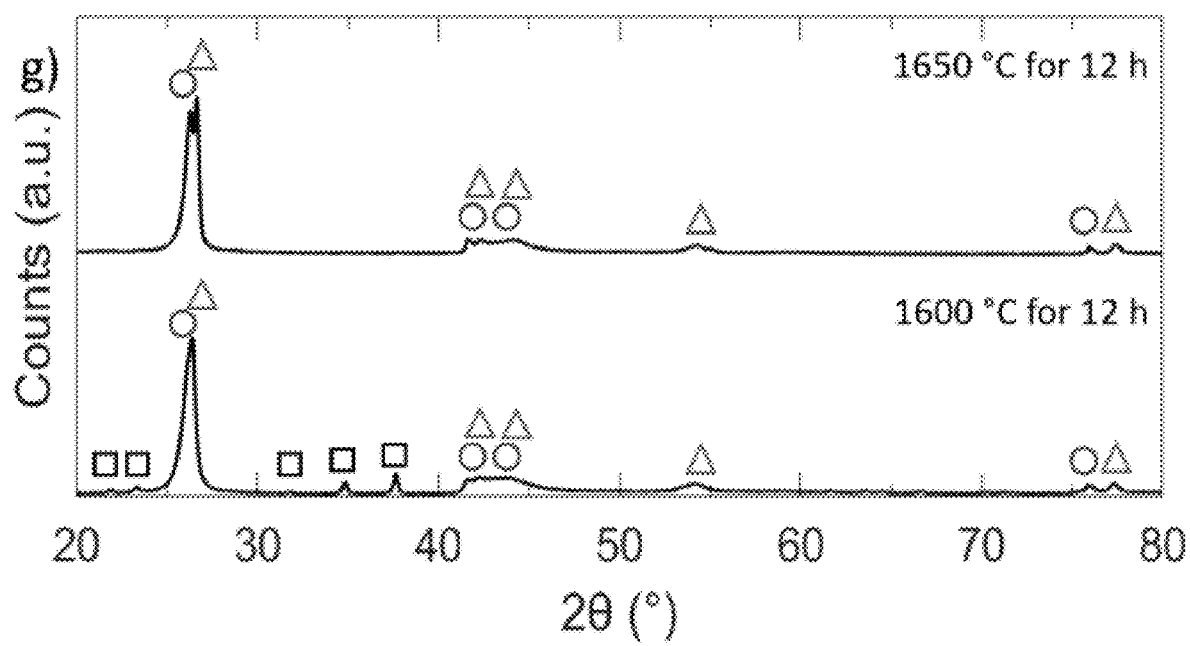

The surface microstructure of the h-BN layer is studied using scanning electron microscopy, shown in FIGS. 3E-3F. It is found that altering the temperature of the carbothermic reaction changed the microstructure of the h-BN surface layer. For example, FIG. 3E shows the microstructure of an h-BN layer grown at 1600° C. for 12 h, revealing h-BN flakes, phase confirmed in FIG. 3G, that are less than 2 μm wide. These flakes are sintered together to form a porous structure, potentially due to the evolution of CO gas from Eqn. 1. The strong presence of h-BN flakes indicates that 12 h at 1600° C. is sufficient for $B_2O_3$, C and $N_2$ to react completely, with BN crystallizing into a hexagonal, two-dimensional structure. However, it should be noted that XRD (FIG. 3G) of the grown hBN indicates that boron carbide is also present in specimens synthesized at 1600° C.

Based upon estimated X-ray penetration depths in B, C and N, our XRD observations indicate that the boron carbide detected is located within the first couple of hundred microns of the bimaterial[27]. This could be attributable to a second carbothermic reaction taking place in the absence of nitrogen, seen in Eqn. 2, where $B_2O_3$ can react with graphite at high temperatures to form boron carbide. During the bimaterial synthesis, the $B_2O_3$-rich precursors melt into a liquid within the crucible that can penetrate the graphite bodies. It is likely that boron carbide develops below the h-BN layer, where $B_2O_3$ has reacted with graphite in areas inaccessible to nitrogen gas. Referring to the SEM-EDS map in FIG. 3B, the boron infiltration previously observed below the h-BN layer could be due to the development of boron carbide near the interface. The origins of boron carbide formation will be revisited in later parts of the discussion.

Seen in FIG. 3F, increasing the temperature of the carbothermic reaction to 1650° C. appears to reduce surface porosity in the h-BN layer. As a result, the target temperature of the carbothermic reactions is chosen to be 1650° C. or higher in subsequent sections of this Example. It should be noted that the diffraction spectra reported in FIG. 3G suggest that boron carbide is not observed at 1650° C., indicating that boron carbide formation can be avoided at higher temperatures.

Example 1A(3.2). The Role of the $B_2O_3$ Phase in h-BN Formation

Throughout the high-temperature carbothermic reaction, $B_2O_3$ is present as both a liquid-phase and a vapor-phase oxide[12, 13, 28-30]. Both phases can participate in the h-BN forming carbothermic reaction, making it essential to investigate how the $B_2O_3$ reacting phase influences the microstructure and thickness of the synthesized h-BN layer, as well as the interface of the bimaterial. These concepts are demonstrated in FIGS. 1A-1B, where graphite samples can develop h-BN layers on their surface regardless of whether the graphite faces are in contact with the precursor powders or not. Liquid-phase $B_2O_3$ originates from the melted precursor powders that accumulate at the bottom of the crucible, while the vapor-phase $B_2O_3$ volatilizes to the top of the crucible where it is partially trapped by the lid and can thus react with the exposed graphite surfaces.

Example 1A(3.2.1). Vapor-Phase Carbothermic Reactions

The most widely established mechanism for the carbothermic formation of h-BN is based on the vapor-phase reduction of $B_2O_3$ into BO or metallic B, which consequently reacts with $N_2$ to produce the nitride[12,30]. This mechanism can be summarized by a series of independent chemical reactions, as enumerated by Aydoğdu et al.[12], seen below in Eqns. 3 to 6.

$$B_2O_{3(l)} + 2C_{(s)} \rightarrow 2BO_{(g)} + CO_{(g)} \quad (3)$$

$$B_2O_{3(l)} + 3C_{(s)} \rightarrow 2B_{(g)} + 3CO_{(g)} \quad (4)$$

$$B_2O_{3(l)} \rightarrow B_2O_{3(g)} \quad (5)$$

$$2B_{(g)} + \frac{1}{2}N_{2(g)} \rightarrow BN \quad (6)$$

The equilibrium partial pressures of the gaseous species in a closed system can be estimated by determining the equilibrium constants, K, of these reactions, further described in the supplementary information.

Figure 4A:
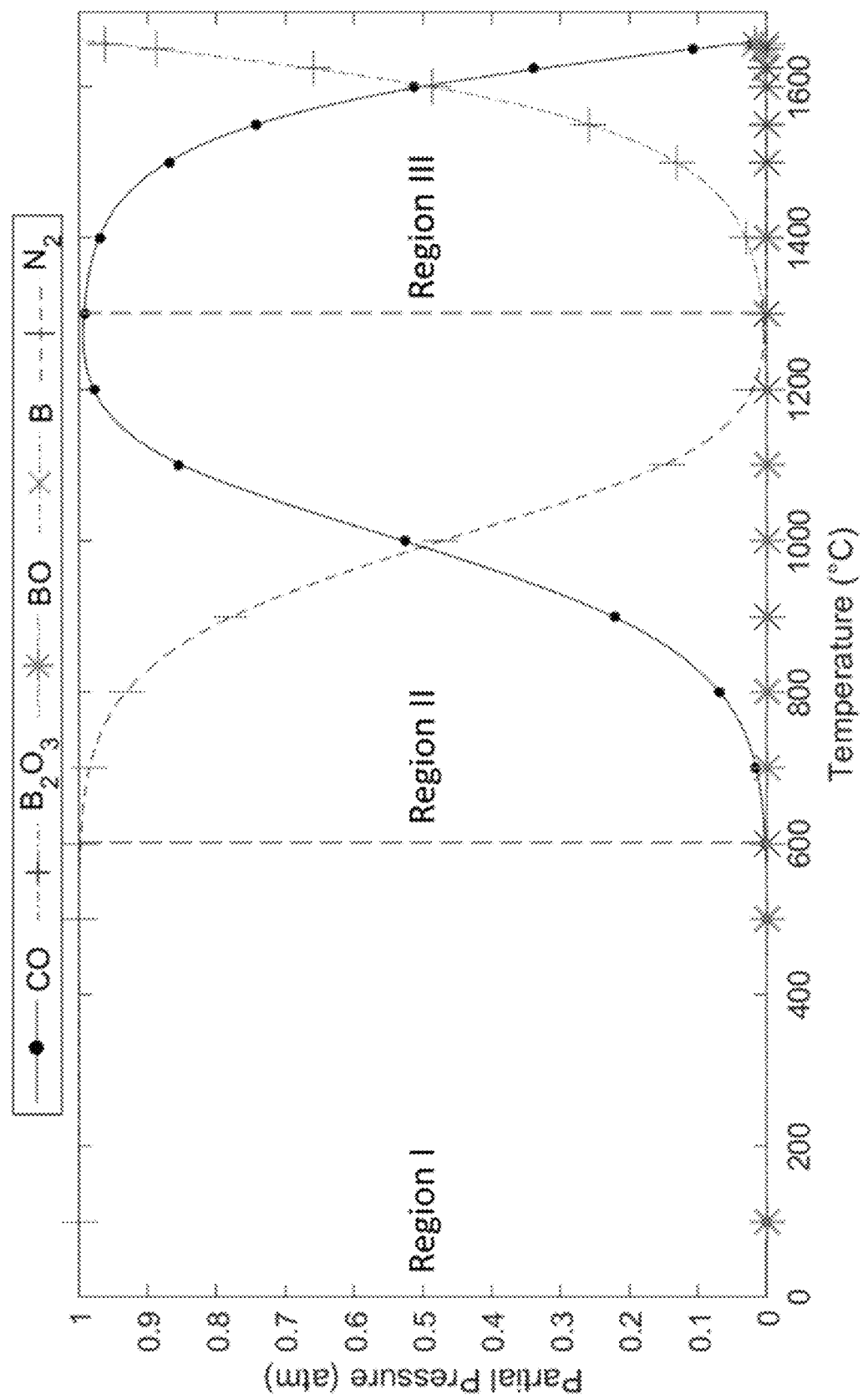
FIG. 4A: Equilibrium partial pressure of CO, BO, B, $B_2O_3$ and $N_2$ in a closed system as a function of temperature, showing three distinct regions largely populated by $N_2$, CO, and $B_2O_3$ respectively.

The equilibrium partial pressures $P_{CO}$, $P_B$, $P_{BO}$, $P_{N_2}$ and $P_{B_2O_3}$ at 1500° C. were reported by Aydoğdu et al[12]. Moving beyond their study, this Example provides further understanding of the carbothermic formation of h-BN over a wider temperature range, from 100° C. to near 1700° C. FIG. 4A summarizes the calculated data, where the effect of temperature on each partial pressure reveals the most prevalent vapors at each point of the h-BN synthesis. From this, one can distinguish three distinct regions in the formation of h-BN.

Figure 4B:
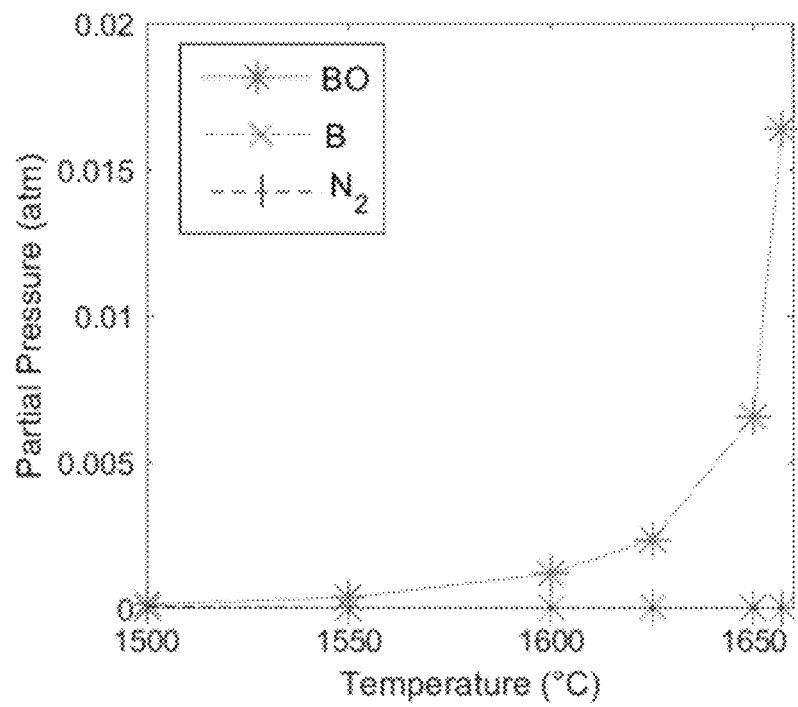
FIG. 4B: Close-up of FIG. 4A showing increase in $P_{BO}$ with temperature.
Figure 4C:
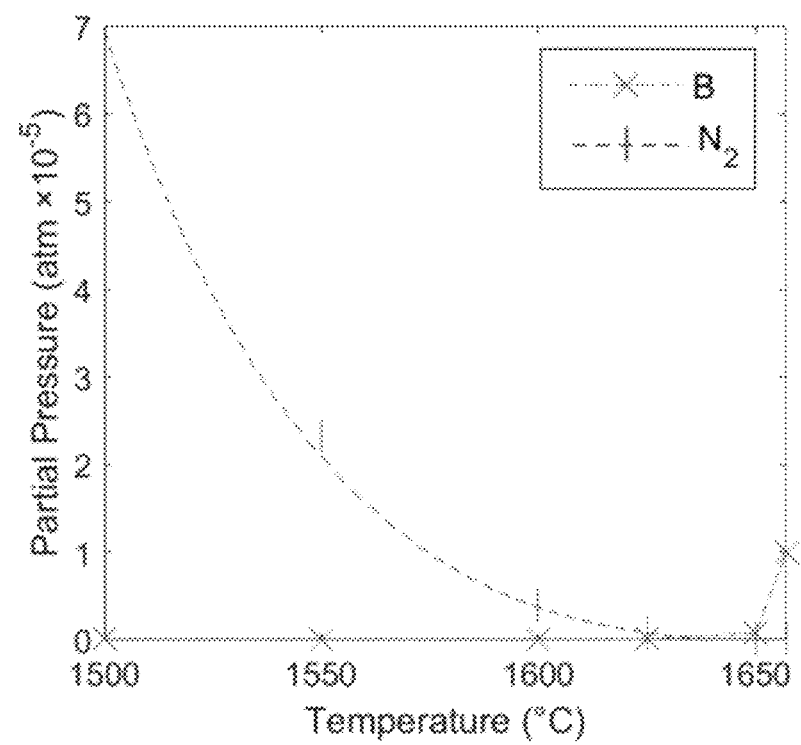
FIG. 4C: Close-up of FIG. 4A showing increase in $P_B$ with temperature. Note difference in scales in FIG. 4B and FIG. 4C.

Region I defines the system before the carbothermic reaction commences, indicating that the closed crucible is filled only with $N_2$ vapors. Starting at 600° C., the rise in CO from Eqns. 3 and 4 indicates the early stages of the carbothermic reaction. This defines the start of Region II, where one can also see a gradual decrease in $P_{N_2}$ as boron nitride starts to form. The equilibrium partial pressure of $B_2O_3$ indicates that its vapor-phase does not evolve until Region III is reached, at temperatures greater than 1300° C. Within this region, an exponential rise in $P_{B_2O_3}$ can be seen with increasing temperature. Specifically, $P_{B_2O_3}$ increases by 0.41 atm as the temperature rises from 1600° C. to 1650° C. FIGS. 4B-4C similarly reveal that $P_B$ and $P_{BO}$ rise steeply past 1650° C. Although B and BO vapors do not appear to dominate the system as strongly as $B_2O_3$, they still play an important role in h-BN formation as seen in Eqn. 6. These findings indicate that B-rich vapor-phases dominate the gaseous system above 1650° C.

Using the ideal gas law, the data in FIGS. 4A-4C can also be expressed in terms of mol % and wt % to gain insight into the relative concentrations of the vapor-phases. These data are shown in FIGS. 10A-10C and FIGS. 11A-11C in the supplementary information for interested readers.

Example 1A(3.2.2). Liquid-Phase Carbothermic Reactions

The liquid-phase carbothermic formation of h-BN has been discussed in the past[9,12], however not as extensively as the analogous vapor-phase reaction. One possible reason could be the gaseous nature of a key reactant in nitride formation: $N_2$. Our results in Section 3.1 and the behavior seen in Region II in FIG. 4A both demonstrate that liquid-phase carbothermic reactions do indeed occur. The question naturally arises of how easily $N_2$ dissolves in liquid $B_2O_3$ for h-BN to successfully form.

Wakasugi et al. have published extensively[31, 32] on the physical and chemical dissolution of $N_2$ in pure molten $B_2O_3$ as well as in $B_2O_3$ melts containing oxides, $SiO_2$, and an array of dopants like $Al_2O_3$, $Y_2O_3$ and $La_2O_3$. They describe the chemical dissolution of $N_2$ in pure molten $B_2O_3$ by Eqn. 7, also expressed by Eqn. 8 in terms of the oxygen and nitrogen ions in the glass melt, $O^{2-}$ and $N^{3-}$, respectively. It should be noted that reducing atmospheres favor the dissolution of nitrogen into the melt, meaning that Eqns. 7 and 8 are likely promoted in the carbothermic reduction reactions described herein[32].

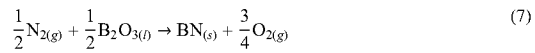

(7)

(8)

Wakasugi et al. refer to the term nitride capacity, $C_N^{3-}$, as a way of describing the capability of a melt to chemically dissolve nitrogen, where pure molten $B_2O_3$ has the highest nitride capacity of all $B_2O_3$ bearing melts. This term is defined as $C_N^{3-}=(Wt\ \%\ N)\times K_{(7)}$, where Wt % N describes the solubility of the nitride in the melt, a property that increases with rising temperature and rising $P_{N_2}$, and $K_{(7)}$ is the equilibrium constant for Eqn. 7, further defined in the supplementary information[32]. In this analysis, the data used for Wt % N in molten $B_2O_3$ are extrapolated from Wakasugi et al.[32], shown in the inset of FIG. 5.

Figure 5:
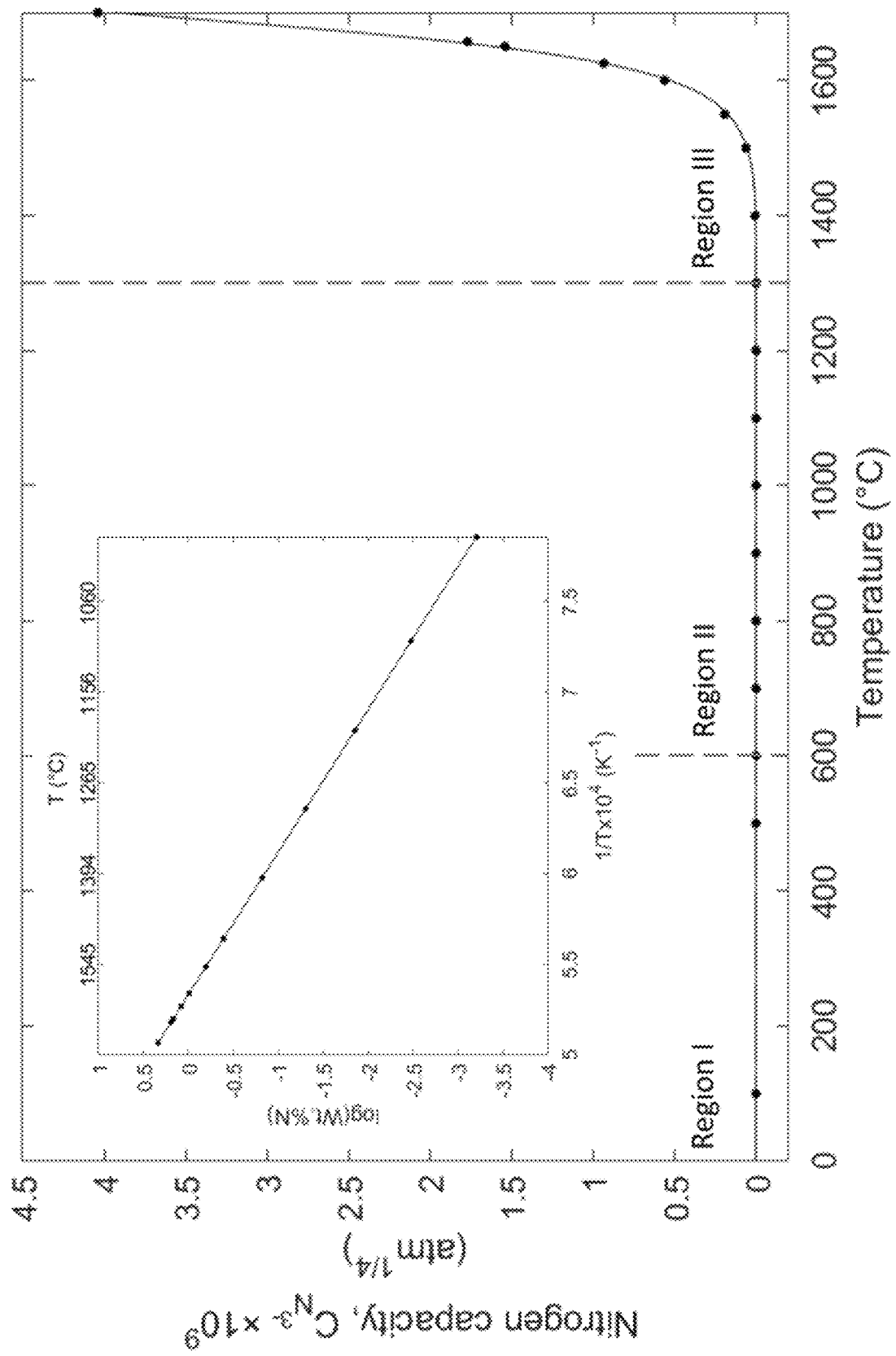
FIG. 5. Nitride capacity as a function of temperature, showing that chemical dissolution of nitrogen in the melt is favored in Region III. Inset shows solubility of nitride in melt as a function of temperature; data for T>1550° C. are extrapolated from Ref. (32).

FIG. 5 illustrates how $C_N^{3-}$ changes with temperature, indicating that the nitride capacity is increased in Region III. This increase also coincides with the decrease in $N_2$ vapor pressure seen in FIG. 4A within this region, indicating that within a closed system the loss of $N_2$ vapor is from a combination of h-BN formation and $N_2$ dissolution into the melt. Our liquid-phase carbothermic reactions carried out at 1600° C. and 1650° C. appear to contain sufficient nitrogen in the melt for the h-BN forming carbothermic reaction to successfully occur, as our results in FIGS. 3A-3G indicate. In fact, since $C_N^{3-}$ increases exponentially with temperature in Region III, it could also explain why boron carbide is usually seen in bimaterials synthesized at 1600° C. (where relatively lower levels of nitrogen in the melt cause Eqn. 2 to take place along with Eqn. 1) and not at 1650° C. (where the chemical dissolution of $N_2$ is higher, causing Eqn. 1 to occur alone without boron carbide formation).

Example 1A(3.2.3). Comparison of Vapor-Phase and Liquid-Phase Processes

Irrespective of phase, $B_2O_3$ reacts with the surface of the graphite samples and converts it into a layer of h-BN. The surface microstructures and thicknesses of these h-BN layers are compared in FIGS. 6A-6B for the two reacting phases of $B_2O_3$.

In the vapor-phase $B_2O_3$ reactions, the h-BN layer is not visible on the macroscale when the carbothermic reaction takes place at 1650° C. for 8 h (see Example 1B). On the microscale, some small flakes are visible, however their concentration is too low to be identified through X-ray diffraction, as seen in FIG. 6C, where only graphite is identified. When the reaction time is raised to 18 h, the h-BN layer thickness increases to 72±19 μm, as seen in FIG. 6B. The corresponding microstructure has sintered h-BN flakes. X-ray diffraction patterns in FIG. 6C confirm that these bimaterials are composed of graphite and h-BN, with no signs of boron carbide. Note that the absence of boron carbide is likely due to the abundance of $N_2$ gas in the vapor-phase reaction, which is more accessible to the graphite surface than the dissolved nitrogen in the liquid-phase carbothermic reaction. When the reaction time is κ h or 12 h long at 1700° C., the h-BN layer thickness reaches 70±14 μm, similar to the value seen with reactions that are 18 h long at 1650° C. The surface microstructure of the h-BN layer appears visibly denser when synthesized at 1700° C. for 18 h, showing compacted h-BN flakes. As an important note, carrying out the carbothermic reaction at 1700° C. for 18 h can produce residual carbon nitrides on the samples, further shown in the supplementary information. These residues can be removed from the bimaterial by sonicating the sample in deionized water, as seen in FIG. 6C, where only graphite and h-BN are identified after the material is cleaned by sonication. While precautions should be taken when handling such toxic residues, these residues are not detrimental to the function of the h-BN layer.

Figure 6A:
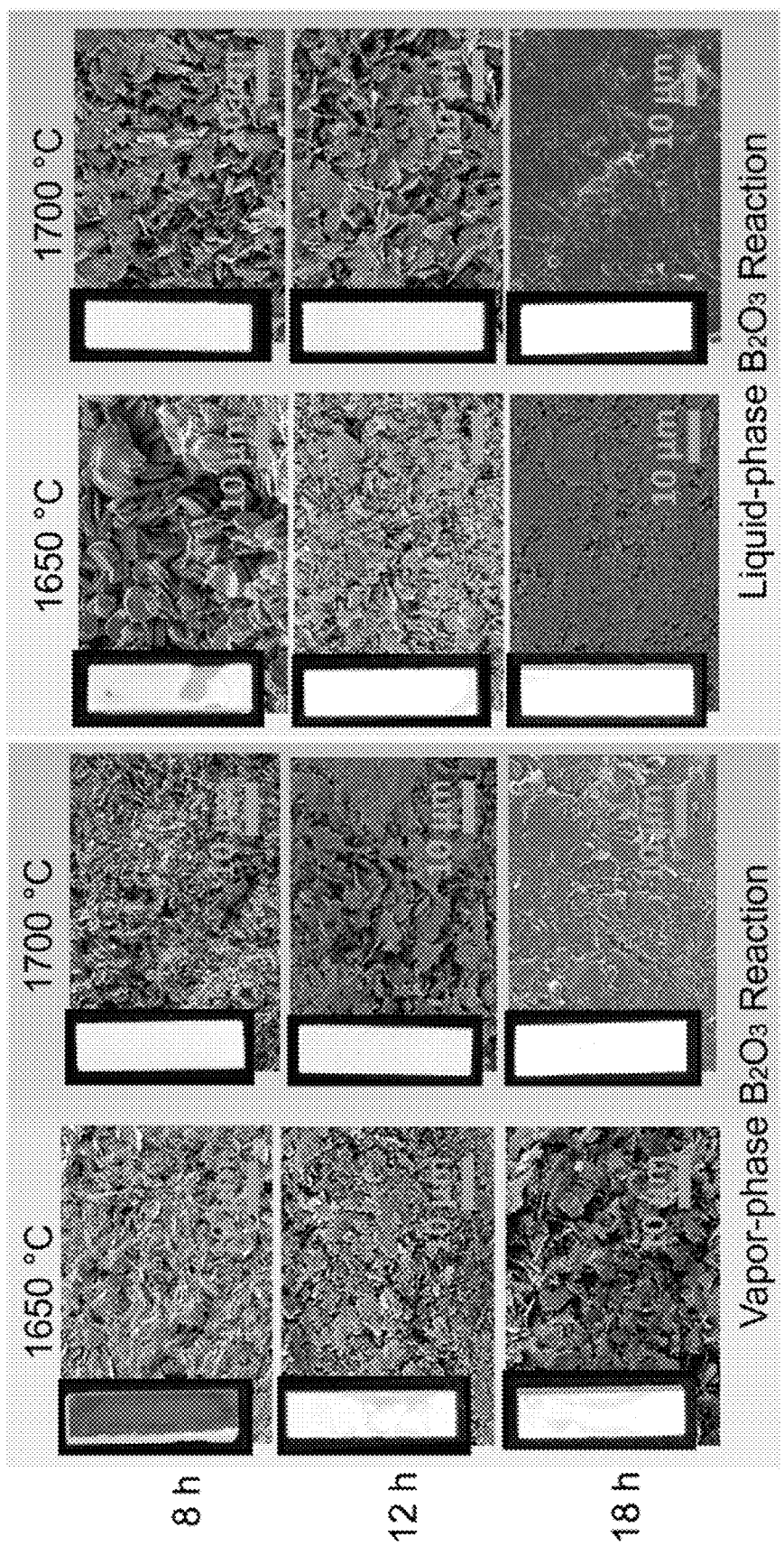
FIG. 6A: Microstructure of h-BN layer of bimaterials synthesized at 1650° C. or 1700° C., showing surface of h-BN layers that grew from vapor-phase $B_2O_3$ (orange) and liquid-phase $B_2O_3$ (blue). Insets show photographs of the surface of graphite/h-BN bimaterials.
Figure 6B:
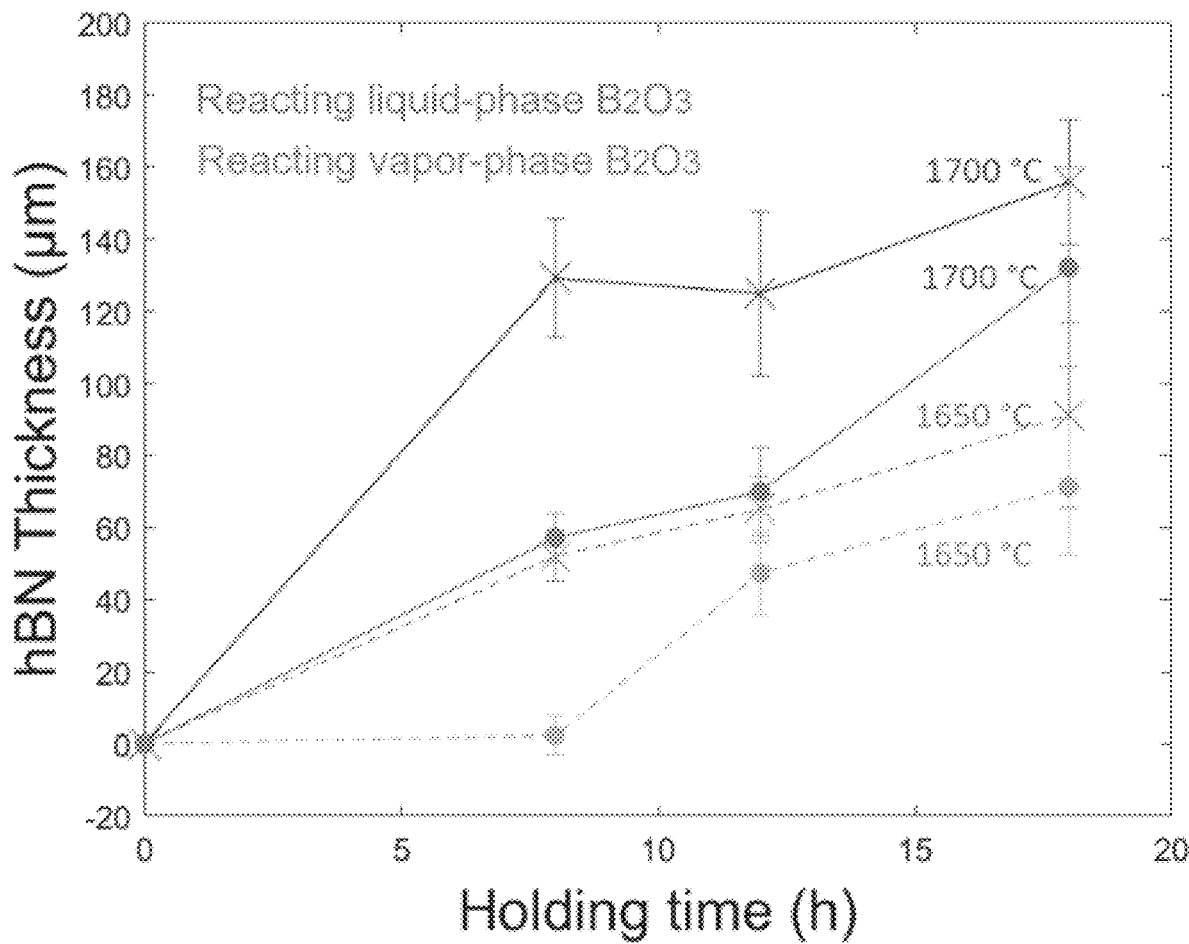
FIG. 6B: Thickness of h-BN layer as a function of reaction temperature and holding time, for both liquid and vapor phases of $B_2O_3$.
Figure 6C:
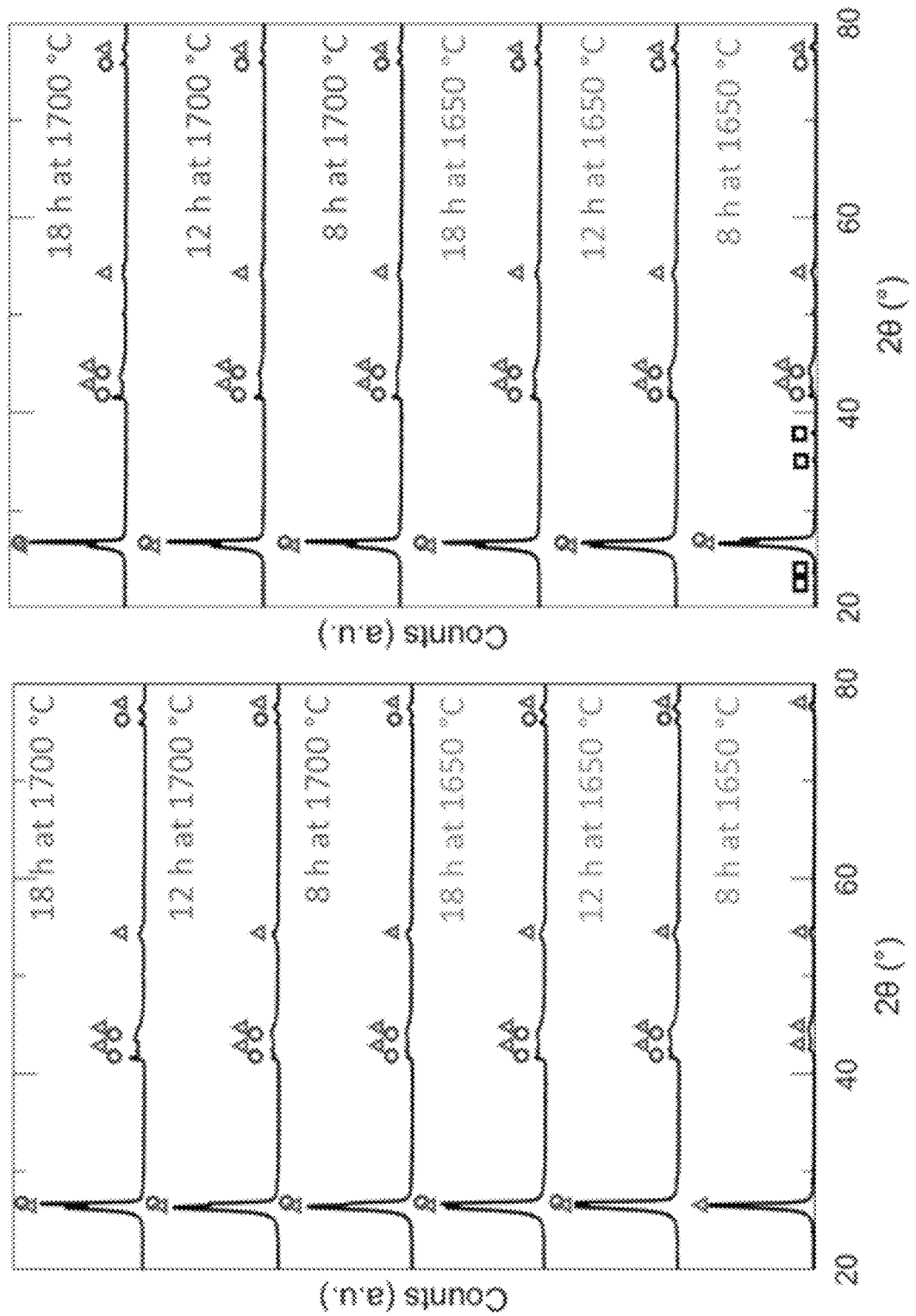
FIG. 6C: XRD spectra of bimaterials featured in FIG. 6A, showing presence of h-BN (○), graphite (Δ) and boron carbide (□). Micrographs and XRD spectra of liquid-phase reactions occurring at 1650° C. for 12 h is previously featured in FIG. 3G. They are reincluded in this figure for comparative purposes.

For liquid-phase $B_2O_3$ reactions, the inset in FIG. 6A shows that the reactions taking place at 1650° C. for 8 h result in nonuniform h-BN layers composed microscopically of coarsely stacked h-BN flakes surrounded by unreacted $B_2O_3$. FIG. 6B shows that this h-BN layer is approximately 52±7 μm. Furthermore, the corresponding XRD spectrum in FIG. 6C indicates that h-BN, graphite and boron carbide are present. The carbide phase in the bimaterial disappears when the reaction time is increased up to 12 h and 18 h, pointing to limited nitrogen dissolution in the melt over reaction times like 8 h. Prolonging the reaction time also thickens the h-BN layers up to 92±26 μm. Increasing the reaction temperature to 1700° C. results in h-BN layers that are considerably thicker, up to 156±18 μm, which do not contain boron carbide. The densest and thickest h-BN layers studied are synthesized at 1700° C. over 18 h.

As illustrated in FIG. 6B, the main difference between h-BN layers formed from liquid-phase and vapor-phase $B_2O_3$ is the layer thickness. However, it is important to note that, with control of the carbothermic reaction time and temperature, a range of different h-BN layer thicknesses and microstructures can be achieved, regardless of the reacting phase of $B_2O_3$. From the perspective of scaling-up the carbothermic reaction to produce larger and more complex bimaterial samples, the vapor-phase process is particularly attractive as it can convert surfaces that are not directly in contact with a precursor melt.

Example 1A(3.3) Graphite/h-BN Bimaterial Interfaces

Example 1A(3.3.1). Diffusion Profiles at the Interface

Figure 7A:
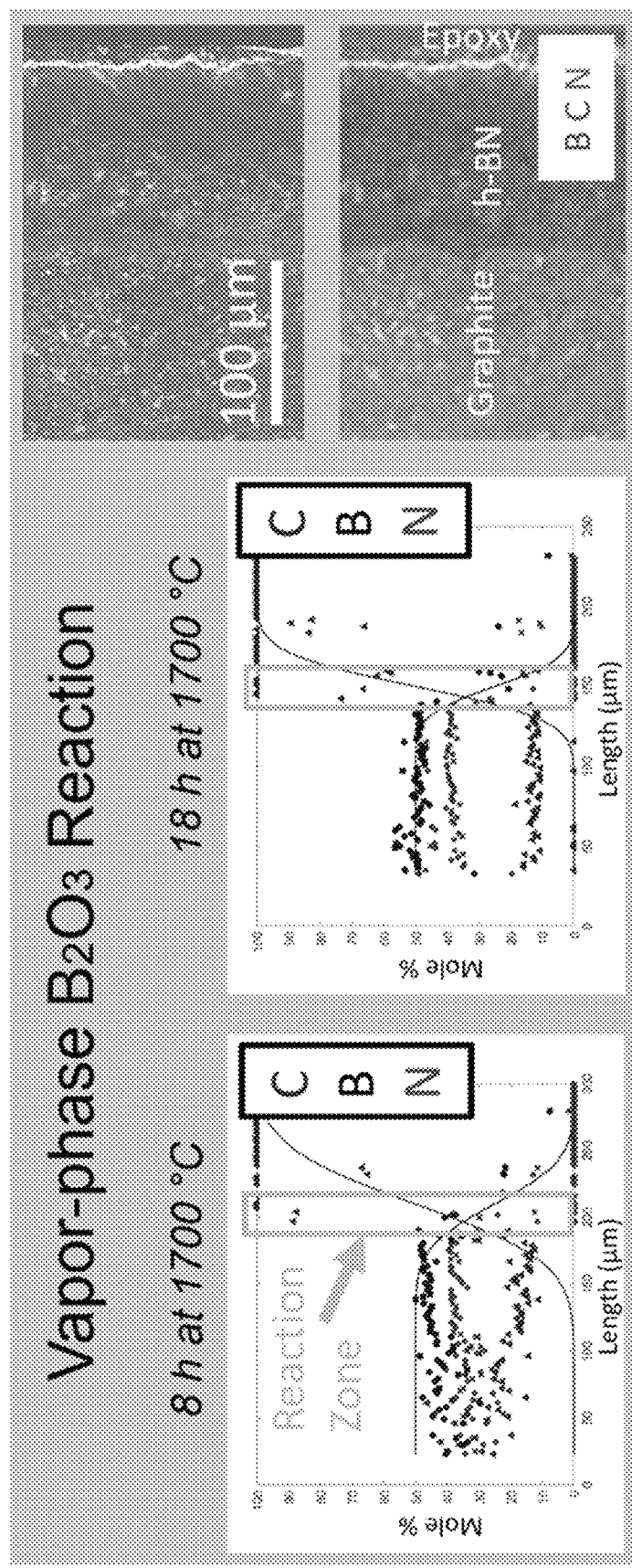
FIGS. 7A-7B: Diffusion profiles showing elemental composition (mol %) of the interface for both vapor-phase $B_2O_3$ (FIG. 7A) and liquid-phase $B_2O_3$ (FIG. 7B) developed h-BN. On the right are SEM micrographs (top) and EDS maps (bottom) showing the interface of cross-sectioned samples synthesized at 1700° C. for 18 h.
Figure 7B:
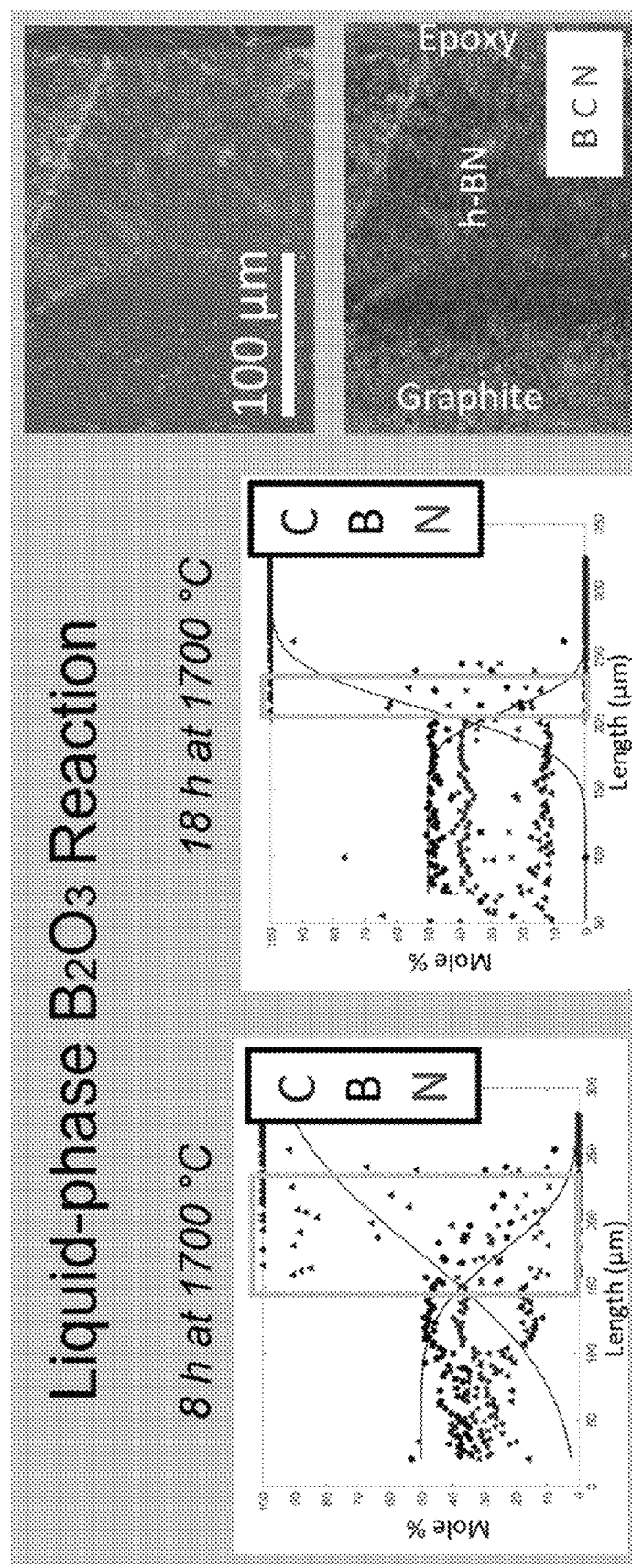

Diffusion profiles, produced from SEM-EDS analysis of sample cross-sections, can illuminate the chemical composition of the graphite/h-BN interface. Predominantly, the diffusion of B-species into graphite and C-species into the h-BN layer are examined. FIGS. 7A-7B show examples of bimaterial diffusion profiles synthesized from both liquid-phase and vapor-phase $B_2O_3$. A full summary of the diffusion profiles is included in the supplementary information.

The size of the interfacial region depends upon the reacting phase of $B_2O_3$ in Eqn. 1. Bimaterials synthesized from vapor-phase $B_2O_3$ have narrow interfacial regions that can be up to 45 µm thick. Irrespective of the reaction temperature and time, the size of the interface remains consistent throughout all samples. With vapor-phase $B_2O_3$, the vapors condense onto the exposed graphite surfaces and react according to Eqn. 1, producing h-BN layers that are slightly thinner than those produced in liquid-phase oxide reactions, with a much smoother interface.

In contrast, bimaterials synthesized from liquid-phase $B_2O_3$ have interfacial regions as large as 100 µm thick. The diffuse interface seen in these bimaterials is likely due to the highly concentrated liquid-phase $B_2O_3$ penetrating the graphite body. Shown in FIGS. 7A-7B, as the temperature and reaction time increase, the size of the interfacial region decreases significantly down to about 50 µm, indicating that the interface between the layers becomes better defined as Eqn. 1 progresses. Nevertheless, SEM-EDS maps shown in FIGS. 7A-7B illustrate that these interfacial regions are significantly more complex in liquid-phase reactions than in vapor-phase reactions.

Our observations on the position of the reaction zone front are supported by calculated effective diffusivity constants, $D_{eff}$, which are estimated based on the profiles shown in FIGS. 7A-7B, using Eqn. 9[33], $$\frac{c(x)}{c_0} = \frac{1}{2}\left[1 + \text{erf}\left(\frac{x}{\sqrt{4D_{eff}t}}\right)\right] \quad (9)$$

where $$\frac{c(x)}{c_0}$$

is the relative concentration of each diffusive species (both C and B) over a distance x for a given time t. The effective diffusivities for bimaterials produced from liquid-phase $B_2O_3$ at 1650° C. and 1700° C. are on the order of $$1 \times 10^{-10} \frac{\text{cm}^2}{\text{s}}.$$

In contrast, bimaterials synthesized from vapor-phase $B_2O_3$ have effective diffusivities on the order of $$1 \times 10^{-11} \frac{\text{cm}^2}{\text{s}}.$$

Example 1A(3.3.2). Boron Carbide Formation at the Interface

Figure 8A:
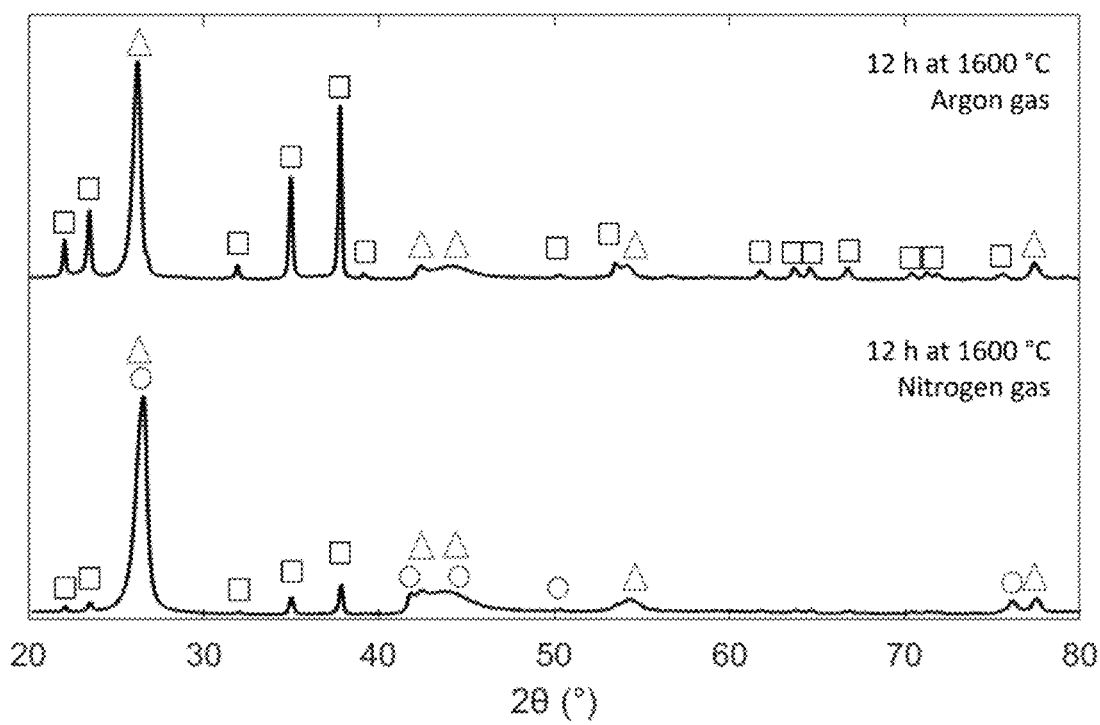
FIG. 8A: XRD of bimaterials synthesized under equivalent temperature profiles in flowing argon and nitrogen, demonstrating boron carbide formation in the absence of nitrogen, showing presence of BN (○), graphite (Δ), and boron carbide (□) under nitrogen flow.

Our studies have indicated that boron carbide initially develops within the bimaterial as a result of Eqn. 2, in the absence of nitrogen. To confirm this, the carbothermic reaction is carried out at 1600° C. for 12 h in an argon atmosphere, using the same set-up as described in Section 2. The X-ray diffraction patterns in FIG. 8A detail the results of this experiment, showing that bimaterials synthesized in argon are composed of graphite and boron carbide, supportive of the reaction described by Eqn. 2. In contrast, when the same reaction is carried out in nitrogen, h-BN is identified along with boron carbide and graphite, consistent with both Eqns. 1 and 2. The identified boron carbide in the latter likely formed in regions inaccessible to nitrogen gas, such as that below the h-BN layer near the interface with graphite.

Figure 8B:
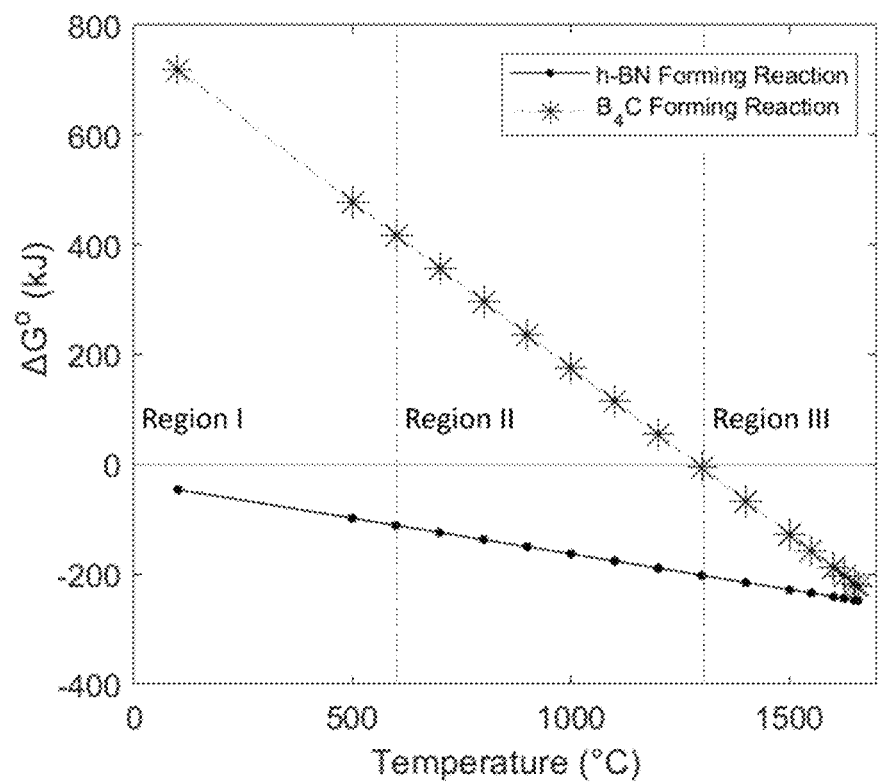
FIG. 8B: Gibbs free energy change as a function of temperature for Eqns. 1 and 2.
Figure 8C:
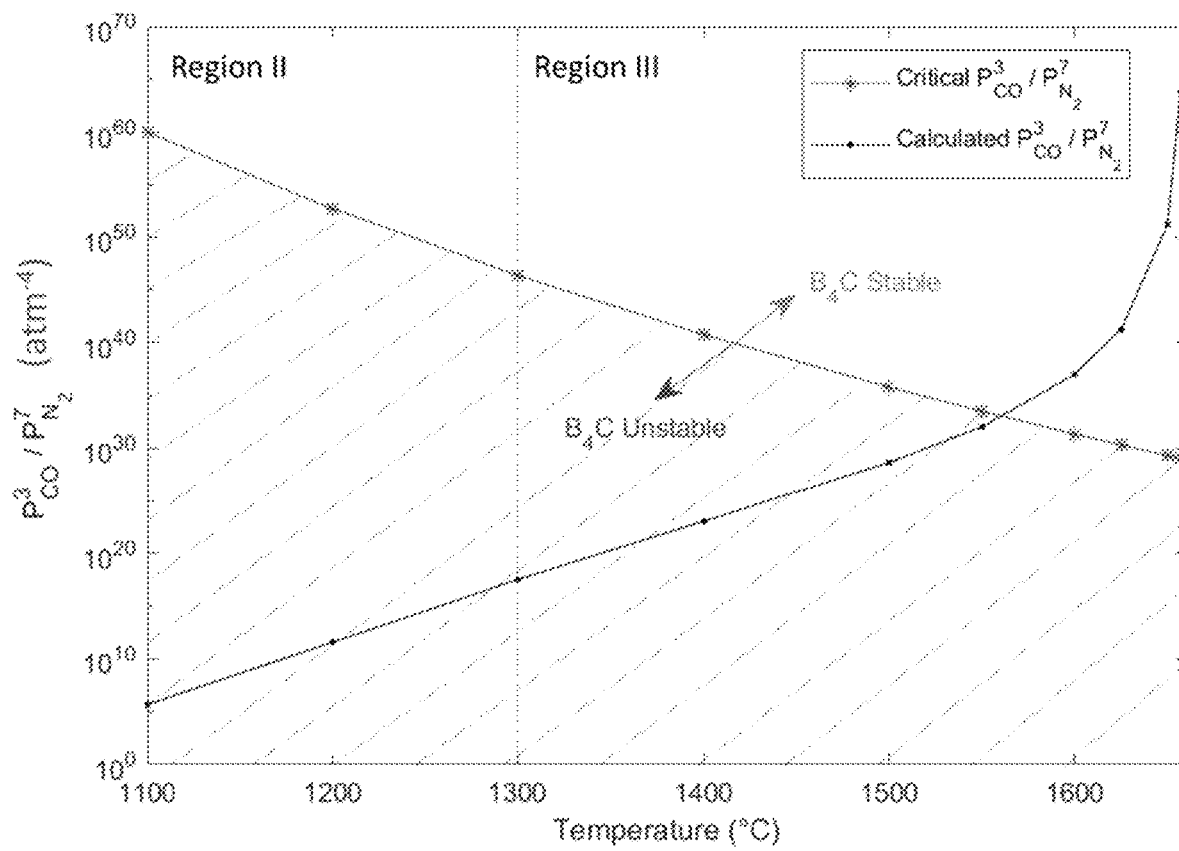
FIG. 8C: Critical ratio needed for Eqn. 10 based upon data in FIG. 4A.
Figure 8D:
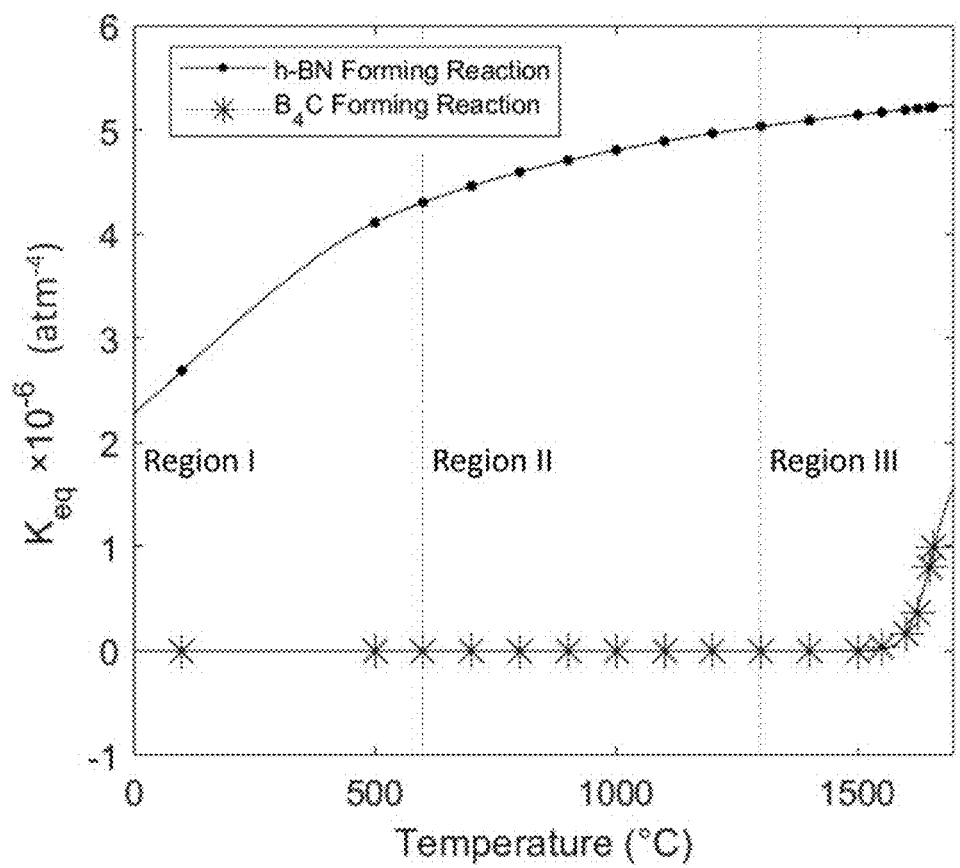
FIG. 8D: Equilibrium constants as a function of temperature for Eqns. 1 and 2.

FIG. 8B shows the Gibbs free energy change as a function of temperature for Eqns. 1 and 2, further described in the supplementary information, showing that it is energetically favorable for Eqn. 1 to take place over 2. In fact, unlike the h-BN forming carbothermic reaction, the boron carbide forming reaction requires temperatures greater than 1300° C. to occur spontaneously. FIG. 8D shows the equilibrium constant for Eqns. 1 and 2 as a function of time, and suggests that the carbide in Eqn. 2 is most likely to form at temperatures greater than 1550° C.

The stability of boron carbide and its role in the h-BN-forming carbothermic reaction has been discussed previously[12, 13]. It is widely concluded that the carbide is a product of Eqn. 2, and that it can act as an intermediate phase in the production of h-BN. However, the stability of boron carbide and its ability to convert into h-BN depends on the relative ratio of $P_{CO}$ to $P_{N_2}$. The conversion of boron carbide into h-BN can be described by:

$$3B_4C_{(s)} + B_2O_{3(l)} + 7N_{2(g)} \rightarrow 14BN + 3CO \quad (10)$$

Thus, one can use the equilibrium constant of Eqn. 10 to determine the critical ratio, $$\left(\frac{P_{CO}^3}{P_{N_2}^7}\right)_{crit},$$

needed for the reaction to occur. For a given temperature, if $$\frac{P_{CO}^3}{P_{N_2}^7} < \left(\frac{P_{CO}^3}{P_{N_2}^7}\right)_{crit}$$

then boron carbide is unstable, and Eqn. 10 can proceed. In contrast, if $$\frac{P_{CO}^3}{P_{N_2}^7} > \left(\frac{P_{CO}^3}{P_{N_2}^7}\right)_{crit},$$

boron carbide is stable and will not convert to h-BN. FIG. 8C illustrates how the critical ratio changes with temperature and compares it to the calculated ratio from the closed system described in FIG. 4A. The two plots intersect just over 1550° C., suggesting that boron carbide synthesized at 1600° C. or higher is energetically stable, and will not convert to h-BN. This is supported by FIG. 8D, which shows that the carbothermic formation of boron carbide readily occurs at temperatures greater than 1550° C.

Given the stability of the carbide phase under the conditions described, a crucial way to avoid boron carbide from forming in the bimaterial is to ensure that sufficient nitrogen is accessible to facilitate Eqn. 1, or alternatively Eqn. 10, both in the liquid-phase and vapor-phase reactions. One solution is to choose a synthesis temperature, like 1700° C., and a holding time, like 18 h, to ensure that sufficient nitrogen can dissolve into the $B_2O_3$ melt (FIG. 5), and to maximize the amount of vapor-phase $B_2O_3$ in the crucible (FIG. 4A). Rationally, our experimental set-up (described in Materials & Methods) differs from the closed system described in FIGS. 4A-4C, since a constant stream of $N_2$ gas flows into the system throughout the bimaterial synthesis. This replenishment of $N_2$ throughout the carbothermic reaction should also help minimize boron carbide formation.

Example 1A(3.3.3). Interfacial Fracture Toughness

Figure 9A:
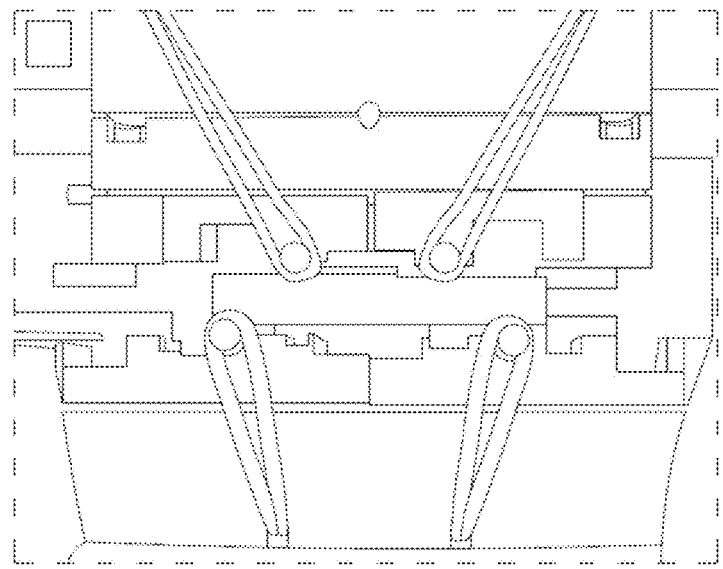
FIG. 9A: Set-up for 4-point bending for single-edge-notched-beam (SENB) test.

To quantify the adhesion of the h-BN layer on the graphite body, and further probe the properties at the interface of the bimaterial, single-edge-notch beam tests are carried out to measure the interfacial fracture toughness. FIG. 2 and FIG. 9A illustrate the test set-up. Additional dimensional requirements for the beam are described in the supplementary information. Fracture toughness, $K_{Ic}$, is calculated using Eqn. 11[23, 24]:

$$K_{Ic} = \frac{3Pe\sqrt{a}}{db^2}\left[1.99 - 2.47\left(\frac{a}{b}\right) + 12.97\left(\frac{a}{b}\right)^2 - 23.17\left(\frac{a}{b}\right)^3 + 24.80\left(\frac{a}{b}\right)^4\right] \quad (11)$$

where P is the load to failure, a is the precrack length, b is the height of the beam, d is the width, and e is fixed at 10 mm for this configuration.

The fracture toughness of the graphite substrate is measured to be 0.96±0.07 MPa√m. The fracture toughness of a commercial grade of binderless h-BN (AX05, Saint-Gobain) is measured for comparison, and found to be 0.66±0.10 MPa√m. The fracture toughness of the porous h-BN layer synthesized at 1600° C. for 12 h (shown in FIG. 3E) is measured to be 0.12±0.06 MPa√m. A notable improvement in fracture toughness is achieved by increasing the temperature and time of the carbothermic reaction to 1700° C. for 18 h. Under these conditions, it is found that the average interfacial fracture toughness for bimaterials synthesized from liquid-phase $B_2O_3$ is 0.42±0.14 MPa√m, statistically similar to samples synthesized from vapor-phase $B_2O_3$ which is 0.39±0.09 MPa√m. Such values approach the fracture toughness of the hot-pressed, denser commercial grade of binderless h-BN.

Figure 9B:
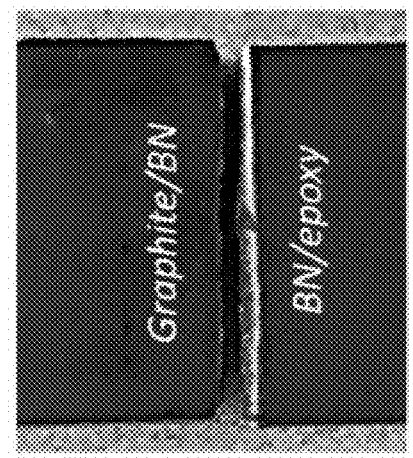
FIG. 9B: Example of failed beam, showing fracture through the h-BN layer.
Figure 9C:
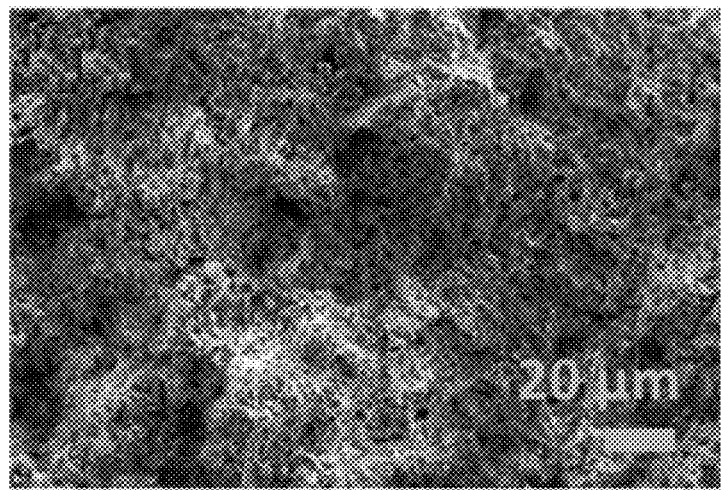
FIG. 9C: Microstructure of mode I fracture surface, illustrating the porosity of the h-BN layer.
Figure 9D:
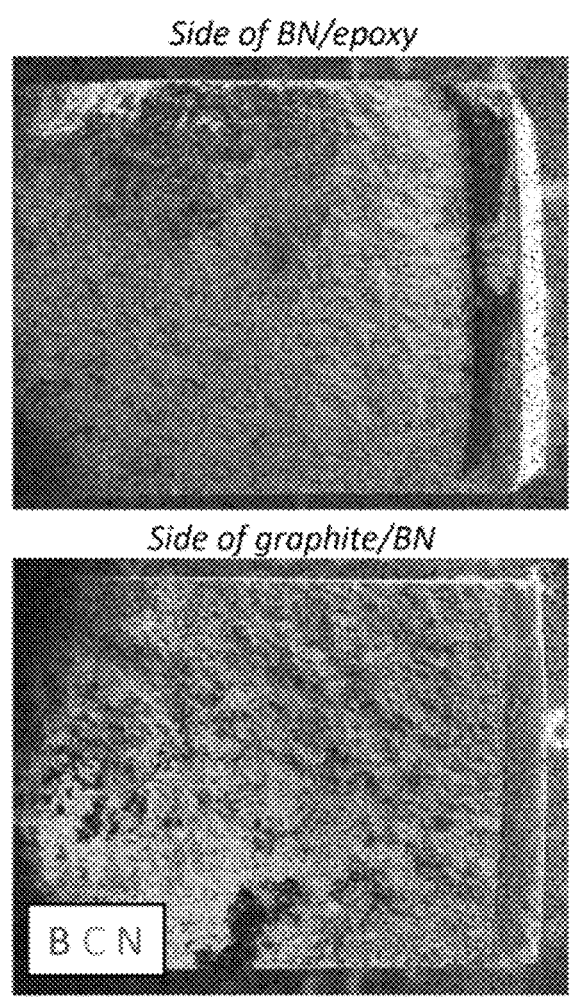
FIG. 9D: SEM-EDS maps of the mode I fracture surfaces, confirming that failure occurred through the porous h-BN layer.
Figure 10A:
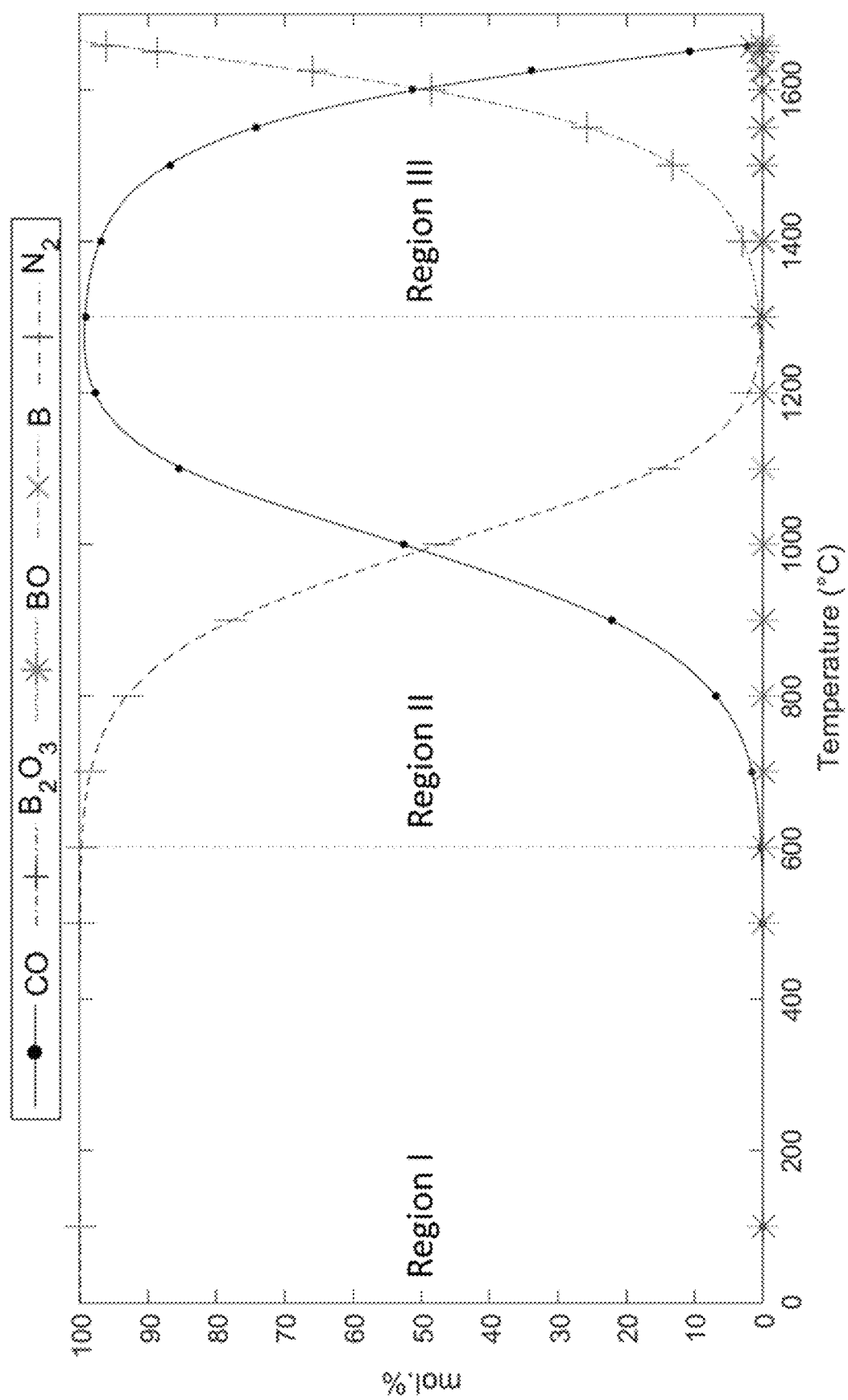
FIG. 10A: Mole % of vapor-phase CO, BO, B, $B_2O_3$ and $N_2$ as a function of temperature, showing three distinct regions largely populated by $N_2$, CO, and $B_2O_3$ respectively.
Figure 10B:
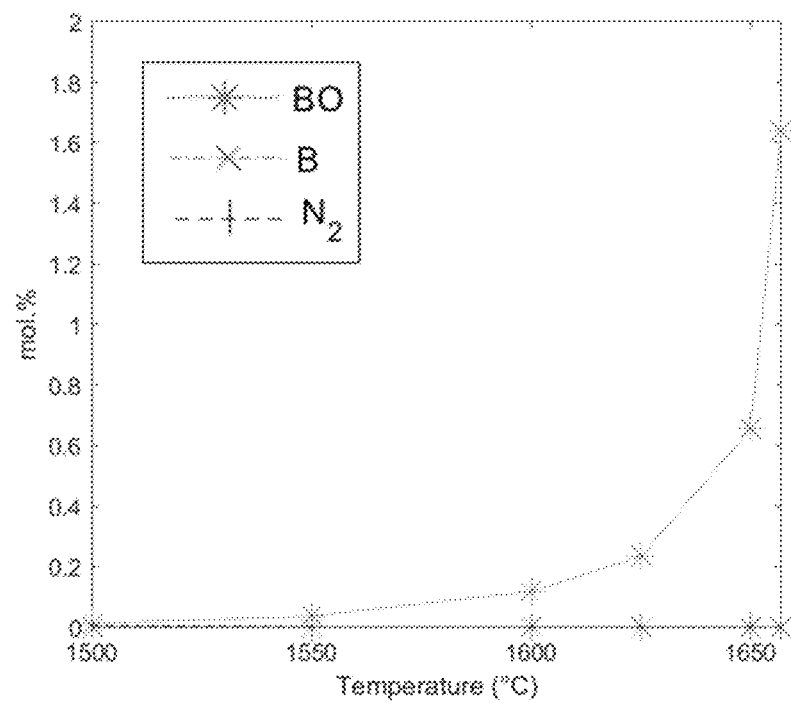
FIG. 10B: Close-up of FIG. 10A showing increase in $P_{BO}$ with temperature.
Figure 10C:
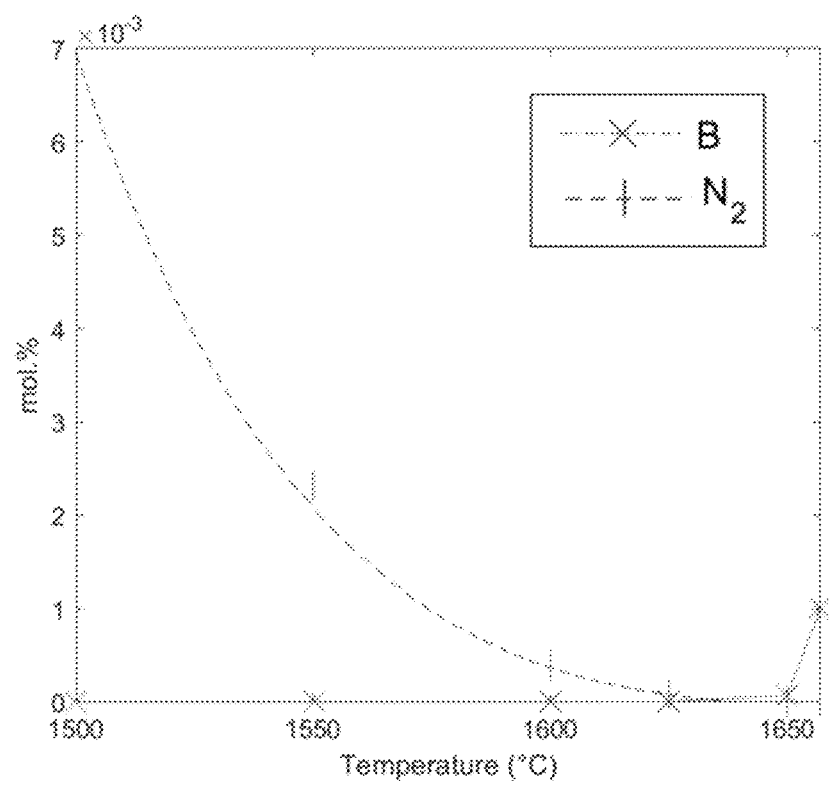
FIG. 10C: Close-up of FIG. 10A showing increase in $P_B$ with temperature. Note different y-axis scales in FIG. 10B and FIG. 10C.
Figure 11A:
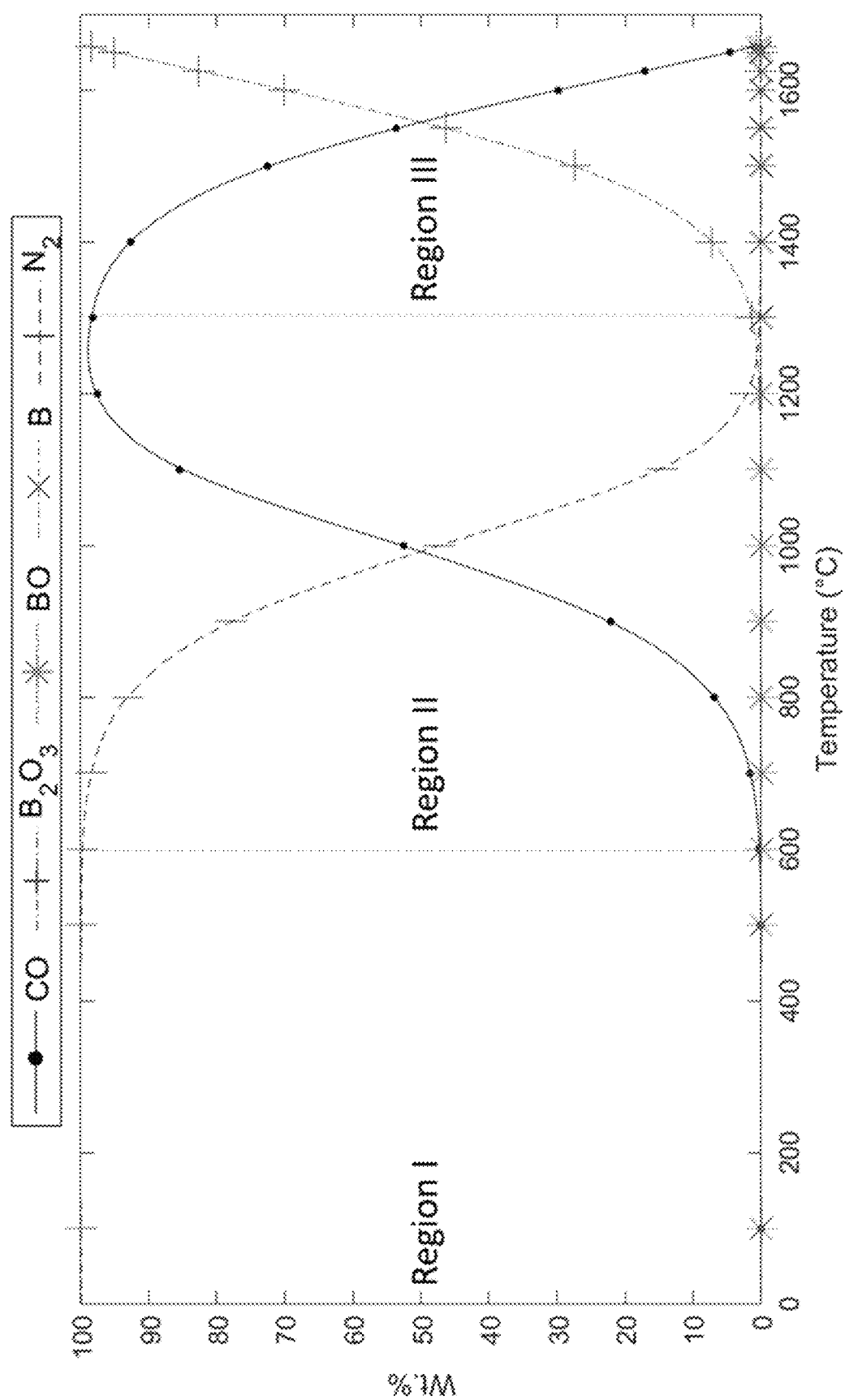
FIG. 11A: Weight % of vapor-phase CO, BO, B, $B_2O_3$ and $N_2$ as a function of temperature, showing three distinct regions largely populated by $N_2$, CO, and $B_2O_3$ respectively.
Figure 11B:
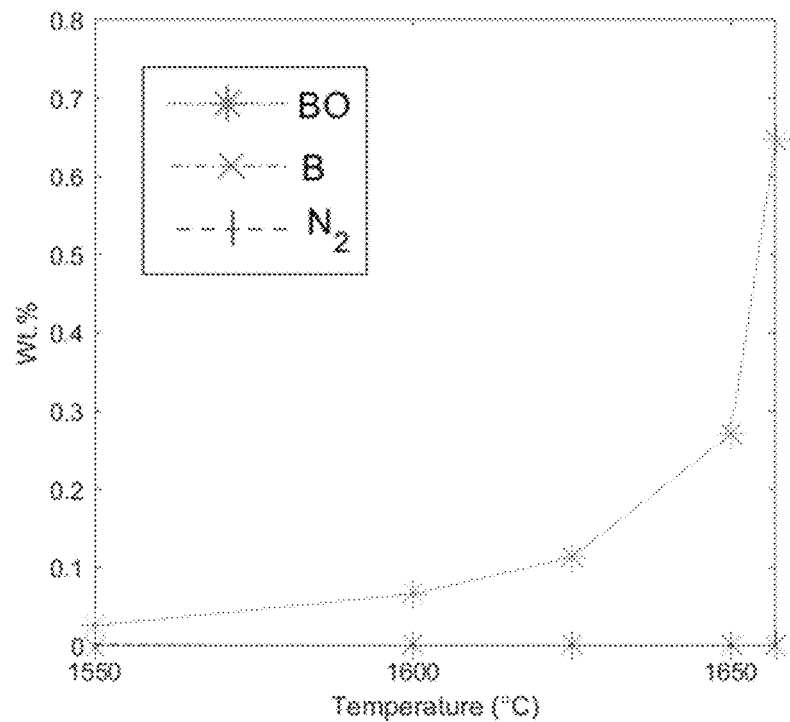
FIG. 11B: Close-up of FIG. 11A showing increase in $P_{BO}$ with temperature.
Figure 11C:
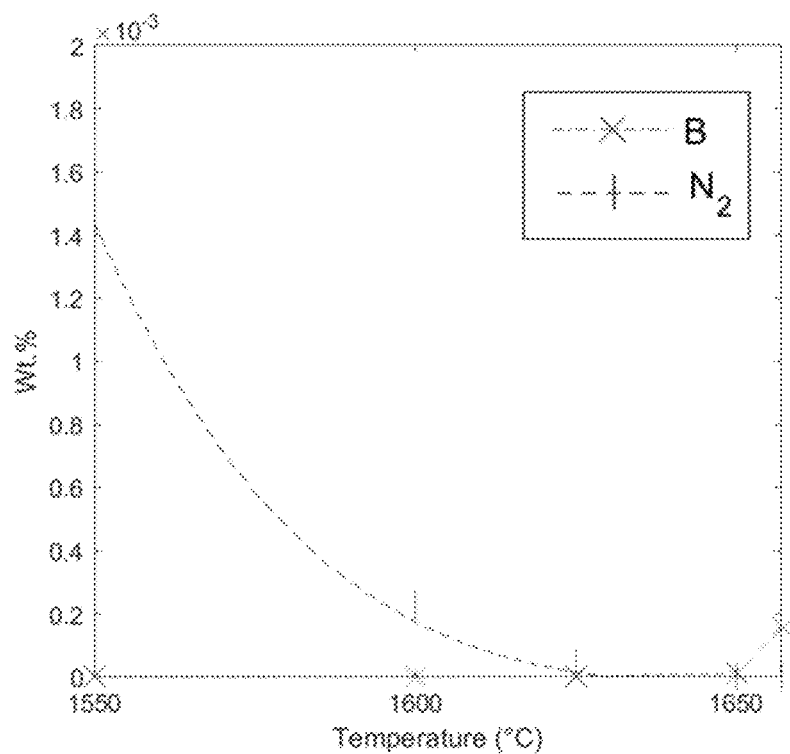
FIG. 11C: Close-up of FIG. 11A showing increase in $P_B$ with temperature. Note different y-axis scales in FIG. 11B and FIG. 11C.

FIGS. 9B-9D show examples of the fracture toughness test results for liquid-phase grown graphite/h-BN bimaterials (1700° C. over 18 hours), demonstrating that the material failed within the h-BN layer, as is the case with all samples. The microstructure in FIG. 9C reveals porosity within the h-BN layer, where the pores size distribution includes extended tail reaching pore sizes up to 32 µm in diameter;

these large pores could have emerged from trapped CO as a consequence of Eqn. 1. A detailed description of the pore size distribution measurements in the h-BN layer is included in the supplementary information. Although increasing the temperature and holding time of the carbothermic reaction appeared to densify the h-BN layer at the surface, seen in FIGS. 3A-3G and FIGS. 6A-6C, it did not fully densify the structure internally, resulting in internal pores that facilitated crack deflection. An observation related to the internal pores is that positioning the precrack closer to the h-BN layer resulted in a fracture toughness of 0.28±0.02 MPa√m, while having a precrack closer to the uneven interface with graphite resulted in a fracture toughness of 0.53±0.05 MPa√m. This may suggest that the microstructure and porosity may not be uniform through the thickness of the h-BN layer, and that methods to rid the system of internal porosity should be a focus of subsequent research.

Relative to graphite, the low toughness of the h-BN layer ensures that the bimaterial will always fail within the outer layer, and that we see no evidence for a preferred deflection path towards the interface. The results suggest that the interface toughness is greater than that of the h-BN, such that the graphite body will remain protected by a layer of h-BN and continue functioning as a bimaterial.

Example 1A(4)

To create graphite/h-BN bimaterials, a carbothermal synthesis process is developed where the bimaterials has graphite bodies covered by an exterior ceramic layer of h-BN. The surface of the graphite substrate is converted to h-BN during the high-temperature carbothermic reduction of $B_2O_3$ into h-BN within nitrogen environments. This results in a h-BN layer up to 156±18 µm thick, of varied microstructure depending on the reaction temperature and holding time, shedding light into the processing-microstructure relationship of this synthesis method. Densification is improved by increasing the reaction temperature to 1700° C., and by increasing the holding time to 18 h.

The phase of the reacting $B_2O_3$ is found to play a role in the growth and thickness of the h-BN layer, with liquid-phase $B_2O_3$ producing the thickest layers and roughest interfaces compared to vapor-phase $B_2O_3$. Differences between the two phases are mainly due to relative concentrations of $B_2O_3$ and $N_2$, as determined by the partial pressures of the reacting vapors and the dissolution of $N_2$ into the $B_2O_3$ melt.

Notably, the effectiveness of the vapor-phase at converting graphite surfaces, particularly at process conditions of 1700° C. for 18 h holds, is a promising result, motivating further research. This would include optimization of various processing paraments, principally nitrogen flow rate.

The interface of the bimaterial is studied in detail. An alternate carbothermic reaction is shown to take place in the absence of nitrogen, producing boron carbide from the carbothermal reduction of $B_2O_3$. Thermochemical analysis showed that the h-BN forming reaction is energetically more favorable than the boron carbide forming reaction. Nevertheless, our studies showed that the stability of boron carbide relies on the equilibrium partial pressures of CO and $N_2$, as well as the temperature of the reaction. To avoid the formation of boron carbide in the bimaterials, it is found that increasing the reaction temperature to 1700° C. maximized the dissolution of $N_2$ into the melt and promoted h-BN production.

The fracture toughness of the bimaterial remained constant regardless of the reacting phase of $B_2O_3$, showing no statistical difference between bimaterials developed from vapor-phase or liquid-phase $B_2O_3$, with the bimaterial failing repeatedly within the h-BN layer. Internal pores promoted fracture through the outer h-BN layer, avoiding crack deflection toward the interface, which points to a promising adhesion between h-BN and graphite.

Compared to bulk h-BN ceramics, the graphite-bodied h-BN bimaterial is easier to machine and more economical to process for industrial applications, while still retaining the properties of h-BN at the surface. In particular, the design of the layered bimaterial ensures that fracture will occur through the h-BN layer, while protecting the bulk material structure and its interface with h-BN. This is a principal finding, given that bulk h-BN is notoriously brittle, while the bimaterial in comparison is protected by the graphite/h-BN interface. Overall, as demonstrated in this work, by understanding the underlying thermochemistry and kinetics of the governing reactions, it is possible to optimize the conditions of the carbothermal synthesis for the desired bimaterial to produce tailored h-BN layer thicknesses, microstructures, and interfacial properties.

References associated with Example 1A:
1. Jacobson N, Farmer S, Moore A, Sayir H. High-temperature oxidation of boron nitride: i, monolithic boron nitride. *Journal of the American Ceramic Society.* 2004; 82(2): 393-398. https://doi.org/10.1111/j.1551-2916.1999.tb20075.x
2. Solozhenko V L, Turkevich V Z, Holzapfel W B. Refined phase diagram of boron nitride. *The Journal of Physical Chemistry B.* 1999; 103(15):2903-2905.
3. Hubáček M, Ueki M, Sato T, Brožek V. High-temperature behaviour of hexagonal boron nitride. *Thermochimica Acta.* 1996; 282-283:359-367. https://doi.org/10.1016/0040-6031(96)02884-5
4. Zhang Z, Duan X, Qiu B, et al. Preparation and anisotropic properties of textured structural ceramics: A review. *Journal of Advanced Ceramics.* 2019; 8(3):289-332. https://doi.org/10.1007/s40145-019-0325-5
5. O'Connor T E. Synthesis of boron nitride. *Journal of the American Chemical Society.* 1962; 84(9):1753-1754. https://doi.org/10.1021/ja00868a065
6. Thomas J, Weston N E, O'Connor T E. Turbostratic boron nitride, thermal transformation to ordered-layer-lattice boron nitride. *Journal of the American Chemical Society.*
7. Medvedovski E. Preparation of boron nitride-based coatings through thermal diffusion process. *Advances in Applied Ceramics.* 2018; 117(4):221-230. https://doi.org/10.1080/17436753.2017.1397938
8. Hubáček M, Ueki M. Chemical reactions in hexagonal boron nitride system. *Journal of Solid State Chemistry.* 1996; 123:215-222. https://doi.org/10.1006/jssc.1996.0171
9. Mashnitskii A A, Andreeva T V, Dubovik T V. High-temperature graphite protective coatings. *Refractories.* 1971; 12(11-12):728-730. https://doi.org/10.1007/BF01285611
10. Bartnitskaya T S, Vlasova M V, Lyashenko V I, Serebryakova T I, Timofeeva I I, Tomila T V. Formation of highly disperse boron nitride in carbothermal reduction in the presence of lithium compounds. *Powder Metallurgy and Metal Ceramics.* 1993; 32(1):63-72. https://doi.org/10.1007/B F00559737
11. Bartnitskaya T S, Lyashenko V I, Kurdyumov A V, Ostrovskaya N F, Rogovaya I G. Effect of lithium on structure formation of graphite-like boron nitride with carbothermal synthesis. *Powder Metallurgy and Metal Ceramics.* 1995; 33(7-8):335-340. https://doi.org/10.1007/BF00559576
12. Aydoğdu A, Sevinç N. Carbothermic formation of boron nitride. *Journal of the European Ceramic Society.* 2003; 23(16): 3153-3161. https://doi.org/10.1016/S0955-2219(03)00092-X
13. Çamurlu H E, Sevinç N, Topkaya Y. Role of boron carbide in carbothermic formation of hexagonal boron nitride. *Journal of Materials Science.* 2006; 41(15):4921-4927. https://doi.org/10.1007/s10853-006-0339-6
14. Pikalov S N. Mechanism of formation of graphitelike boron nitride in the carbothermal process. *Soviet Powder Metallurgy and Metal Ceramics.* 1988; 27:404-406.
15. Hofer R R, Cusson S E, Lobbia R B, Gallimore A D. The H9 Magnetically Shielded Hall Thruster. *35th International Electric Propulsion Conference, IEPC-2017-232.* Altanta, GA: 2017:18.
16. Sheldon B W, Sun E Y, Nutt S R, Brennan J J. Oxidation of B N-coated SiC fibers in ceramic matrix composites. *Journal of the American Ceramic Society.* 1996; 79(2): 539-543. https://doi.org/10.1111/j.1151-2916.1996.tb08163.x
17. Opila E J, Robinson R C, Verrilli M J. Borosilicate glass-induced fiber degradation of SiC/B N/SiC composites exposed in combustion environments. *International Journal of Applied Ceramic Technology.* 2016; 13(3):434-442. https://doi.org/10.1111/ijac.12499
18. Yates B, Overy M J, Pirgon O. The anisotropic thermal expansion of boron nitride. *The Philosophical Magazine: A Journal of Theoretical Experimental and Applied Physics.* 1975; 32(4):847-857. https://doi.org/10.1080/14786437508221624
19. Xiaowei L, Jean-Charles R, Suyuan Y. Effect of temperature on graphite oxidation behavior. *Nuclear Engineering and Design.* 2004; 227(3):273-280. https://doi.org/10.1016/j.nucengdes.2003.11.004
20. Zhang Z, Wei C, Liu R, et al. Experiment and simulation analysis on thermal shock resistance of laminated ceramics with graphite and boron nitride interfaces. *Ceramics International.* 2021; 47(9):11973-11978. https://doi.org/10.1016/j.ceramint.2021.01.039
21. Chari C S, Faber K T, McEnerney B W, Hofer R R, Wollmershauser J A, Gorzkowski E P. Graphite/Hexagonal Boron Nitride Bimaterials For Electric Propulsion. U.S. Provisional Patent Application No. 63/401,226. 2022.
22. Chari C S, Faber K T. Oxidation resistance of AlN/BN via mullite-type $Al_{18}B_4O_{33}$. *Journal of the European Ceramic Society.* 2022; 42(8):3437-3445. https://doi.org/10.1016/j.jeurceramsoc.2022.02.037
23. Srawley J, Brown W. Fracture toughness testing methods. Fracture toughness testing. National Aeronautics and Space Administration; 1965
24. Kleer G, Schonholz R, Doll W, Sturlese S. Interface crack resistance of zirconia base thermal barrier coatings. *High performance ceramic films and coatings.* 1991:329-328.
25. Song L, Ci L, Lu H, et al. Large scale growth and characterization of atomic hexagonal boron nitride layers. *Nano Letters.* 2010; 10(8):3209-3215. https://doi.org/10.1021/nl1022139
26. Park H, Kim T K, Cho S W, Jang H S, Lee S I, Choi S-Y. Large-scale synthesis of uniform hexagonal boron nitride films by plasma-enhanced atomic layer deposition. *Scientific Reports.* 2017; 7(1): 40091. https://doi.org/10.1038/srep40091

27. Cullity B D. Elements of X-ray diffraction. Addison-Wesley Publishing Company; 1956
28. Hatta H, Sohtome T, Sawada Y, Shida A. High temperature crack sealant based on $SiO_2$—$B_2O_3$ for SiC coating on carbon—carbon composites. *Advanced Composite Materials*. 2003; 12(2-3):93-106. https://doi.org/10.1163/156855103772658498
29. Yoon S J, Jha A. Vapour-phase reduction and the synthesis of boron-based ceramic phases. *Journal of Materials Science*. 1996; 31(9):2265-2277. https://doi.org/10.1007/BF01152935
30. Yoon S J, Jha A. Vapour-phase reduction and the synthesis of boron-based ceramic phases. *Journal of Materials Science*. 1995; 30(3):607-614. https://doi.org/10.1007/BF00356318
31. Wakasugi T, Tsukihashi F, Sano N. The solubilities of BN in $B_2O_3$ bearing melts. *Journal of Non-Crystalline Solids*. 1991; 135(2-3):139-145. https://doi.org/10.1016/0022-3093(91)90414-2
32. Wakasugi T, Tsukihashi F, Sano N. Thermodynamics of nitrogen in $B_2O_3$, $B_2O_3SiO_2$, and $B_2O_3CaO$ systems. *Journal of the American Ceramic Society*. 1991; 74(7): 1650-1653. https://doi.org/10.1111/j.1151-2916.1991.tb07154.x
33. Dennis E. Readey. Chapter 14. Interdiffusion and Metals. Kinetics in Materials Science and Engineering. Boca Raton, FL: CRC Press, Taylor & Francis Group; 2017: 479-517.

Example 1B. Additional Exemplary Details and Aspects Supplemental to Example 1A Additional exemplary or optional details, features, compositions, materials, characterization, properties, applications, benefits, devices, configurations, components, and other aspects are provided in this Example 1B and sub-examples herein. All aspects combined, each and any aspect individually, and each and any combination of any of the aspects provided herein are contemplated and explicitly disclosed herein.

Example 16(1). Equilibrium Partial Pressure Calculations $$B_2O_{3(l)}+3C_{(s)}+N_{2(g)} \rightarrow 2BN_{(s)}+3CO_{(g)} \quad (1)$$

The standard Gibbs free energy change in Joules for Eqn. 1 is calculated to be:

$$\Delta G_{(1)}°=2,550-(130 \times T)$$

using thermochemical data from Chase[22].

$$2B_2O_{3(l)}+7C_{(s)} \rightarrow B_4C_{(s)}+6CO_{(g)} \quad (2)$$

The standard Gibbs free energy change in joules for Eqn. 2 is calculated to be:

$$\Delta G_{(2)}°=946,000-(605 \times T)$$

using thermochemical data from Chase[22].

$$B_2O_{3(l)} + 2C_{(s)} \rightarrow 2BO_{(g)} + CO_{(g)} \quad (3)$$

$$B_2O_{3(l)} + 3C_{(s)} \rightarrow 2B_{(g)} + 3CO_{(g)} \quad (4)$$

$$B_2O_{3(l)} \rightarrow B_2O_{3(g)} \quad (5)$$

$$2B_{(g)} + \frac{1}{2}N_{2(g)} \rightarrow BN \quad (6)$$

The equilibrium partial pressures of the gaseous species in a closed system can be estimated by determining the equilibrium constants, K, of these reactions. The standard Gibbs free energy change in joules for Eqns. 3 to 6 are as follows:

$$\Delta G_{(3)}°=1,106,840-(473.42 \times T)$$

$$\Delta G_{(4)}°=2,025,980-(763 \times T)$$

$$\Delta G_{(5)}°=359,995-(186.2 \times T)$$

$$\Delta G_{(6)}°=-820,780+(235.43 \times T)$$

Note that $\Delta G_{(3)}°$, $\Delta G_{(4)}°$ and $\Delta G_{(6)}°$ are taken from Aydoğdu et al[12] from data compiled by Turkdogan[31], while $\Delta G_{(5)}°$ is taken from Yoon et al[30]. Equilibrium constants could then be calculated at a given temperature through the following relationship:

$$K_{(i)} = \exp(-\Delta G_{(i)}°/T).$$

The equilibrium partial pressures are thus calculated by finding the simultaneous solution of the following equations:

$$K_{(3)} = P_{BO}^2 \times P_{CO}$$

$$K_{(4)} = P_B^2 \times P_{CO}^3$$

$$K_{(5)} = P_{B_2O_3}$$

$$K_{(6)} = \frac{1}{P_B \times P_{N_2}^{1/2}}$$

where $P_{CO}+P_B+P_{BO}+P_{N_2}+P_{B_2O_3}=1$ $$\frac{1}{2}N_{2(g)} + \frac{1}{2}B_2O_{3(l)} \rightarrow BN_{(s)} + \frac{3}{4}O_{2(g)} \quad (7)$$

The standard Gibbs Free Energy change in joules for Eqn. 7 is $\Delta G_{(7)}°=364,000-(17.4 \times T)$, where $$K_{(7)} = \frac{P_{O_2}^{3/4}}{P_{N_2}^{1/2}} \text{ (units of atm}^{-1/4}\text{)}$$

$$3B_4C_{(s)}+B_2O_{3(l)}+7N_{2(g)} \rightarrow 14BN+3CO \quad (10)$$

The standard Gibbs free energy change in Joules for Eqn. (10) is calculated to be $\Delta G_{(10)}°=-2,820,000-(-906 \times T)$ using thermochemical data from Chase[22], where $$K_{(10)} = \frac{P_{CO}^3}{P_{N_2}^7} \text{ (units of atm}^{-4}\text{)}.$$

Example 16(2). Relative Concentration of Vapor-Phase Species in h-BN Forming Carbothermic Reaction Knowing the equilibrium partial pressures of CO, BO, B, $N_2$ and $B_2O_3$ as shown in FIG. 5, and the volume of the crucible as 0.024 L, the mole % and wt % of the gaseous species could be estimated using the ideal gas law.

Example 1B(3). Diffusion Profiles at the Interface of Graphite/h-BN

The most dispersed interface is seen when the reaction is carried out for 8 h at 1650° C., which shows evidence of $B_4C$ formation in this sample, as is previously seen with X-ray spectra (FIG. 6C) and supported by the SEM-EDS map in FIG. 3B. As the temperature and reaction time increase, the size of the interfacial region decreases significantly; the interface between the layers becomes better defined as reaction (1) progresses.

Please note that the residual C-content detected within the h-BN layer is likely due the cross-sectioned samples being carbon-coated for electron imagining analyses.

Example 1B(4). Interfacial Fracture Toughness Measurements

To quantify the adhesion of the h-BN layer on the graphite body, and further probe the properties at the interface of the bimaterial, single-edge-notch beam tests are carried out to measure the interfacial fracture toughness. Fracture toughness, $K_{Ic}$, is calculated using equation 11[23, 24].

$$K_{Ic} = \frac{3Pe\sqrt{a}}{db^2}\left[1.99 - 2.47\left(\frac{a}{b}\right) + 12.97\left(\frac{a}{b}\right)^2 - 23.17\left(\frac{a}{b}\right)^3 + 24.80\left(\frac{a}{b}\right)^4\right] \quad (11)$$

where P is the load to failure, a is the precrack length, b is the height of the beam, d is the width, and e is fixed at 10 mm for this configuration, with requirements for the beam dimensions shown in equations (12) to (16).

$$\frac{s - 2e}{b} > 2 \quad (12)$$

$$\frac{s}{b} \geq 2 \quad (13)$$

$$l \geq 4.2b \quad (14)$$

$$0 < \frac{a}{b} < 0.6 \quad (15)$$

$$2 \leq \frac{b}{d} \leq 8 \quad (16)$$

Example 16(5). Pore Size Distribution Data

The distribution of pore sizes in the h-BN layer of the bimaterial is estimated using the image-processing tool ImageJ (National Institutes of Health). The pores are approximated as circles in order to provide a rough estimate of the pore diameter distribution. An average of 249 pores are measured for each sample shown in FIGS. 13A-13D.

Figure 13A:
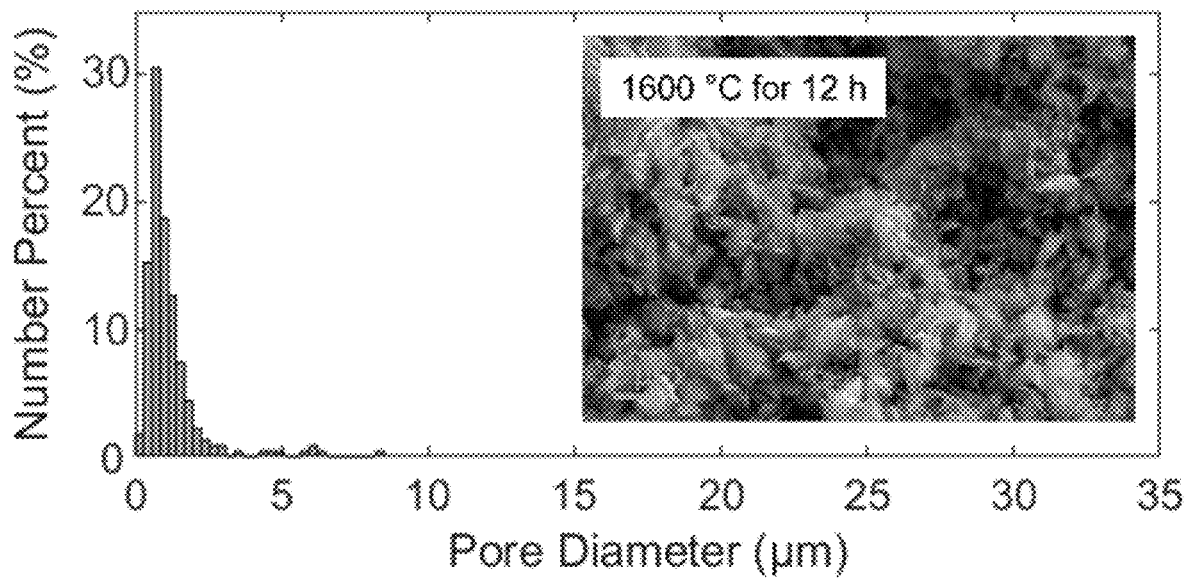
Figure 13B:
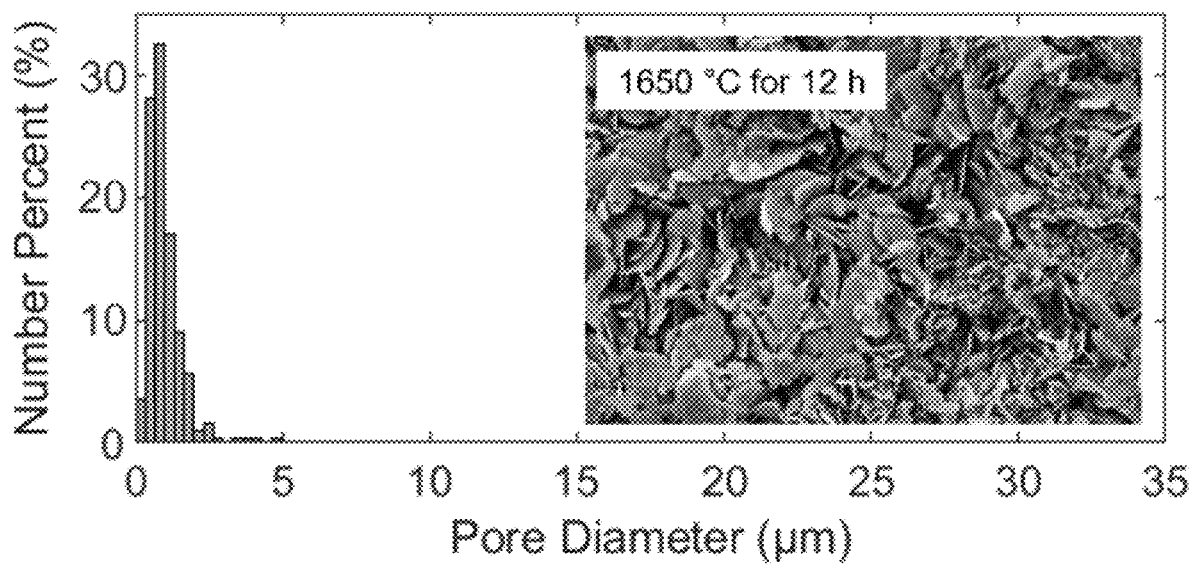
Figure 13C:
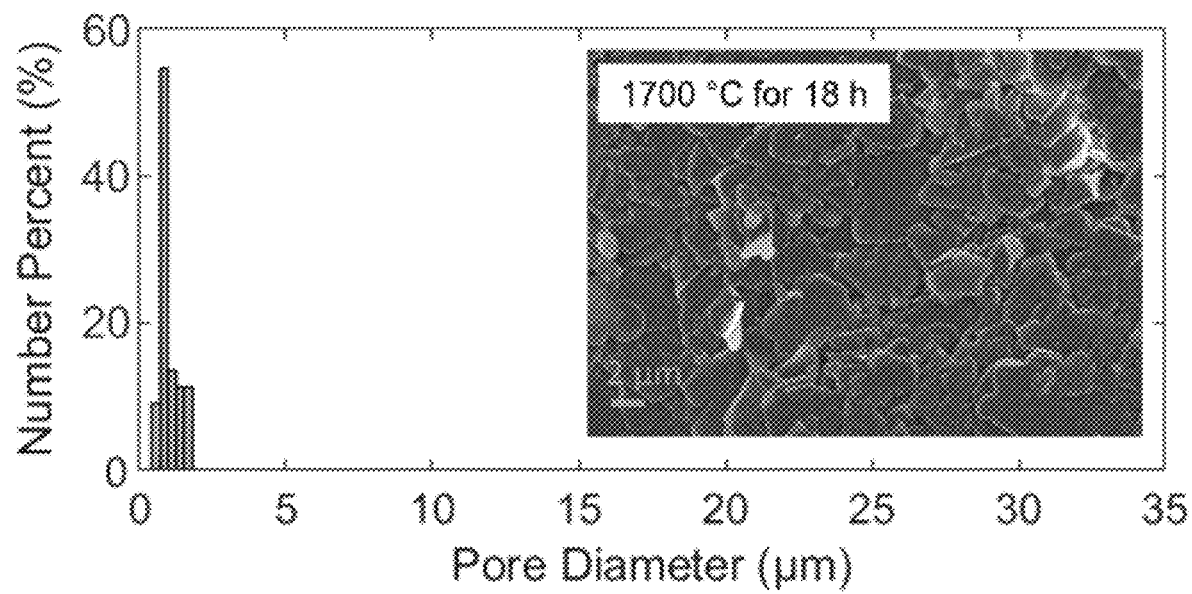
Figure 13D:
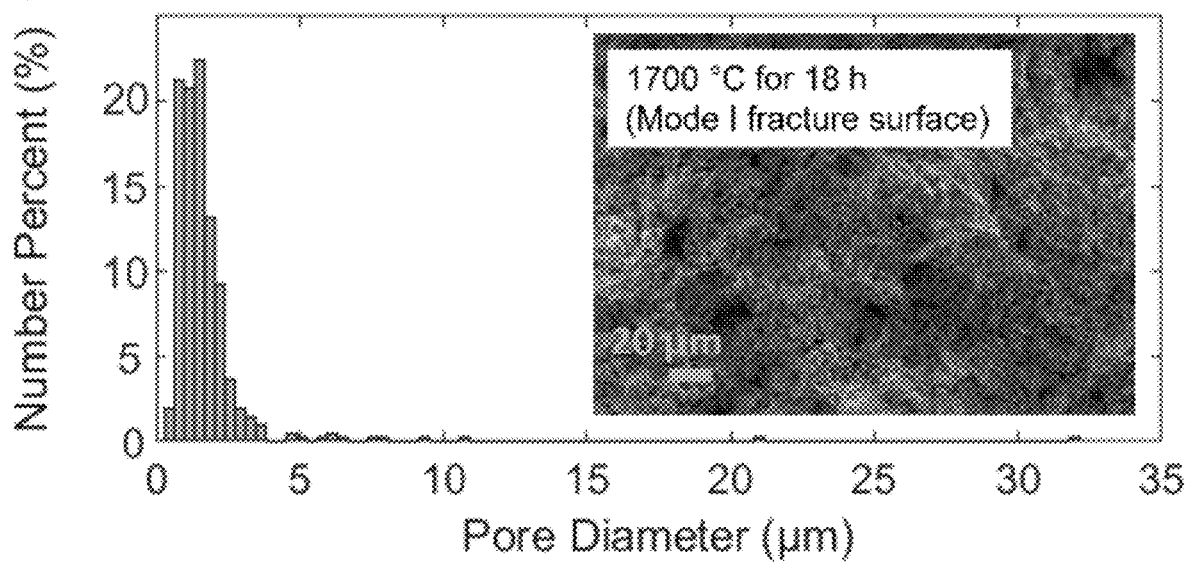
FIG. 13D: Mode I fracture surface of sample synthesized at 1700° C. for 18 h, revealing large pores (>20 μm) within the h-BN layer.

The distributions, shown in FIGS. 13A-13D, are measured for bimaterials synthesized at various temperatures and holding times. FIGS. 13A-13C demonstrate how the pore size (from the as-sintered surface-view) becomes smaller (≤2 μm) and more uniform in size as the reaction temperature and time increases. Nevertheless, FIG. 13D reveals a larger distribution of pore sizes within the inside of the h-BN layer, along the mode I fracture plane, indicating the presence of pores greater than 20 μm in diameter, which are believed to ultimately lead to the low toughness of the bimaterial.

Example 1B(6). Residue Formation During High-Temperature Carbothermic Reaction

Carrying out the carbothermic reaction at 1700° C. for 18 h can produce residual carbon nitrides on the surface of the samples, both in the liquid-phase and vapor-phase reactions. These residues can be removed from the bimaterial by sonicating the sample in deionized water, as shown in FIGS. 14A-14B.

Figure 14A:
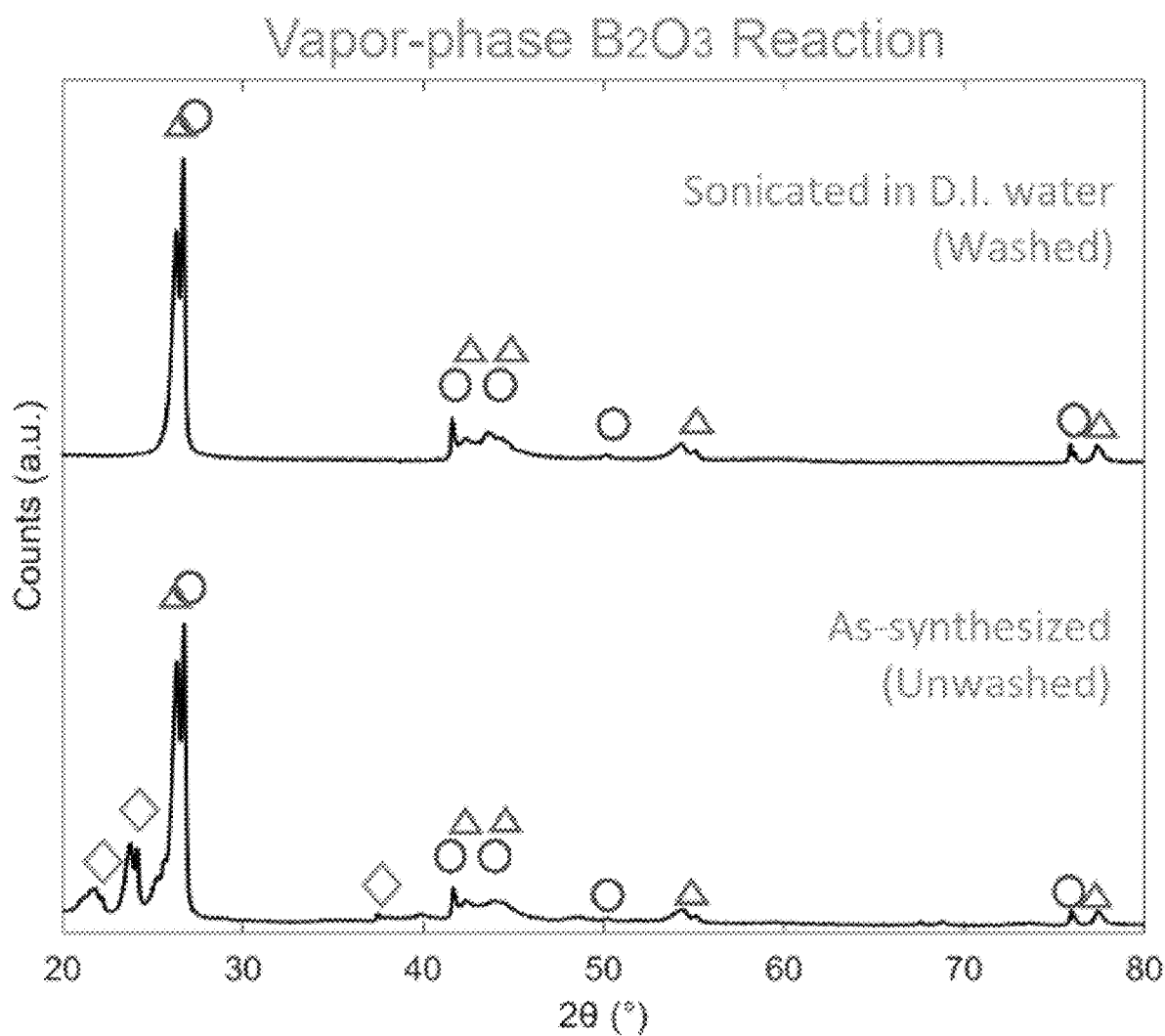
FIGS. 14A-14B: XRD spectra of bimaterials (both unwashed and washed) synthesized at 1700 C for 18 h in (FIG. 14A) vapor-phase and (FIG. 14B) liquid-phase carbothermic reactions, showing presence of h-BN (○), graphite (Δ), boron carbide (□) and carbon nitride (◇).
Figure 14B:
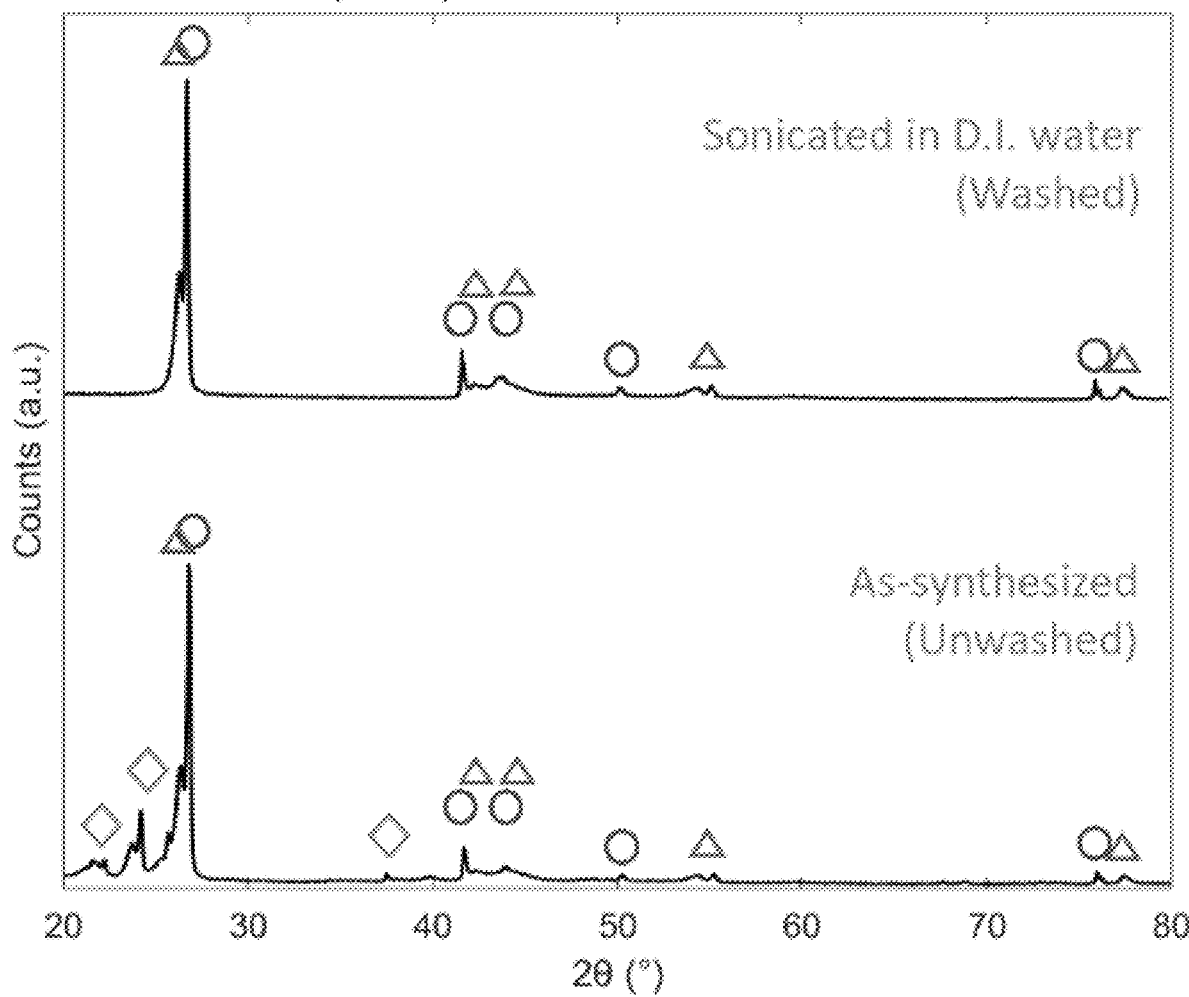

FIGS. 14A-14B demonstrate the differences between the XRD spectra of the as-synthesized (unwashed) and sonicated (washed) bimaterials (fabricated at 1700° C. for 18 h). Note that all other synthesis temperatures and holding times did not result in carbon nitride formation, and that 1700° C. for 18 h are the only conditions where this is seen.

While precautions should be taken when handling such toxic residues, these residues are not detrimental to the function of the h-BN layer.

Example 2: Evaluation of Graphite/Hexagonal Boron Nitride Bimaterials for Electric Propulsion Electric spacecraft propulsion systems utilize Hall-effect thrusters to generate thrust through the acceleration of an ionized propellant, such as xenon, that can be referred to as plasma [1]. The state-of-the-art material used for thruster channels by leading space missions is hexagonal boron nitride (h-BN). It is a chemically inert high-temperature ceramic with a low dielectric constant and high electrical resistivity, which are properties required for the operation of Hall-thrusters [2]. The material is easy to fabricate and machine into complex designs, which has made it a popular insulating material in aerospace and nuclear applications [2]. Despite its attractive properties, the brittleness of bulk h-BN has caused concerns for its performance in electric propulsion.

A novel material, previously described in Examples 1A-1B, is proposed as a candidate wall material for Hall-effect thrusters. It is a graphite/h-BN bimaterial, having a structural body of graphite with a converted surface layer of h-BN, developed from the carbothermic reaction of $B_2O_3$ in nitrogen. The material couples the dielectric behavior and low emissivity of h-BN with the thermal shock resistance and machinability of graphite, making it an ideal material for spacecraft propulsion. It can be synthesized from liquid-phase and vapor-phase carbothermic reactions, resulting in h-BN layers on the order of hundreds of microns in thickness. Detailed reports have been made on the synthesis and characterization of such bimaterials, however its performance during plasma exposures has yet to be evaluated. Provided herein is the behavior of graphite/h-BN bimaterials in thruster environments.

The lifetime of Hall-effect thrusters is determined by the sputtering of the discharge channel walls due to ion bombardment from the propellant [2-9]. Additionally, metal atoms may also be suspended in the plume and deposit onto the channel walls, affecting the wall material properties [10]. As such, it is critical to understand how graphite/h-BN bimaterials respond to exposures from the discharge plasma to learn how they can erode over time, bearing in mind that their desired operational time is between thousands to tens of thousands of hours [2].

These Examples provide the performance of graphite/h-BN bimaterials in Hall-effect thrusters operating with xenon propellant, with samples located both on the chamber walls and directly in front of the plume. Intrinsic material properties for electric spacecraft propulsion are assessed, including emissivity and resistivity. Material erosion is evaluated by monitoring changes in surface roughness, microstructure, chemical and structural composition, as well as h-BN thickness, before and after the plasma exposures. The importance of the phase of the h-BN forming carbothermic reactions on the performance of the bimaterial is discussed in detail, comparing h-BN layers developed from liquid-phase and vapor-phase carbothermic reactions.

Example 2(2) Materials & Methods

Example 2(2.1) Graphite/h-BN Synthesis

Bimaterials are prepared following the high-temperature carbothermal synthesis method described in Examples 1A-1B. Precursor powders are first prepared by mixing 9.89 g of boric acid (H2B03, Sigma Aldrich) with 0.74 g of h-BN (IDL-500, Saint-Gobain), and melting them in an $Al_2O_3$ crucible at 800° C. for 30 min using a high-temperature box furnace (CM Rapid Temp). The melt is then removed from the crucible and ground to particles of 1 μm in diameter or less, the latter which is determined by using a sieve to help screen the particle size. Approximately 4 g of said powders are placed inside a boron nitride crucible. Three rectangular graphite strips (G540, Tokai Carbon) are placed over the powders, where each 30×2×6 $mm^3$ strip weighed approximately 4.3 g. A boron nitride lid is placed over the crucible as described in Examples 1A-1B. The lidded crucible is then placed in a high-temperature tube furnace (MTI GSL-1800X with a Eurotherm 3504 controller) with flowing nitrogen gas (UHP200, Airgas). The h-BN layers are synthesized at 1700° C., with a holding time of 18 h at the target temperature. The temperature is calibrated for the SiC tube with a B-type thermocouple resting on an empty BN crucible with the same gas flow rate used in the experiments.

Example 2(2.2) Testing Chamber Set-Up

Figure 15:
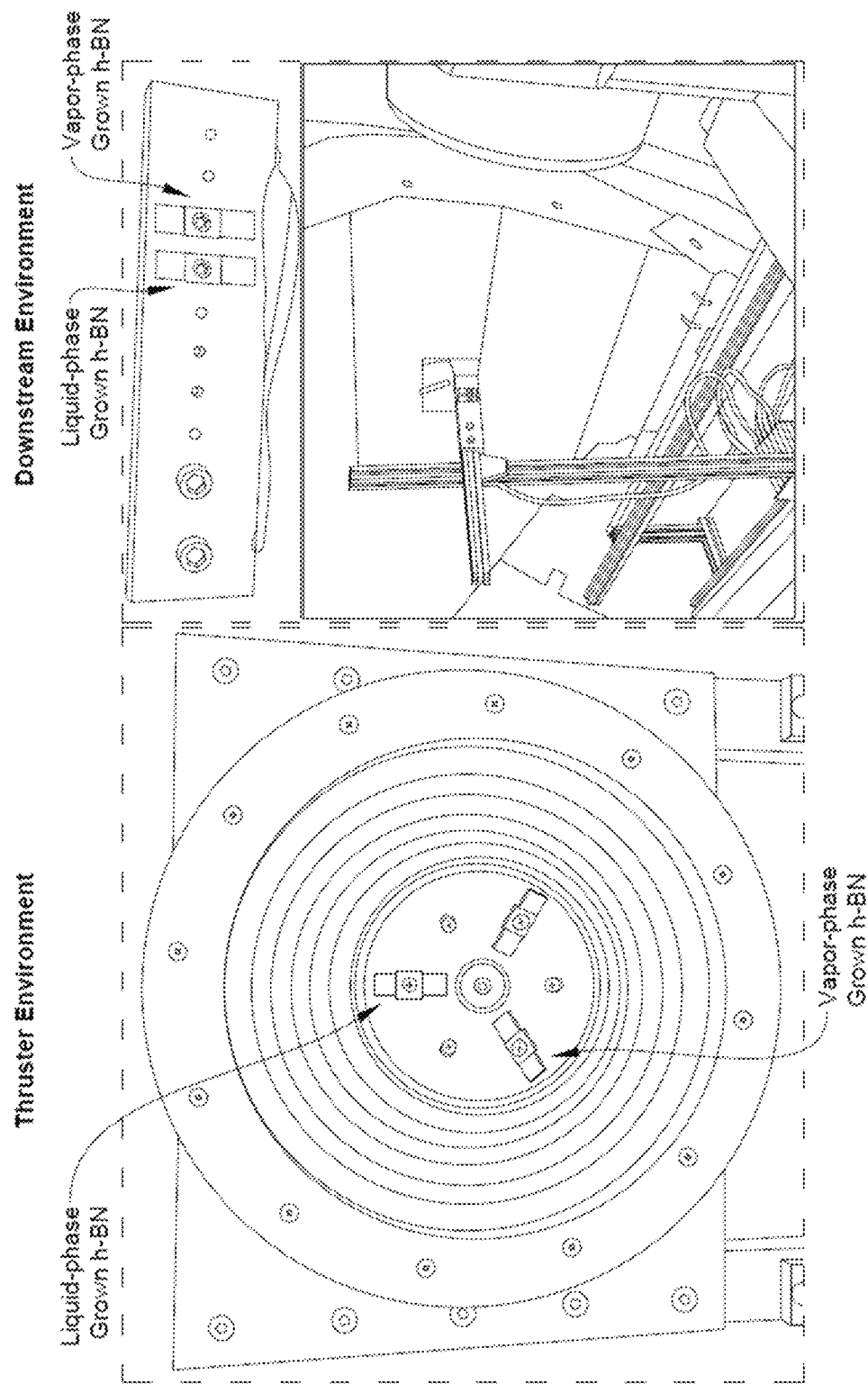
FIG. 15: Set-up of H9C thruster and mounted samples showing thruster exposure (left) and downstream exposure (right).

Bimaterial samples are mounted on a H9C thruster using two strips of Mo shields (total initial thickness of Mo is 200 μm) to secure the samples in place. Two environments are investigated, referred to as the thruster environment and downstream environment, illustrated in FIG. 15.

The thruster exposed samples are mounted to the inner front pole of the thruster, between the inner diameter of the channel. The temperature of these samples is monitored using an infrared camera (FLIR 655) through a ZnSn viewport [11]. The pressure in the thruster is on the order of $1 \times 10^{-3}$ torr, however the pressure experienced by the samples is thought to be lower due to plume expansion. The downstream exposed samples are mounted in the plume of the thruster exhaust, located 1 m from the thruster exit plane. This environment is harsher than the operative thruster environment, dominated by Xe neutrals and ions, with a pressure of $1 \times 10^{-5}$ torr during thruster operation. The temperature of the downstream samples is monitored using thermocouples. The chamber has a finite pumping speed and non-zero leak rate, so it will always reach a minimum base pressure ($10^{-7}$ torr) that balances those conditions. That base pressure is composed of air and water. It is important to note that both the thruster and downstream environments are chemically inert, however low-levels of $O_2$ (from air) and $H_2O$ are expected to be present in the chamber as a result of the base pressure.

Temperatures detected on thruster exposed samples never surpassed 267° C., and downstream exposed samples never surpassed 240° C. Nevertheless, higher effective temperatures, localized at the very surface of the bimaterial, are expected from ion bombardment. The exposed bimaterials are subject to seven cycles of increasing voltage ranging from 300 V to 500 V; exposure times are further described in Table 2. The total exposure time is just under 11 hours.

TABLE 2

Overview of exposure time for each chamber testing conditions.

| Cycle | 300 V/<15 A | 300 V/15 A | 400 V/15 A | 500 V/15 A | Total operational time [min] |
|---|---|---|---|---|---|
| 1 | 30 | 15 | 25 | 90 | 160 |
| 2 | 6 | 3 | 3 | 120 | 132 |
| 3 | 6 | 2 | 2 | 60 | 70 |
| 4 | 6 | 2 | 2 | 60 | 70 |
| 5 | 6 | 2 | 2 | 60 | 70 |
| 6 | 6 | 2 | 2 | 60 | 70 |
| 7 | 6 | 2 | 2 | 60 | 70 |

Example 2(2.3) Characterization

Prior to the plasma exposure, the emissivity (Surface Optics ET-100) of graphite/h-BN bimaterials is evaluated. The resistivity is also assessed by sandwiching the samples between 1 mm-thick GraFoil® sheets and placing a stainless-steel shim stock electrode on one side using spring washers to avoid over-tightening and cracking the h-BN layer. The voltage is then ramped from 0 to 600 V and the leakage current is measured at several voltage levels. A Keithley 2470 Sourcemeter (ID5109356) is used to apply the voltage and measure the current. Vacuum thermal cycle tests are carried out by heating the samples up to 250° C. at a rate of 3.75° C./min, holding at 250° C. for 30 min, cooling down and repeating 9 more cycles for a total of 10 cycles. After cycling, samples are inspected using an optical microscope and through scanning electron microscopy.

Oxidation tests are carried out using a high-temperature box furnace (CM Rapid Temp) in stagnant air over temperatures changing from 200° C. to 1000° C. Samples analyzed in the oxidation tests are: bulk graphite (ZXF-5Q, POCO); bulk h-BN (AX05, Saint-Gobain); bimaterials made through the carbothermal synthesis of h-BN from graphite (POCO, ZXF-5Q) at 1600° C. for 12 h in nitrogen. After the heat treatments, the weight loss of the samples is measured using an analytical balance.0

Following the plasma exposure, profilometry (Nanovea ST-400 with CL3+MG140 optics, 1 mm range, 20 μm lateral resolution, ±200 nm height accuracy) is used to evaluate the erosion of the h-BN layer. A camera is used to photograph the bimaterials on the macroscale (Nikon D7500, AF-S Micro Nikkor 40 mm Lens, Nikon, Tokyo, Japan). Scanning electron microscopy and energy dispersive X-ray spectroscopy (SEM-EDS, ZEISS 1550VP FESEM, Carl Zeiss Microscopy GmbH, Jena, Germany) are used to study the microstructure and chemical composition of the bimaterials pre- and post-testing. X-ray powder diffraction (XRD, PANalytical X'Pert Pro) is used to monitor changes in the structural composition after testing. The thickness of the h-BN layers is evaluated using an optical microscope and the image-processing tool ImageJ (National Institutes of Health). On average, 15 thickness measurements are made for each sample in evenly spaced intervals, over lengths up to 6 mm. Reported values of h-BN layer thickness are calculated using number averaging, with the error term representing one standard deviation.

Example 2(3) Results and Discussion

Example 2(3.1) Pre-Thruster Exposure Characterization

Example 2(3.1.1) Emissivity

The emissivity of graphite/h-BN bimaterials is evaluated and compared to bulk h-BN. It is found that bimaterials had an emissivity of 0.829±0.029, irrespective of whether the h-BN layer developed from liquid-phase $B_2O_3$ or vapor-phase $B_2O_3$. Controls of bulk h-BN had an emissivity of 0.898±0.002, which is found to be comparable to our h-BN layered graphite.

Example 2(3.1.2) Resistivity and Thermal Cycle Tests

The resistivity of the graphite/h-BN bimaterials is determined by measuring the leakage current through the h-BN layer on graphite at an applied voltage of up to 600 V. Results are summarized in Table 3.1 and 3.2. The resistivity of the bimaterials is comparable to that of bulk h-BN, which is reported as being >$10^{14}$ Ohm-cm at room temperature (AX05, Saint-Gobain) [12].

TABLE 3.1

Leakage current with voltage of vapor-phase grown graphite/h-BN bimaterial.

| Applied Voltage (V) | Leakage Current (nA) | Resistance (Ohms) | Resistivity (Ohm-cm) |
| --- | --- | --- | --- |
| 0 | 0.0005 | | |
| 1 | 0.0013 | 7.69E+11 | 2.05E+14 |
| 10 | 0.0021 | 4.74E+12 | 1.27E+15 |
| 50 | 0.017 | 2.94E+12 | 7.85E+14 |
| 100 | 0.175 | 5.71E+11 | 1.52E+14 |
| 200 | 0.375 | 5.33E+11 | 1.42E+14 |
| 300 | 0.4 | 7.50E+11 | 2.00E+14 |
| 400 | 0.43 | 9.30E+11 | 2.48E+14 |
| 500 | 0.467 | 1.07E+12 | 2.86E+14 |
| 600 | 0.455 | 1.32E+12 | 3.52E+14 |

TABLE 3.2

Leakage current with voltage of liquid-phase grown graphite/h-BN bimaterial.

| Applied Voltage (V) | Leakage Current (nA) | Resistance (Ohms) | Resistivity (Ohm-cm) |
| --- | --- | --- | --- |
| 0 | 0.0044 | | |
| 1 | 0.0049 | 2.04E+11 | 4.67E+13 |
| 10 | 0.0243 | 4.12E+11 | 9.43E+13 |
| 50 | 0.092 | 5.43E+11 | 1.24E+14 |
| 100 | 0.146 | 6.85E+11 | 1.57E+14 |
| 200 | 0.227 | 8.81E+11 | 2.02E+14 |
| 300 | 0.275 | 1.09E+12 | 2.49E+14 |
| 400 | 0.356 | 1.12E+12 | 2.56E+14 |
| 500 | 0.33 | 1.52E+12 | 3.48E+14 |
| 600 | 33 | 1.82E+10 | 4.16E+12 |

The graphite/h-BN bimaterials are also subject to vacuum thermal cycle tests. It is found that the bimaterial did not develop any damage from this test, as there are no signs of cracking or spallation following the repeated thermal exposures.

Example 2(3.1.3) Oxidation Resistance

The multifunctionality of graphite/h-BN bimaterials can be further analyzed by testing its oxidation behavior, to see how it behaves compared to bulk graphite and bulk h-BN. This is assessed by monitoring the weight loss of coupons exposed to different oxidative environments:

$$\text{Weight Loss (\%)} = \frac{m_0 - m_f}{m_f} \times 100 \tag{3.1}$$

where $m_0$ is the mass of the coupons prior to oxidation, and $m_f$ is the mass of the coupons after.

Figure 16:
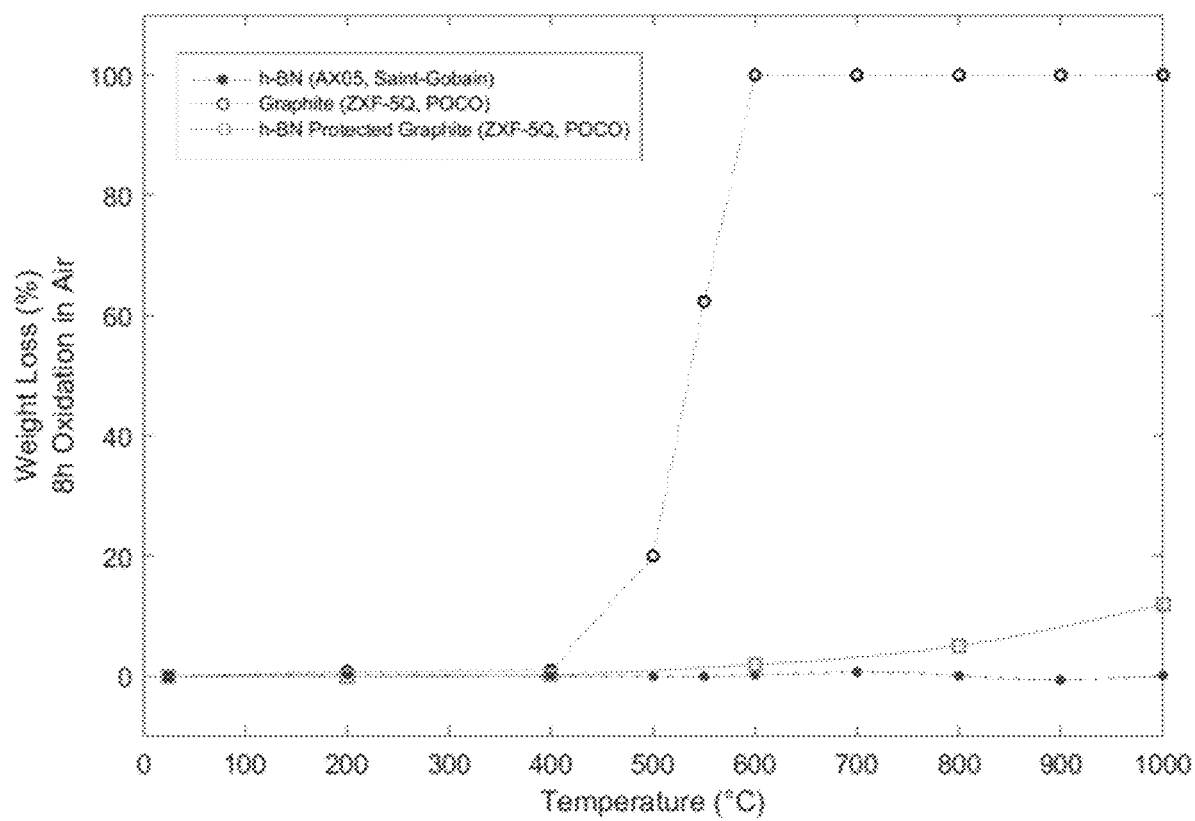
FIG. 16: Weight loss (%) of coupons exposed to stagnant air at temperatures ranging from 200° C. to 1000° C., showing coupons of graphite (○), h-BN (□), and graphite/h-BN bimaterials (●).

FIG. 16 confirms that graphite is susceptible to oxidation starting at 400° C., with samples completely oxidizing into $CO_{(g)}$ at temperatures past 600° C. Thruster environments typically function below 600° C. in predominantly chemically inert atmospheres, although $O_2$ and $H_2O$ are expected to be present in the exposure environment, which could cause candidate materials made of graphite to oxidize and volatilize. Samples of graphite protected by a layer of h-BN are subsequently studied by monitoring the oxidation resistance of graphite/h-BN bimaterials, as seen in FIG. 16. It is found that the bimaterials are resistant to oxidation up to 600° C., after which a measurable weight loss is observed due to the oxidation of h-BN into $B_2O_3$ vapor. It should be noted that the graphite bodies remained protected by h-BN layers at temperatures below 1000° C. At 1000° C., the graphite body became exposed due to the complete oxidation of h-BN into $B_2O_3$ vapor. The oxidation resistance of bulk h-BN is shown for comparison, demonstrating that the weight of h-BN coupons remains approximately constant throughout all oxidation tests carried out until 1000° C. There is a slight weight gain visible at 800° C. due to the oxidation of h-BN into $B_2O_3$ liquid, which eventually evaporates as $B_2O_3$ vapor at 1000° C. leading to a weight loss.

FIG. 16 shows similar oxidation behavior between bulk h-BN and graphite/h-BN bimaterials at temperatures below 600° C., suggesting that the bimaterials can survive the working temperatures of Hall thrusters, without being affected by $O_2$ and $H_2O$ in the environment. Differences between bulk h-BN and graphite/h-BN bimaterials at temperatures from 800° C. to 1000° C. are likely to due to the porosity of the nitride layer in the bimaterial. The pores facilitate the transport of $O_2$ into h-BN and its interface with graphite, enabling its oxidation in contrast to the much denser bulk h-BN material.

Example 2(3.2) Performance of Liquid-Phase Produced Bimaterials

Example 2(3.2.1) Roughness and Thickness of h-BN Layer

Surface roughness is measured using a profilometer to quantify the height difference between the virgin h-BN layer, protected by the Mo shield, and the plasma-exposed h-BN layer. It is found that the bimaterials developed from liquid-phase $B_2O_3$ had a step height of 8.13 µm after being exposed to thruster environments, which is within flatness noise of the original surface and does not point to significant erosion. This large flatness noise, a sign of surface irregularities, is typical for liquid-phase developed bimaterials, as previously reported by in Examples 1A-1B. In contrast, after exposures to downstream environments the step height measured is 48.6 µm, pointing to a significantly greater erosion rate from the plasma plume.

Figure 17:
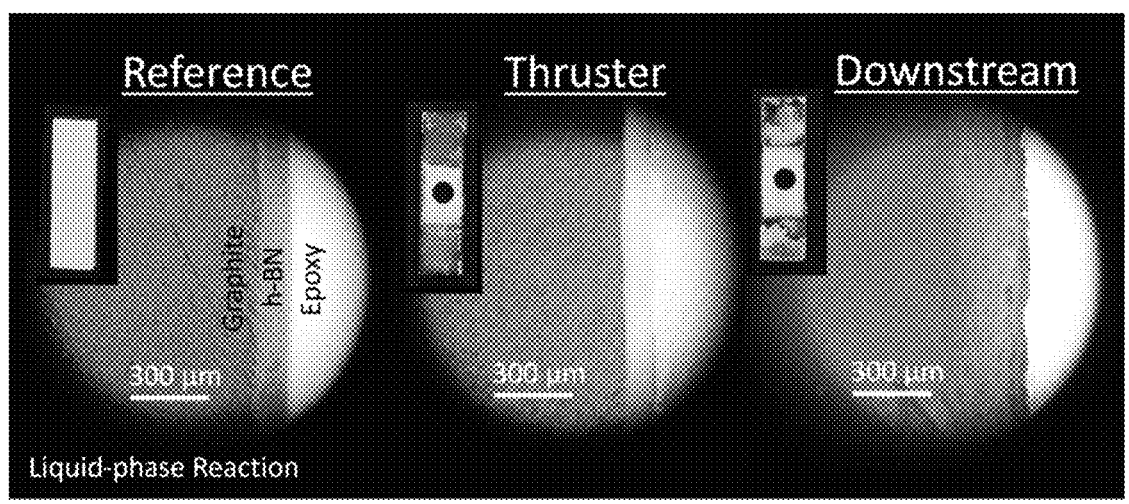
FIG. 17: Optical microscope images of cross-sectioned samples developed from liquid-phase $B_2O_3$, showing: reference, sample after thruster exposure, sample after downstream exposure. Insets show photographs of bimaterial samples.

FIG. 17 shows cross-sections of the reference and exposed samples to illustrate the similarities in the h-BN thickness of samples before and after exposure to thruster environments. In contrast, looking at the surface roughness of samples from downstream environments, the h-BN layer appears to be more porous and damaged than the pristine reference material with a diffuse interface that points to chemical changes into the h-BN layer during the exposure. This could have affected the size of the interfacial reaction zone.

Cross-sectioned samples of the bimaterials are additionally studied using energy dispersive X-ray spectroscopy to better identify the thickness changes of the h-BN layer, shown in FIG. 18.

It is found that, compared to pristine reference samples, liquid-phase produced h-BN layers in thruster environments show a 28±21 µm decrease in h-BN thickness. In downstream environments, the thickness of the h-BN layer increases by 108±29 µm. Discrepancies between these results and the profilometry data could arise from the surface irregularities and porosities seen on the surface of such samples (FIGS. 19A-19B). The increase in h-BN thickness could be due to the exiting h-BN flakes, which remain attached to the surface as the layer is being bombarded by plasma, creating a tower-like structure that forms a thicker, yet more porous, h-BN layer.

Example 2(3.2.2) Microstructure

The surface microstructure of the h-BN layer is studied using scanning electron microscopy, as seen in FIGS. 19A-19B. The reference sample shows the pristine h-BN surface prior to the thruster and downstream exposures. The reference microstructure is composed of densely packed h-BN flakes, with surface irregularities (visible in FIG. 19A(i)) that are typical from liquid-phase developed bimaterials, as previously reported in Examples 1A-1B. On a finer scale (FIG. 19B(i)), the flat faces of the h-BN flakes appear to be oriented parallel to the surface.

Exposing the bimaterials to a thruster environment worsens the surface irregularities mentioned above (visible in FIG. 19A(ii)). During the exposure, there is a removal of flat faces parallel to the surface, revealing randomly oriented h-BN flakes underneath (FIG. 19B(ii)). The surface texture could have been facilitated by surface-level oxidation of the h-BN layer during the exposure (which occurs at an effective temperature of at least 1000° C.), where the liquid $B_2O_3$ could have further enabled the reorientation or removal of h-BN flakes. In the even harsher downstream environment, the surface irregularities worsen (FIG. 19A(iii)), resulting in a porous microstructure. Within the porous framework seen in FIG. 19B(iii), h-BN flat faces are not visible, and instead one can only see the edges of the flakes.

Starting with surface irregularities on the h-BN layer causes a ripple-effect of microstructural changes when samples are exposed to the plume. The h-BN layer experiences different erosion rates on each individual h-BN flake depending on its orientation relative to the surface. The highest erosion rate is observed when the flat faces of the h-BN flakes are exposed (FIG. 19B(i)), while the lowest erosion rate is seen when the edges of the flakes are exposed (FIG. 19B(iii)). Similar observations have been reported in the literature by Garnier et al. [5,6], who noted that grains in polycrystalline samples experience local Xe ion sputtering yields that cause the grains to erode at different rates. This results in an irregular structure with depth variations, dependent on the initial orientations of the exposed grains. Given the anisotropy of h-BN flakes, it appears as if the erosion of the flake perpendicular to its basal plane is favored over the erosion of the flake parallel to its basal plane, the latter which proves to more difficult due to the higher concentration of B—N bonds in this direction, which requires high energies to break. This logic explains the morphologies seen in downstream environments, where only the edges (and not the flat faces) of the flakes have survived.

Example 2(3.2.3) Chemical and Structural Composition

Figure 20:
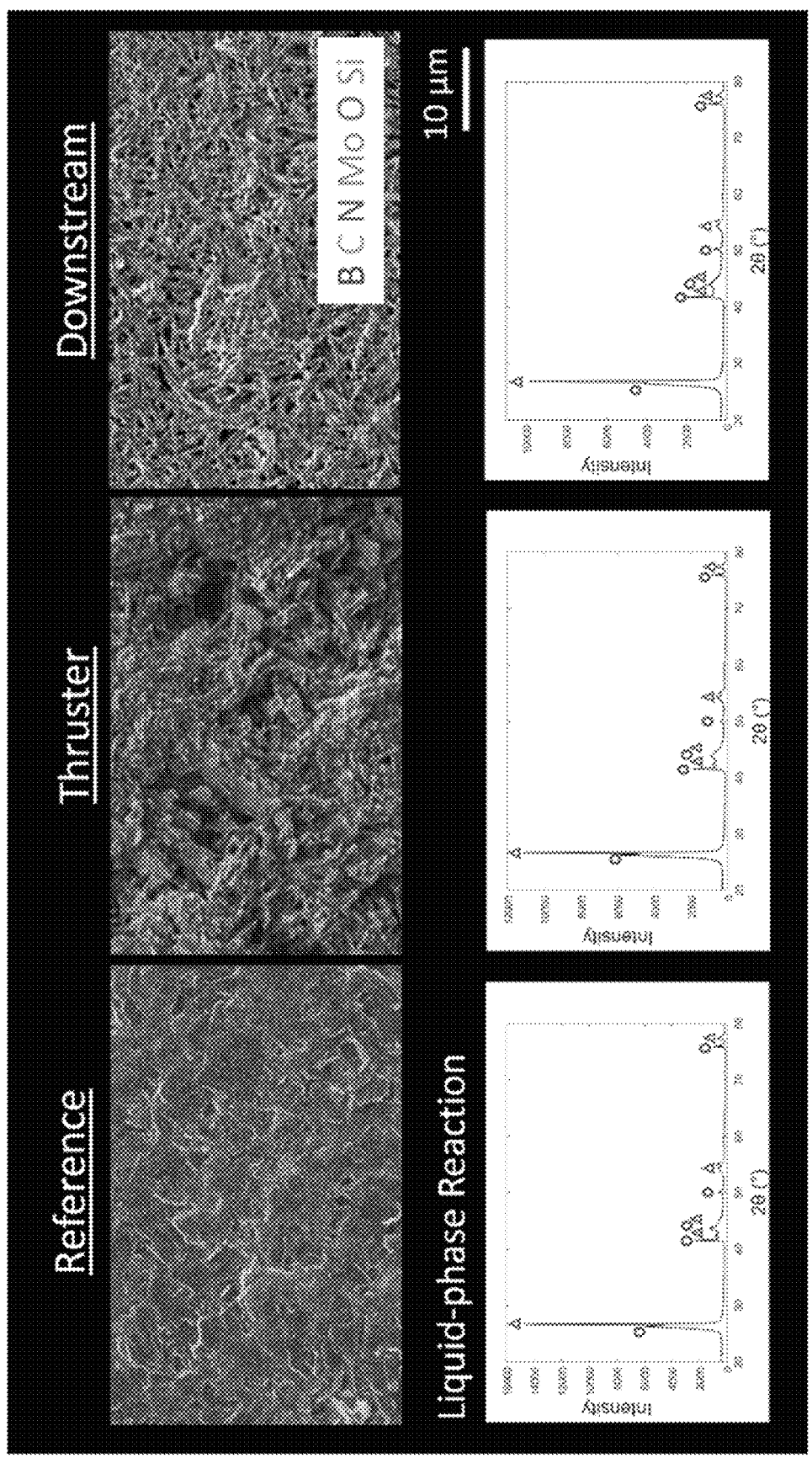
FIG. 20: SEM-EDS maps showing elemental composition of h-BN surfaces, synthesized from liquid-phase carbothermic reactions. Corresponding XRD spectra are found below the reference (left), thruster exposed sample (middle), and downstream exposed sample (right), showing presence of h-BN (○) and graphite (Δ).

The chemical composition of the h-BN surface is analyzed using energy dispersive X-ray spectroscopy. Table 4 depicts an overview of the chemical changes that liquid-phase developed bimaterials undergo when exposed to thruster and downstream environments. Additionally, FIG. 20 shows EDS maps of the bimaterial surface.

TABLE 4

Elemental composition (Wt. %) of surface of liquid-phase developed h-BN.

| Element | Reference (Wt. %) | Thruster (Wt. %) | Downstream (Wt. %) |
| --- | --- | --- | --- |
| B | 35.3 | 27.9 | 35.5 |
| N | 38.9 | 28.4 | 37.9 |
| O | 2.7 | 5.9 | 5.1 |
| C | 22.8 | 34 | 15 |
| Mo | 0 | 3.2 | 6.3 |
| Si | 0.2 | 0.5 | 0.3 |

As expected, reference samples are largely composed of B, N, and C. Small amounts of O are typical from air contamination and local oxidation of the carbon coating used for electron imaging. Si present in the reference samples could be due to contamination during the carbothermal synthesis, which took place in a SiC tube. The EDS map in FIG. 20 shows a significant deposition of C on the surface, indicative of the surface irregularities seen in the liquid-phase developed reference layers. The corresponding XRD spectrum indicates that the reference bimaterials are solely composed of graphite and h-BN.

Thruster and downstream samples contain varying amounts of Mo and O. Impingement from Mo originates from the Mo shields that secure the samples in place. The shields erode by 160 µm during the exposure test, and thus, Mo sputters onto the bimaterial surface, further contributing to the erosion of the bimaterial. The surface irregularities seen after the thruster exposures, and the open framework observed after downstream exposures, could facilitate the embedment of Mo into these structures. The higher detection of O in exposed samples could be due to surface-level oxidation from high-energy impacting ions. The lower levels of O in downstream environments compared to thruster environments are likely due to the harsher plume conditions that lead to $B_2O_3$ volatility. XRD spectra in FIG. 20 indicate that no new crystalline products formed during the exposures. Xe is not detected in any of the samples.

Example 2(3.3) Performance of Vapor-Phase Produced Bimaterials

Example 2(3.3.1) Roughness and Thickness of h-BN Layer

It is found that the bimaterials developed from vapor-phase $B_2O_3$ had a step height of 4.45 µm after being exposed to thruster environments, which is within flatness noise of the original surface. The measured flatness noise is lower than what is detected for liquid-phase grown bimaterials (~8.13 µm), indicating that vapor-phase grown surfaces are much smoother in comparison. After exposures to downstream environments the step height measured is 21.3 µm, pointing to erosion from the plasma plume. This extent of erosion is consistent with the value predicted for state-of-the-art bulk h-BN used in H9 thrusters, which is equal to 23.6 µm. Similarities in the erosion rates suggest that the sputtering yield of the vapor-phase developed bimaterials is similar to bulk h-BN, which is 0.0208 $mm^3$/C at 300 V.

Figure 21:
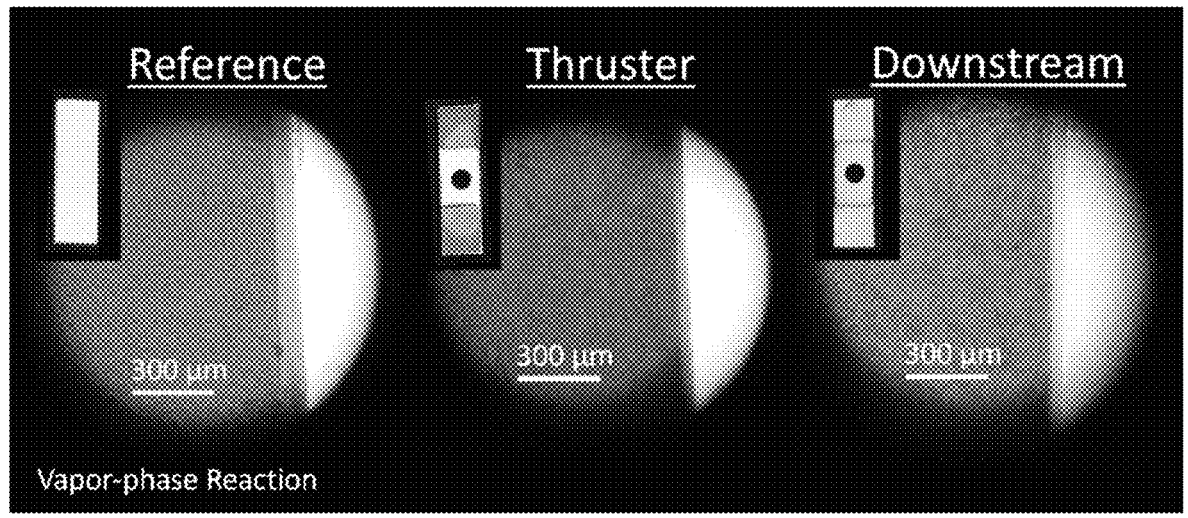
FIG. 21: Optical microscope images of cross-sectioned samples developed from vapor-phase $B_2O_3$, showing: reference, sample after thruster exposure, sample after downstream exposure. Insets show photographs of bimaterial samples.

FIG. 21 shows cross-sections of the reference and exposed samples. Through these micrographs, it is clear that the h-BN layer has eroded after being exposed to both thruster and downstream environments. The surface profiles of the layers, seen in FIG. 21, appear to be much smoother than the liquid-phase developed bimaterials, both prior to and after the exposures. Thus, the erosion behavior observed in vapor-phase developed bimaterials is comparable to the state-of-the-art material used in H9 thrusters and is superior to that observed in liquid-phase processed bimaterials.

Figure 22:
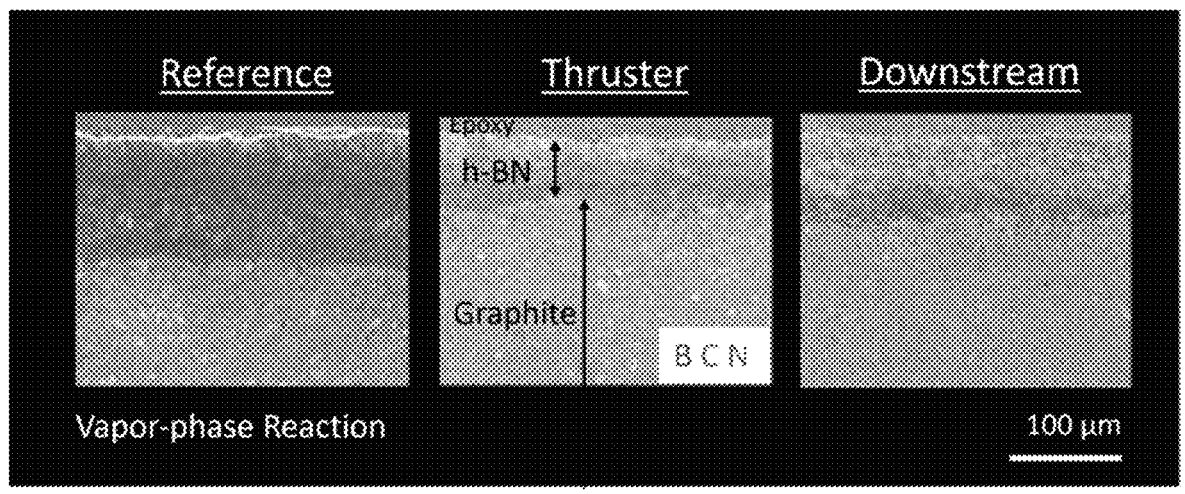
FIG. 22: SEM-EDS maps showing elemental composition of cross-sectioned samples synthesized from vapor-phase carbothermic reaction. Maps show h-BN layer (purple) over graphite (yellow, under h-BN).

Cross-sectioned samples of the bimaterials are additionally studied using energy dispersive X-ray spectroscopy to better identify the thickness changes of the h-BN layer, shown in FIG. 22. Compared to pristine reference samples, vapor-phase developed h-BN layers degrade in thruster environments by 68±15 µm. In downstream environments, the h-BN layer degrades by 74±16 µm compared to as-processed samples. Variations between this data and the profilometry data reported earlier could be due to surface irregularities arising from both thruster and downstream environments.

Statistically, vapor-phase developed h-BN layers exposed to thruster and downstream environments behaved with notable similarities, with the bimaterial retaining h-BN layers that are 57±4 µm thick after the plasma exposures. Though thinner than the reference material, the quality and compact structure of the h-BN flakes ensures the protection of the underlying graphite substrate, and endurance of the bimaterial in extreme environments.

Example 2(3.3.2) Microstructure

Figures 23A, 23B:
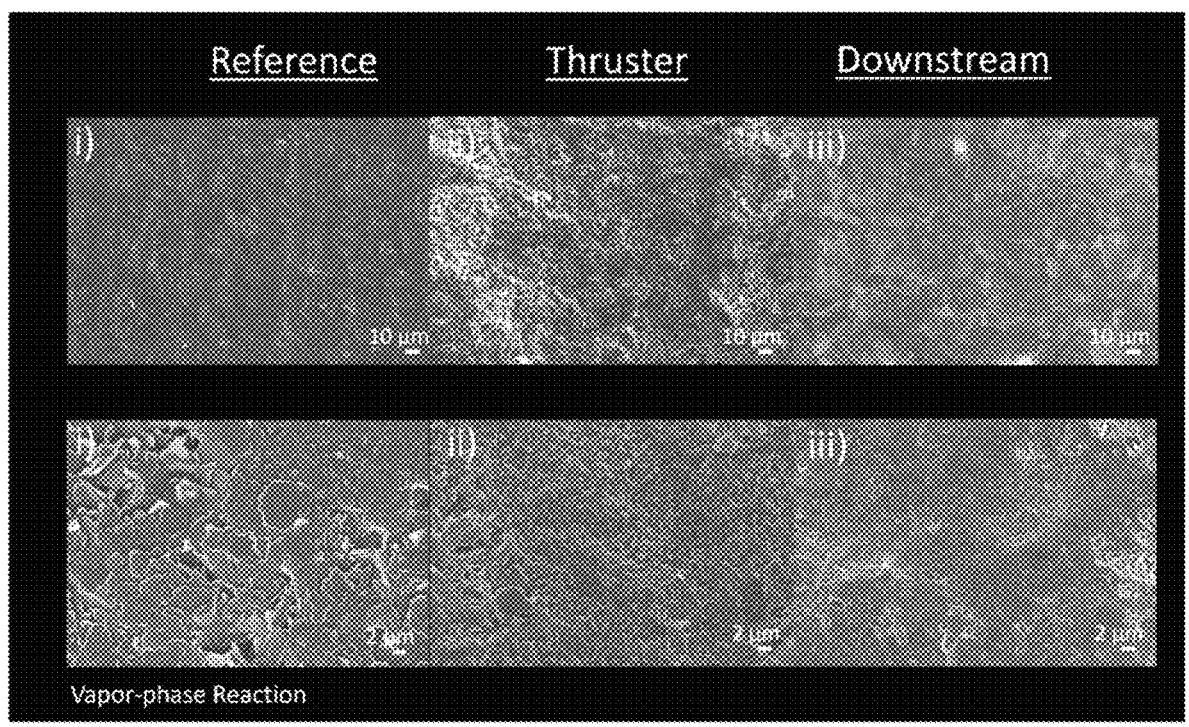
FIGS. 23A-23B: Mechanical wear of vapor-phase developed h-BN layer.

FIGS. 23A-23B show the microstructures of vapor-phase developed h-BN layers. The reference sample shows the original h-BN surface prior to the thruster and downstream tests. Like in FIG. 19A(i) and FIG. 19B(i), the reference microstructure is composed of packed h-BN flakes. Surface irregularities are less obvious in this case than in FIG. 19Aa(i), which is usual for vapor-phase developed bimaterials, as described in Examples 1A-1B.

After being exposed to a thruster environment, the surface appears to have eroded from the plasma, showing surface irregularities (FIG. 23A(ii)), and partially oxidized h-BN flakes. These flakes appear to be oriented in different directions in FIG. 23B(ii); however, a large majority are h-BN flat faces remain parallel to the surface, having not yet eroded off. FIG. 23A(iii) shows a similar behavior in downstream environments, where a denser microstructure is again observed relative to FIG. 19A(iii). Surface irregularities, in the form of pits, are visible on the surface, however these irregularities are minimal compared to the porous morphologies seen in FIG. 19A(iii). Having an initially smooth h-BN layer, as is produced by vapor-phase carbothermic reactions, avoids the ripple-effect issue seen in liquid-phase developed samples. Instead, the h-BN surface microstructure remains relatively unchanged during the plasma exposures, with minimal signs of mechanical wear and surface-level oxidation.

Example 2(3.3.3) Chemical and Structural Composition

Figure 24:
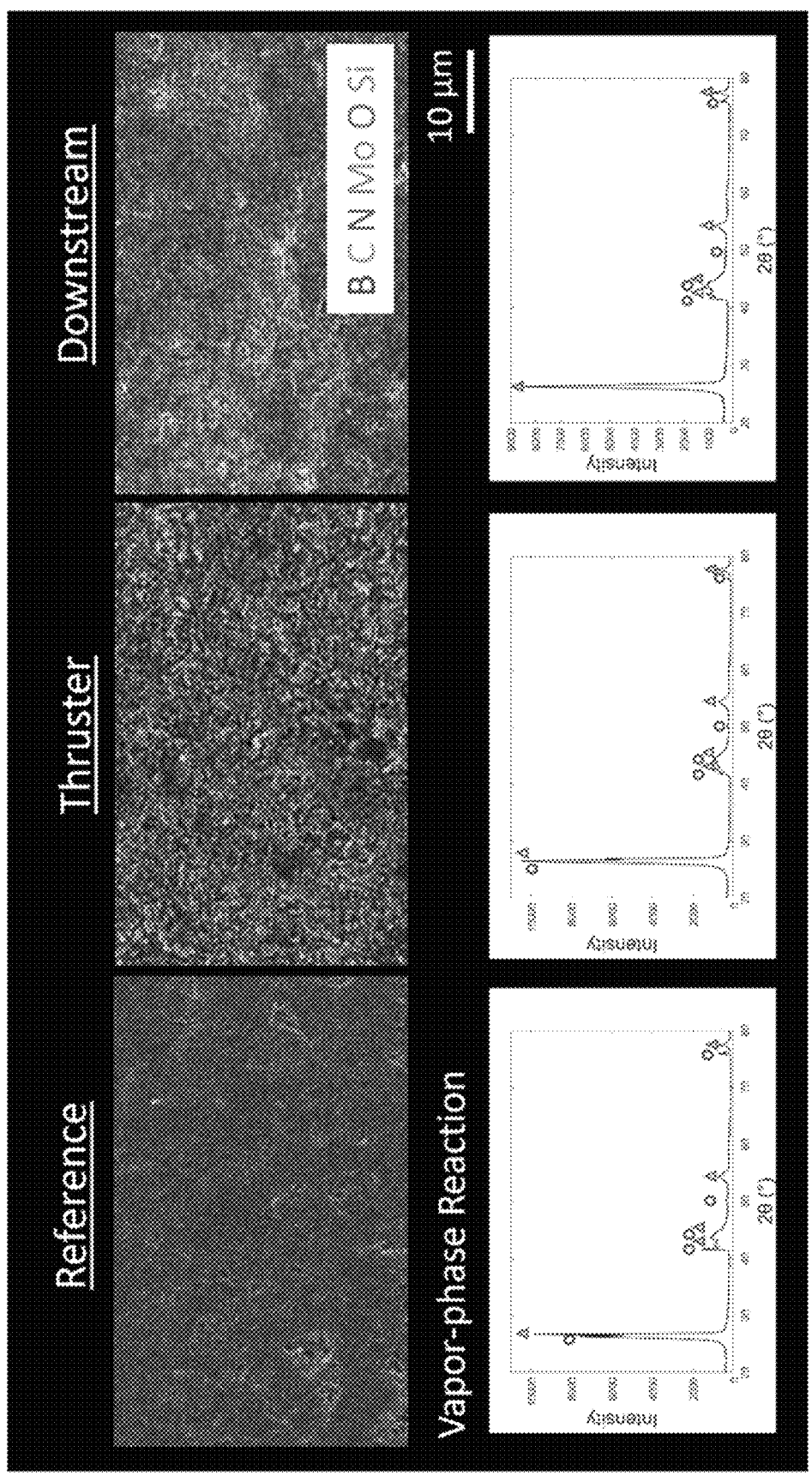
FIG. 24: SEM-EDS maps showing elemental composition of h-BN surfaces, synthesized from vapor-phase carbothermic reaction, showing presence of h-BN (○) and graphite (Δ).

Table 5 describes a summary of the chemical changes that vapor-phase developed bimaterials experience when exposed to thruster and downstream environments. The accompanying FIG. 24 shows EDS maps of the bimaterial surface.

TABLE 5

Elemental composition (Wt. %) of surface of liquid-phase developed h-BN.

| Element | Reference (Wt. %) | Thruster (Wt. %) | Downstream (Wt. %) |
|---|---|---|---|
| B | 42.5 | 31.4 | 41.9 |
| N | 41.6 | 34.0 | 46.4 |
| O | 1.4 | 3.7 | 2.3 |
| C | 14.2 | 26.6 | 7.0 |
| Mo | 0 | 3.9 | 2.2 |
| Si | 0.3 | 0.3 | 0.2 |

As before, reference samples are largely composed of B, N and C, with small amounts of 0 and Si from contamination. Mo and higher levels of O are detected in samples exposed to thruster and downstream environments, although these concentrations are notably lower than for liquid-phase produced h-BN (Table 4). This indicates that as-prepared smoother surfaces, with fewer surface irregularities, demonstrate improved resistance of the h-BN layer to Mo sputtering and surface level oxidation. Xe is not detected in any of the samples.

The corresponding XRD spectra in FIG. 24 confirm that the composition of the bimaterial did not change after the exposures, with graphite and h-BN being the only crystalline materials detected. The decreased intensity of h-BN peaks is due to the thinning of the outer layer. Considering the denser microstructure of the h-BN layer, it is plausible to conclude that vapor-phase developed bimaterials performed better than their liquid-phase counterparts.

Example 2(4) Summary

Graphite/h-BN bimaterials synthesized through vapor-phase carbothermic reactions performed comparatively better than bimaterials synthesized through liquid-phase carbothermic reactions. This is a consequence of the initial surface microstructure of the h-BN layer, which contains fewer surface irregularities when h-BN layers grow from the vapor-phase reactions. An abundance of surface irregularities, as seen in liquid-phase developed h-BN, results in a ripple-effect of damage to the outer layer, characterized by variations in h-BN erosion rates due to the polycrystalline nature of the layer, which further promotes surface roughness. As a result of these surface irregularities, Mo impingement and carbon sputtering are further embedded into the h-BN layer, as noted in EDS results, resulting in a porous framework unlike the original microstructure. Such detrimental features are not visible when starting with smoother surfaces, as seen in vapor-phase developed h-BN layers, where EDS results document much lower concentrations of Mo, O and C. As such, the performance of vapor-phase grown layers is superior, with similar erosion rates to bulk h-BN with a sputtering yield of 0.0208 mm$^3$/C at 300 V.

These preliminary findings highlight the potential of using graphite/h-BN bimaterials as wall materials for Hall thruster chambers, specifically for bimaterials synthesized from vapor-phase carbothermic reactions.

REFERENCES ASSOCIATED WITH EXAMPLE 2

[1] D. G. Zidar, J. L. Rovey, Hall-effect thruster channel surface properties investigation, Journal of Propulsion and Power. 28 (2012) 334-343. https://doi.org/10.2514/1.B34312.
[2] J. T. Yim, M. L. Falk, I. D. Boyd, Modeling low energy sputtering of hexagonal boron nitride by xenon ions, Journal of Applied Physics. 104 (2008) 123507. https://doi.org/10.1063/1.2987090.
[3] B. K. Parida, K. P. Sooraj, S. Hans, V. Pachchigar, S. Augustine, T. Remyamol, M. R. Ajith, M. Ranjan, Sputtering yield and nanopattern formation study of BNSiO$_2$ (Borosil) at elevated temperature relevance to Hall Effect Thruster, Nuclear Instruments and Methods in Physics Research Section B: Beam Interactions with Materials and Atoms. 514 (2022) 1-7. https://doi.org/10.1016/j.nimb.2022.01.001.
[4] A. J. Satonik, J. L. Rovey, G. Hilmas, Effects of plasma exposure on boron nitride ceramic insulators for hall-effect thrusters, Journal of Propulsion and Power. 30 (2014) 656-663. https://doi. org/10.2514/1. B34877.
[5] Y. Garnier, V. Viel, J.-F. Roussel, J. Bernard, Low-energy xenon ion sputtering of ceramics investigated for stationary plasma thrusters, Journal of Vacuum Science & Technology A: Vacuum, Surfaces, and Films. 17 (1999) 3246-3254. https://doi. org/10.1116/1.582050.
[6] Y. Garnier, V. Viel, J. F. Roussel, D. Pagnon, L. Magne, M. Touzeau, Investigation of xenon ion sputtering of one ceramic material used in SPT discharge chamber, in: 26th International Electric Propulsion Conference, IEPC Paper 1999-083, Kitakyushu, Japan, 1999.
[7] T. Tondu, J. P. Chardon, S. Zurbach, Sputtering yield of potential ceramics for hall effect thruster discharge channel, in: 32nd International Electric Propulsion Conference, IEPC Paper 2011-106, Wiesbaden, Germany, 2011.
[8] J. T. Yim, A survey of xenon ion sputter yield data and fits relevant to electric propulsion spacecraft integration, in: 35th International Electric Propulsion Conference, IEPC Paper 2017-060, Atlanta, Georgia, USA, 2017.
[9] M. Tartz, T. Heyn, C. Bundesmann, H. Neumann, Measuring sputter yields of ceramic materials, in: 31st International Electric Propulsion Conference, IEPC Paper 2009-240, Ann Arbor, Michigan, USA, 2009.
[10] M. W. Crofton, J. A. Young, Low energy Xe$^+$ sputter yields for alumina, Hiperco 50, and boron nitride, American Institute of Physics Advances. 11 (2021) 125126. https://doi.org/10.1063/5.0067346.
[11] D. M. Goebel, R. R. Hofer, I. G. Mikellides, I. Katz, J. E. Polk, B. N. Dotson, Conducting Wall Hall Thrusters, IEEE Transactions on Plasma Science. 43 (2015) 118-126. https://doi.org/10.1109/TPS.2014.2321110.
[12] Combat (R) Boron Nitride Solids Product Data Sheet, (2022). https://www.bn.saint-gobain.com/sites/hps-mac3-cma-boron-nitride/files/2022-06/combat-bn-solids-ds.pdf (accessed Jul. 25, 2022).

Example 3: Aspects and Considerations Regarding Thermal Shock

Thermal shock resistance is controlled, in part, by material properties including: Elastic properties: Elastic modulus, E and Poisson's ratio, ν; coefficient of thermal expansion, α; thermal conductivity, κ; and the fracture toughness, $K_{Ic}$. One also needs to consider the strength of the material, $\sigma_f$, which for ceramics is not a material constant, but depends on flaw size, sample size, and flaw location in the solid, and should be reported with appropriate statistics.

In addition, the thermal shock resistance also depends on the heat transfer coefficient, h and the specimen size, H. These are incorporated in the Biot number, Bi=hH/κ. Other parameters of importance are the density of the material, ρ, and the specific gravity, c. Historically, the Biot number is largely ignored in thermal shock studies; a classic figure of merit for thermal shock resistance is $\sigma_f/E\alpha$ which assumes the most extreme heat transfer conditions. This figure of merit is often measured by quenching hot ceramic specimens into cold water, an experiment that has several problems (Faber et al.).

Three other aspects of thermal shock that are sometimes not contemplated in the ceramic thermal shock literature are the duration of the shock, whether the shock is occurring on cooling (where failure would originate on the surface) or heating (where failure would originate from the interior), and the location or multiplicity of flaws.

Taking in all of these parameters, a general formula then for thermal stress, σ can be written as follows:

$$\sigma = \left(\frac{E\alpha\Delta T}{1-\nu}\right)F\left(\frac{hH}{\kappa}\right)G\left(\frac{\kappa t}{c\rho H^2}\right)$$

where F and G, are functions of the Biot number and the Fourier number, respectively.

A complicating factor is that porosity reduces density, elastic modulus, thermal conductivity, fracture toughness, and flexural strength. Thermal expansion and thermal diffusivity should be unchanged. The reduced elastic modulus in porous solids will enhance that thermal shock resistance (or decrease the thermal stress). In contrast, the diminished thermal conductivity, fracture toughness and strength will decrease the thermal shock resistance.

Table 6 below shows the available data for the grade of graphite used in our experiments and h-BN.

TABLE 6

Graphite and h-BN properties, according to some aspects.

| Material | Graphite Tokai G540 Manufacturer's Data | h-BN |
|---|---|---|
| Elastic modulus (GPa) | 13.7 | 837.99 (along a axis) 33.40 (along c-axis) Zhang et al., J. Adv. Ceram (2019) 71 (parallel hot-pressing direction) 17 (perpendicular to hot-pressing direction) Saint-Gobain AXOS - 19% porous |
| Coefficient of thermal expansion (in/in/° C.) | $5.5 \times 10^{-6}$ | $1\text{-}4 \times 10^{-6}$ |
| Thermal conductivity W/(m K) | 93 | 67 ($\parallel$ c axis) 35 ($\perp$ c axis) Zhang et al., J. Adv. Ceram. (2019) |
| Specific gravity | 1.85 | 0.81 |
| Fracture toughness (MPa$\sqrt{\text{m}}$) | 0.96 Chari et al, J. Am. Ceram. Soc. (2022) | 0.66 0.39 (porosity = ~14%) Chari et al, J. Am. Ceram. Soc. (2022) |
| Flexural strength (MPa) | 88.2 | 43.1-55.2 Zhang et al., J. Adv. Ceram. (2019) |

Figure 33:
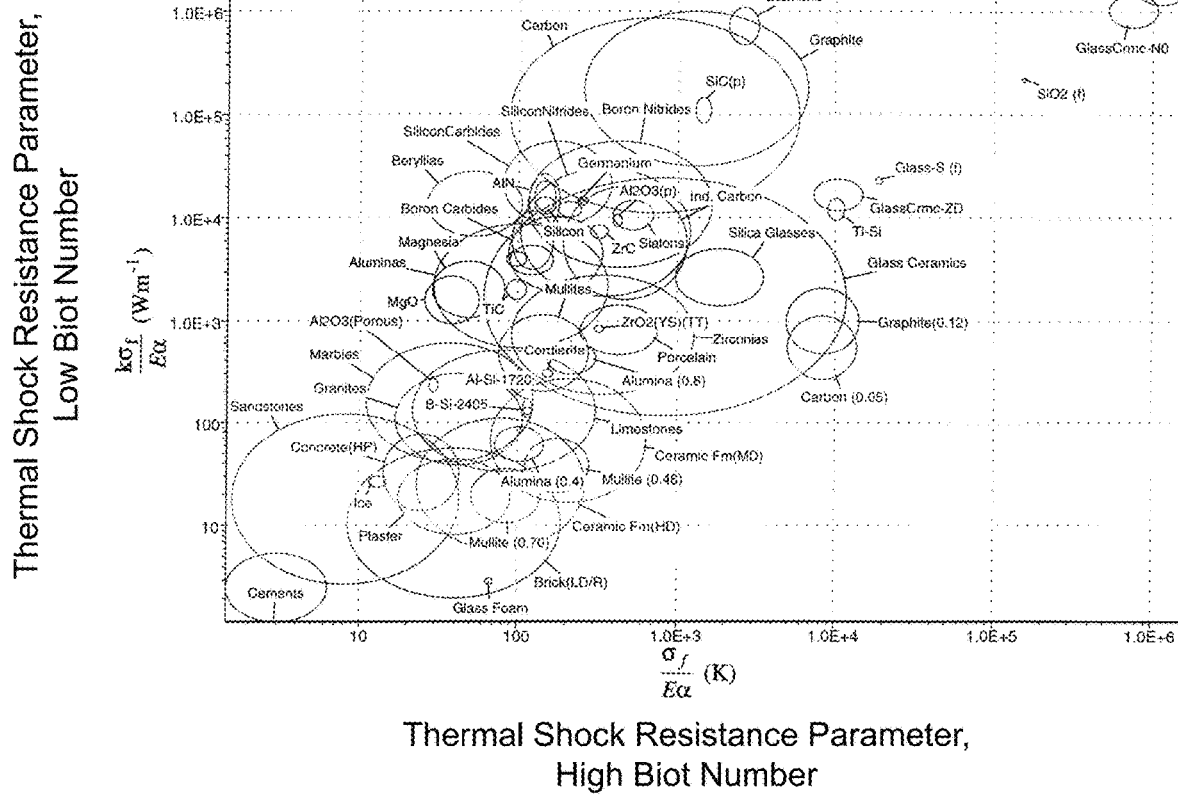
FIG. 33: A map showing where various materials, including graphite and boron nitride, lie on a plot of thermal shock resistance parameter $k\sigma_f/E\alpha$ vs. thermal shock resistance parameter $\sigma_f/E\alpha$. This figure is based on Figure 6(a) in T. J. Lu and N. A. Fleck, The Thermal Shock Resistance of Solids, *Acta Materialia*, 46 13, 4755-68 (1998).

The map in FIG. 33 describes the general trends of various ceramic materials for their thermal shock resistance. High thermal shock resistance under ideal heat transfer, as reflected in the Biot number, is in materials on the right-hand side of the map. In conditions of poor heat transfer, high thermal shock resistance is found in materials at the top of the diagram. Boron nitride and graphite (appear in the upper center of the document, suggesting that these two materials demonstrate high thermal shock resistance in conditions of both ideal and low heat transfer. Note that for porous graphite (labeled as Graphite (0.12) in FIG. 33), the thermal shock resistance moves to the right and down, signifying greater thermal shock resistance for high Biot numbers, but also to a region of diminished thermal shock resistance for low heat transfer.

According to some aspects, (e.g., see Example 2), the thruster-exposed samples do not surpass 267° C. and the downstream-exposed samples do not surpass 240° C., based upon thermocouple measurements. Graphite/h-BN samples show some erosion at the micrometer level, but no thermal shock failure. These observations are consistent with what would be expected from trends in the thermal shock merit indices plotted in FIG. 33.

REFERENCES ASSOCIATED WITH EXAMPLE 3

K. T. Faber, M. D. Huang, A. G. Evans, Quantitative Studies of Thermal Shock in Ceramics Using a Novel Test Technique, *Journal of the American Ceramic Society*, 64 296-300 (1981).

T. J. Lu and N. A. Fleck, The Thermal Shock Resistance of Solids, *Acta Materialia*, 46 13, 4755-68 (1998).

Z. Zhang, X. Duan, B. Qiu, Z. Yang, D. Cai, P. He, D. Jia, Y. Zhou, Preparation and anisotropic properties of textured structural ceramics: A review, *Journal of Advanced Ceramics*, 8 (2019) 289-332. https://doi.org/10.1007/s40145-019-0325-5.

C. S. Chari, Degradation of Ceramic Surfaces and its Mitigation: From Electric Propulsion to Cultural Heritage, PhD Dissertation, California Institute of Technology, 2023

Example 4: Sources of N for Formation of h-BN and Other Aspects

The source of N for the reaction(s) of converting graphite to h-BN may be $N_2$ gas. However, one or more other sources of N may be used either instead of $N_2$ or in addition to $N_2$. For example, urea is an optional reagent and N-source.

Urea-Based Routes for Synthesizing h-BN Layer:

Certain experiments for the formation of h-BN layers focused on the high-temperature reaction of $B_2O_3$ with N-containing compounds like urea ($CO(NH_2)_2$), which decomposes into ammonia ($NH_3$) at 350° C. These amide reactions require the initial formation of turbostratic BN (t-BN), which developed at 950° C. from the reaction between $B_2O_3$ and $NH_3$[1-4]. The structure of t-BN has of two-dimensional layers of hexagonal boron nitride that are slightly misaligned with one another, producing a structure that is not as ordered as h-BN [2]. Nevertheless, t-BN can crystallize into h-BN at 1500° C. [4], acting as an intermediate phase to h-BN formation that requires relatively low temperatures (950° C.) to grow.

Figure 31A:
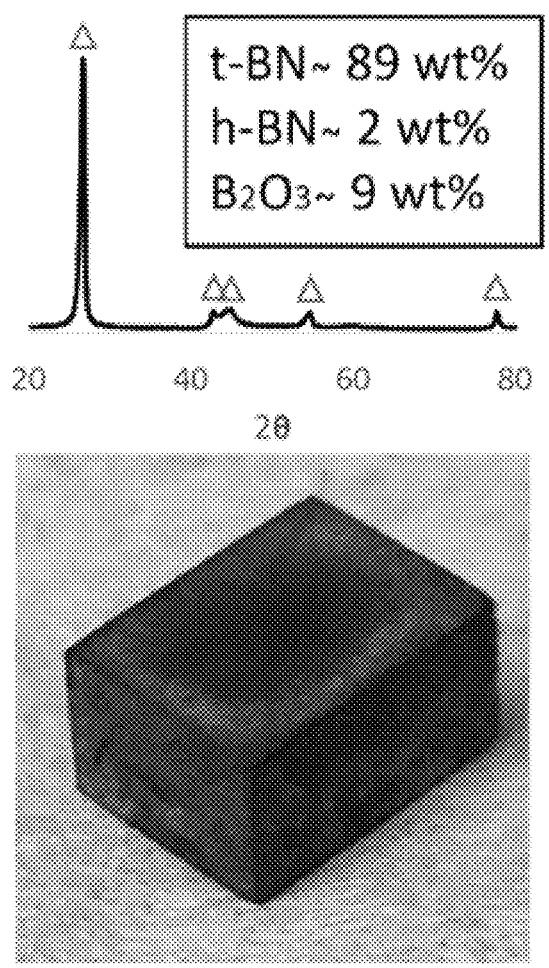
FIGS. 31A-31B: Graphite/h-BN samples made using urea-based route.
Figure 31B:
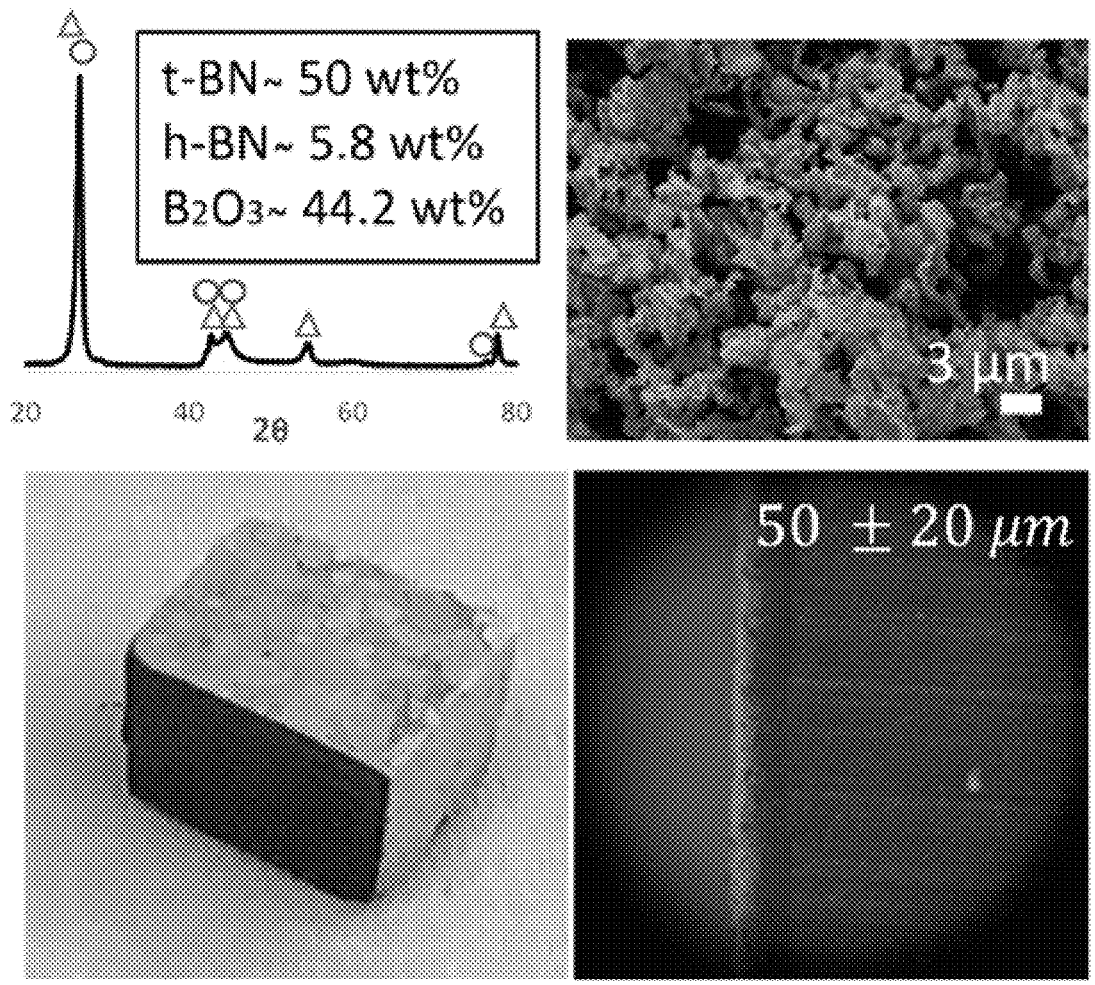

Experiments are carried out to test the incorporation of t-BN into the precursor powder melt, otherwise having $B_2O_3$ and h-BN. FIGS. 31A-31B show two precursor melt compositions that are investigated. The composition used in FIG. 31A based on the findings by Thomas [2], did not result in a visible h-BN layer. The corresponding XRD spectrum shows the presence of only the graphite body. A different composition is investigated, as shown in FIG. 31B, with slightly higher quantities of $B_2O_3$. It is found that this precursor composition did develop a h-BN layer on the graphite body, however this layer is found to be around 50 μm thin, and patchy in appearance. The surface microstructure of the h-BN layer is porous, containing small (~1 μm) sized flakes. The porosity could have been due to the relatively low synthesis temperature of 1550° C. as well as off-gassing from CO due to Eqn. 2.1.

Apart from the non-uniform h-BN layers, an additional problem encountered with this route may be that the concentration of urea used to form t-BN is limited during the reaction. Although a lid is placed on top of the crucible, the off-gassing of $NH_3$ from decomposing urea caused the lid to come off the crucible, which allows $NH_3$ vapors to leave the crucible before the t-BN forming temperature of 950° C. is even reached. This makes it challenging to produce t-BN from the amide reaction. Flowing $NH_3$ vapors through the tube furnace may facilitate t-BN formation, however this is also a hazardous gas to work with in the laboratory. Carbothermic reactions are thus investigated more closely for two reasons: i) they only require the flow of $N_2$ vapors and not $NH_3$, ii) FIGS. 31A-31B suggest that high concentrations of $B_2O_3$ leads to thicker h-BN layers, so it is contemplated to make the precursor powders as rich in $B_2O_3$ and h-BN as possible (e.g., see Examples 1A-16).

Example 5: Bimaterial Thermal Cycle Tests

Figure 32:
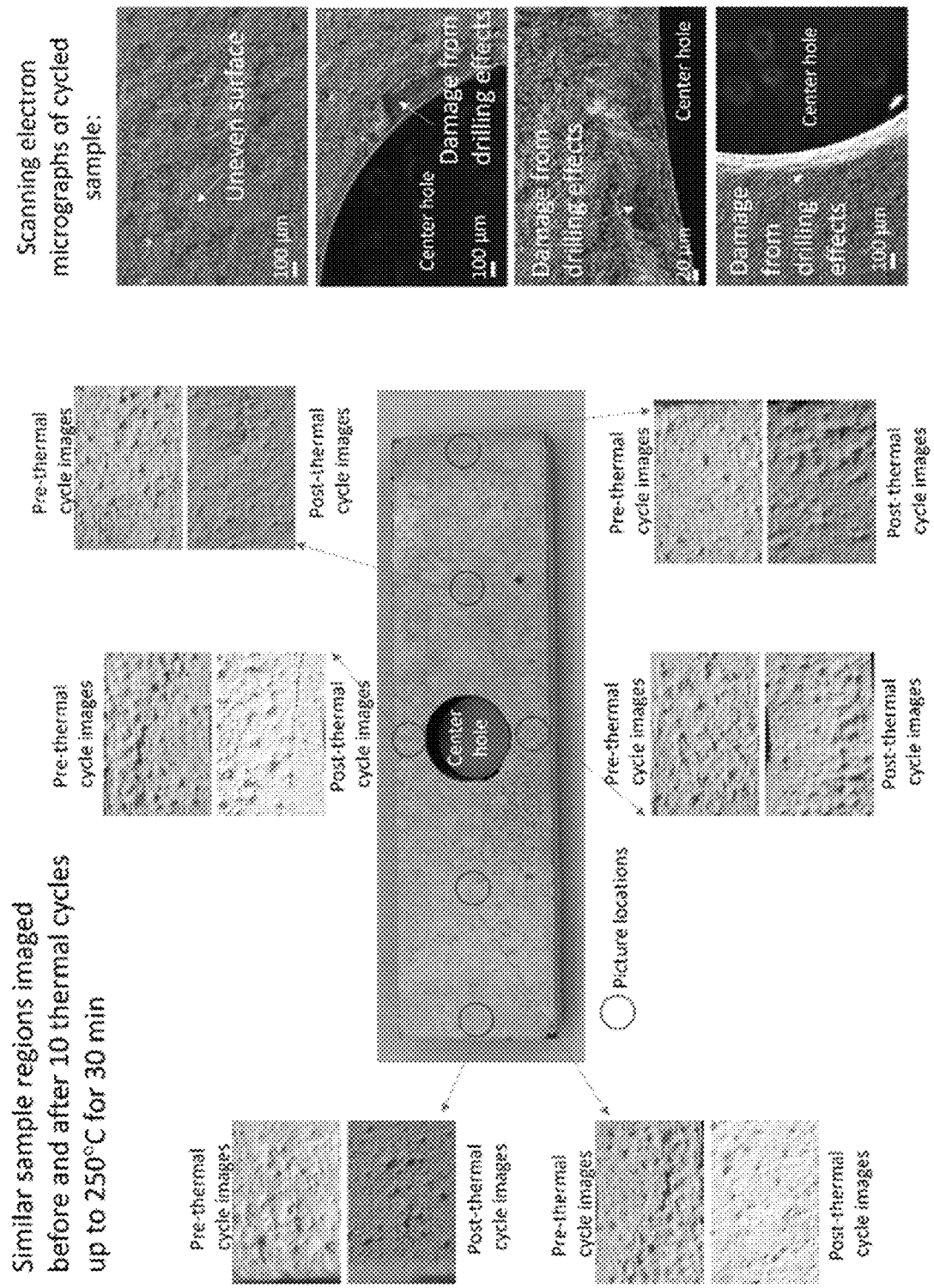
FIG. 32: Bimaterial sample regions imaged before and after thermal cycle test, including examples of micrographs taken with SEM showing uneven surfaces near center hole from drilling effects.

FIG. 32 shows examples of the h-BN surface before and after undergoing 10 thermal cycles up to 250° C. for 30 min. Both optical microscope images and SEM images are included. No spallation or cracking from thermal cycling is observed. Uneven surfaces around the center hole are from drilling artifacts. Uneven h-BN surface is from processing conditions, relying on liquid-phase $B_2O_3$ reactions with graphite.

Example 6: Erosion Prediction for State-of-the-Art h-BN

TABLE 7

| | Constants for H9 Thrusters | |
|---|---|---|
| $J_{300\ V/15\ A}$ | Current density (1 m) @, 300 V/15 A | 7 mA/cm² |
| $J_{300\ V/20\ A}$ | Current density (1 m) @ 300 V/20 A | 8.75 mA/cm² |
| $Y_{hBN\ @\ 300\ V}$ | BN sputtering yield @ 300 V | 0.020789209 mm³/C |
| $J_{400\ V/15\ A}$ | Current density (1 m) @ 400 V/15 A | 9.5 mA/cm² |
| $Y_{hBN\ @\ 400\ V}$ | BN sputtering yield @ 400 V | 0.023399083 mm³/C |
| $J_{500\ V/15\ A}$ | Current density (1 m) @ 500 V/15 A | 10 mA/cm² |
| $Y_{hBN\ @\ 500\ V}$ | BN sputtering yield @ 500 V | 0.025129888 mm³/C |

The erosion rate of h-BN can be determined from the constants shown in Table 7 as follows:

$$hBN\ \text{Erosion Rate}\ \left[\frac{\mu m}{hr}\right] = J \times Y_{hBN} \times 0.00001 \times 3600 \times 1000 = J \times Y_{hBN} \times 36$$

A summary of the calculated h-BN erosion rates is provided in Table 8.

TABLE 8

| Summary of h-BN Erosion Rates | | | | |
|---|---|---|---|---|
| | Thruster Condition | | | |
| | 300 V/15 A | 300 V/20 A | 400 V/15 A | 500 V/15 A |
| BN Erosion Rate [µm/hr] | 5.2 | 6.5 | 8.0 | 9.0 |

Standard exposures can be described as 2 hours at 300 V/15 A conditions, and 2 hours at 300 V/20 A conditions. Thus, the total erosion of h-BN can be estimated as follows:

hBN Erosion [µm]=(2×5.2)+(2×6.5)=23.6 µm

Using the thruster conditions of the experiment (referring to Table 2), the exposure can be described as 1.57 hours at 300 V/15 A conditions, 0.63 hours at 400 V/15 A conditions, and 8.5 h at 500 V/15 A. Thus, the total expected erosion of h-BN during this 10.7 hour-long exposure may be:

hBN Erosion [µm]=(1.57×5.2)+(0.63×8.0)+(8.5× 9.0)= 89.7 µm

As described in profilometry and SEM-EDS results in Example 2, graphite/h-BN bimaterials do not reach as high a magnitude of erosion as 89.7 µm, according to some aspects. So, based on this erosion calculation, the bimaterials actually perform better than what would be expected for state-of-the-art bulk h-BN, according to some aspects.

REFERENCES ASSOCIATED WITH EXAMPLES 4-6

[1] T. E. O'Connor, Synthesis of boron nitride, Journal of the American Chemical Society. 84 (1962) 1753-1754. https://doi.org/10.1021/ja00868a065.
[2] J. Thomas, N. E. Weston, T. E. O'Connor, Turbostratic boron nitride, thermal transformation to ordered-layer-lattice boron nitride, Journal of the American Chemical Society. 84 (1962) 4619-4622. https://doi.org/10.1021/ja00883a001.
[3] M. Hubaeek, M. Ueki, Chemical reactions in hexagonal boron nitride system, Journal of Solid State Chemistry. 123 (1996) 215-222.
[4] S. Alkoy, C. Toy, T. Gonial, A. Tekin, Crystallization behavior and characterization of turbostratic boron nitride, Journal of the European Ceramic Society. 17 (1997) 1415-1422. https://doi.org/10.1016/S0955-2219(97)00040-X.
[5] M. W. Chase Jr., NIST-JANAF Themochemical Tables, Fourth Edition, American Chemical Society, 1998.
[6] A. Aydoğdu, N. Sevinç, Carbothermic formation of boron nitride, Journal of the European Ceramic Society. 23 (2003) 3153-3161. https://doi.org/10.1016/S0955-2219(03)00092-X.
[7] E. T. Turkdogan, Physical chemistry of high temperature technology, Academic Press Inc, New York, 1980.
[8] S. J. Yoon, A. Jha, Vapour-phase reduction and the synthesis of boron-based ceramic phases, Journal of Materials Science. 30 (1995) 607-614. https://doi.org/10.1007/BF00356318.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An electric propulsion device comprising:
   at least one portion comprising or formed of a monolithic bimaterial;
   wherein the monolithic bimaterial comprises a graphite layer material and a hexagonal boron nitride layer ;
   wherein the graphite layer and hexagonal boron nitride layer are monolithically integrated in the bimaterial; and
   wherein the hexagonal boron nitride layer comprises less than 0.001 mol/cm$^3$ of boron carbide.

2. The device of claim 1, wherein the hexagonal boron nitride layer provides a function of being an electrically insulating layer in the electric propulsion device.

3. The device of claim 1, wherein the hexagonal boron nitride layer electrically isolates:
a first electrically conductive portion or component of the device from a second electrically conductive portion or component,
at least one electrically conductive portion or component of the device from a cathodically-biased portion of the device,
an anodically-biased portion from a cathodically-biased portion of the device;
a portion of an anode or an anodically-biased portion from a magnetic circuit of the device; and/or
a wall of a discharge chamber or a portion of the wall from the magnetic circuit of the device.

4. The device of claim 1, wherein the hexagonal boron nitride layer electrically isolates the graphite layer from at least one other electrically conductive portion or component of the device.

5. The device of claim 1 comprising a discharge chamber having a plasma maintained therein;
wherein the discharge chamber comprises a wall having a first surface facing the plasma and a second surface opposite the first surface;
wherein at least a portion of a wall of the discharge chamber comprises or is formed of the bimaterial; and
wherein (i) at least a portion of the first surface of the wall comprises the graphite layer such that the graphite layer of the bimaterial faces the plasma and/or ii) at least a portion of the first surface of the wall comprises the hexagonal boron nitride layer such that the hexagonal boron nitride layer of the bimaterial faces the plasma.

6. The device of claim 5, wherein the hexagonal boron nitride layer undergoes secondary electron emission due to interaction with the plasma within the discharge chamber.

7. The device of claim 5, wherein at least a portion of the second surface of the wall comprises the hexagonal boron nitride layer.

8. The device of claim 5, wherein the second surface of the wall comprises the hexagonal boron nitride layer; and wherein the hexagonal boron nitride layer is configured to electrically isolate the graphite layer from an electrically conductive portion of another component of the device.

9. The device of claim 8, wherein the another component is a magnetic circuit or a portion of the magnetic circuit of the device.

10. The device of claim 5, wherein the device is characterized as a magnetically shielded conductive wall thruster or wherein the first surface of the wall of the discharge chamber is electrically conductive and the device comprises magnetic shielding to minimize erosion of the wall of the discharge chamber.

11. The device of claim 1 comprising a hollow cathode and wherein a plasma comprises ions of a gaseous propellant.

12. The device of claim 1 being a solar electric propulsion (SEP) device, an ion thruster, a Hall-effect thruster, a gridded ion thruster, a magnetoplasmadynamic (MPD) thruster, any variation thereof, or any combination thereof.

13. The electric propulsion device of claim 1, wherein a plurality of distinct portions of the electric propulsion device comprises said monolithic bimaterial.

14. The device of claim 1, wherein:
the bimaterial comprises a first surface formed of the graphite layer and a second surface formed of the hexagonal boron nitride layer, the first surface being opposite of the second surface; or
the bimaterial comprises a first surface formed of the hexagonal boron nitride layer and a second surface formed of the hexagonal boron nitride layer, the first surface being opposite of the second surface, wherein the graphite layer is between the first and second surfaces.

15. The device of claim 1, wherein the graphite layer and the hexagonal boron nitride layer are connected via a continuous atomic structure;
wherein the graphite layer and the hexagonal boron nitride layer are connected via a monolithic heterointerface; and/or
wherein an interface between the graphite layer and the hexagonal boron nitride layer is coherent or semicoherent.

16. The device of claim 15, wherein the graphite layer and the hexagonal boron nitride layer are connected via an interface layer therebetween; wherein the interface layer comprises C, B, and N.

17. The device of claim 16, wherein the interface layer:
comprises a combination of graphite and boron nitride;
has a thickness less than or equal to 100 µm;
is free of oxide materials and carbide compositions or comprises less than 0.005 mol/cm³ of oxide and carbide compositions; and/or
is free of boron carbide or comprises less than 0.005 mol/cm³ of boron carbide.

18. The device of claim 1, wherein the hexagonal boron nitride layer covers or encapsulates at least a portion of the graphite layer such that:
the graphite layer is not in electrical communication with a magnetic circuit of the electric propulsion device; and/or
the graphite layer is not exposed to a propellant gas, a vacuum, air, oxygen gas, or a combination thereof.

19. The device of claim 1, wherein the hexagonal boron nitride layer:
has a thickness selected from the range of 40 µm to 5000 µm;
is free of oxide and carbide compositions or comprises less than 0.001 mol/cm³ of oxide and carbide compositions; and/or
has an electrical resistivity greater than or equal to $1 \cdot 10^{14}$ Ωcm at 25° C.

20. The device of claim 1, wherein the graphite layer:
has a molar and/or mass purity greater than or equal to 98%;
has an electrical conductivity selected from the range of 400 $\Omega^{-1}cm^{-1}$ to 3000 $\Omega^{-1}cm^{-1}$;
has a density selected from the range of 1.6 g/cm³ to 2.26 g/cm³; and/or
has a thickness selected from the range of 0.5 cm to 100 cm.

21. The device of claim 1, wherein the at least one portion of the device comprising or formed of the monolithic bimaterial has at least one dimension greater than or equal to 1 cm and/or the at least one portion of the electric propulsion device comprising or formed of the monolithic bimaterial has a volume greater than or equal to 0.1 cm³.

22. The device of claim 1, wherein the at least one portion of the electric propulsion device comprising or formed of the monolithic bimaterial is free of macrofractures and microfractures after at least 5 thermal cycles between 25° C. and 250° C. at a rate of 3.75° C./min with 30 minute hold time at 250° C.

23. A method of making a monolithic bimaterial, the method comprising:
- converting a portion of a graphite layer into a hexagonal boron nitride layer via a carbothermic reaction;
- wherein the monolithic bimaterial comprises the graphite layer and the hexagonal boron nitride layer;
- wherein the hexagonal boron nitride layer comprises less than 0.001 mol/cm$^3$ of boron carbide; and
- wherein the carbothermic reaction occurs at a temperature greater than or equal to 1500° C.

24. The electric propulsion device of claim 1, further comprising:
- a cathode;
- an anode; and
- a discharge chamber containing a plasma of a gaseous propellant;
- wherein at least a portion of a wall of the discharge chamber comprises or is formed of the monolithic bimaterial.

25. The electric propulsion device of claim 24, wherein the anode is an annular anode.

26. The electric propulsion device of claim 24, wherein the cathode is a hollow cathode.

27. The electric propulsion device of claim 1, wherein the hexagonal boron nitride layer is free of boron carbide.

28. The method of claim 23, wherein the hexagonal boron nitride layer is free of boron carbide.

* * * * *